United States Patent
Levien et al.

(10) Patent No.: US 10,279,906 B2
(45) Date of Patent: May 7, 2019

(54) AUTOMATED HAZARD HANDLING ROUTINE ENGAGEMENT

(71) Applicant: Elwha LLC, Bellevue, WA (US)

(72) Inventors: Royce A. Levien, Lexington, MA (US); Robert W. Lord, Seattle, WA (US); Richard T. Lord, Tacoma, WA (US); Mark A. Malamud, Seattle, WA (US); John D. Rinaldo, Jr., Bellevue, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 442 days.

(21) Appl. No.: 13/731,363

(22) Filed: Dec. 31, 2012

(65) Prior Publication Data

US 2014/0166816 A1   Jun. 19, 2014

Related U.S. Application Data

(63) Continuation-in-part of application No. 13/730,202, filed on Dec. 28, 2012, now Pat. No. 9,567,074, which is a continuation-in-part of application No. 13/728,642, filed on Dec. 27, 2012, now Pat. No. 9,527,586, which is a continuation-in-part of application No. 13/722,874, filed on Dec. 20, 2012, now Pat. No. 9,776,716, which is a continuation-in-part of application No. 13/720,694, filed on Dec. 19, 2012.

(51) Int. Cl.
*G05D 1/00* (2006.01)
*G08G 5/00* (2006.01)
*B64C 39/02* (2006.01)

(52) U.S. Cl.
CPC .......... *B64C 39/024* (2013.01); *G05D 1/0088* (2013.01); *G08G 5/0069* (2013.01); *B64C 2201/141* (2013.01); *B64C 2201/143* (2013.01); *B64C 2201/146* (2013.01)

(58) Field of Classification Search
CPC .................................. G08G 5/04; G08G 5/45
USPC .............................................. 701/3, 300–302
See application file for complete search history.

(56) References Cited

U.S. PATENT DOCUMENTS

| | | |
|---|---|---|
| 4,964,837 A | 10/1990 | Collier |
| 5,581,250 A | 12/1996 | Khvilivitzky |
| 6,694,228 B2 | 2/2004 | Rios |
| 6,786,213 B1 | 9/2004 | Lee |
| 6,804,607 B1 | 10/2004 | Wood |

(Continued)

OTHER PUBLICATIONS

"A Swarm of Nano Quadrotors ", YouTube.com, http://www.youtube.com/watch?v=YQIMGV5vtd4, Jan. 31, 2012.

(Continued)

*Primary Examiner* — Imran K Mustafa

(57) ABSTRACT

Disclosed herein are example embodiments for automated hazard handling routine engagement. For certain example embodiments, at least one machine, such as an unoccupied flying vehicle (UFV), may: (i) detect at least one motivation to engage at least one automated hazard handling routine of the UFV; or (ii) engage at least one automated hazard handling routine of a UFV based at least partially on at least one motivation. However, claimed subject matter is not limited to any particular described embodiments, implementations, examples, or so forth.

27 Claims, 23 Drawing Sheets

(56) References Cited

U.S. PATENT DOCUMENTS

| | | | |
|---|---|---|---|
| 6,896,220 B2 | 5/2005 | McKendree et al. |
| 6,926,233 B1 | 8/2005 | Corcoran, III |
| 6,952,001 B2 | 10/2005 | McKendree et al. |
| 6,980,151 B1 | 12/2005 | Mohan |
| 7,024,309 B2 | 4/2006 | Doane |
| 7,039,367 B1 | 5/2006 | Kucik |
| 7,299,130 B2 | 11/2007 | Mulligan et al. |
| 7,437,225 B1 | 10/2008 | Rathinam |
| 7,542,828 B2 | 6/2009 | Steele et al. |
| 7,693,624 B2 | 4/2010 | Duggan et al. |
| 7,737,878 B2 | 6/2010 | van Tooren et al. |
| 7,747,364 B2 | 6/2010 | Roy et al. |
| 7,876,258 B2 | 1/2011 | Abraham et al. |
| 7,953,524 B1 | 5/2011 | Roggendorf |
| 7,969,346 B2 | 6/2011 | Franceschini et al. |
| 7,970,506 B2 | 6/2011 | DeMarco et al. |
| 8,060,270 B2 | 11/2011 | Vian et al. |
| 8,068,949 B2 | 11/2011 | Duggan et al. |
| 8,086,351 B2 | 12/2011 | Gaudiano et al. |
| 8,103,398 B2 | 1/2012 | Duggan et al. |
| 8,380,367 B2 | 2/2013 | Schultz et al. |
| 8,471,186 B2 | 6/2013 | Wallis |
| 8,700,306 B2 | 4/2014 | Duggan et al. |
| 9,776,716 B2 | 10/2017 | Levien et al. |
| 2001/0044444 A1 | 11/2001 | Mahe et al. |
| 2003/0014165 A1 | 1/2003 | Baker et al. |
| 2003/0135762 A1 | 7/2003 | Macaulay |
| 2004/0193334 A1 | 9/2004 | Carlsson et al. |
| 2004/0249519 A1* | 12/2004 | Frink ............... B64D 45/0015 701/3 |
| 2005/0004723 A1* | 1/2005 | Duggan ............... G05D 1/0061 701/24 |
| 2005/0077424 A1 | 4/2005 | Schneider |
| 2005/0090945 A1 | 4/2005 | Bodin et al. |
| 2005/0136891 A1 | 6/2005 | Wang et al. |
| 2005/0197749 A1 | 9/2005 | Nichols et al. |
| 2006/0058928 A1 | 3/2006 | Beard et al. |
| 2006/0058931 A1 | 3/2006 | Ariyur et al. |
| 2006/0089766 A1 | 4/2006 | Allard et al. |
| 2006/0097895 A1 | 5/2006 | Reynolds et al. |
| 2006/0167596 A1 | 7/2006 | Bodin et al. |
| 2006/0238414 A1 | 10/2006 | Miyamoto et al. |
| 2006/0249622 A1 | 11/2006 | Steele |
| 2006/0271248 A1 | 11/2006 | Cosgrove et al. |
| 2006/0287824 A1 | 12/2006 | Lin |
| 2007/0021879 A1 | 1/2007 | DelNero et al. |
| 2007/0106473 A1 | 5/2007 | Bodin et al. |
| 2007/0139252 A1 | 6/2007 | Barry et al. |
| 2007/0152814 A1 | 7/2007 | Stefani |
| 2007/0168090 A1 | 7/2007 | DeMarco et al. |
| 2007/0210953 A1 | 9/2007 | Abraham et al. |
| 2008/0033604 A1 | 2/2008 | Margolin |
| 2008/0055149 A1 | 3/2008 | Rees et al. |
| 2008/0125933 A1 | 5/2008 | Williams et al. |
| 2008/0190274 A1 | 8/2008 | Kirkpatrick |
| 2008/0249669 A1 | 10/2008 | Skarman |
| 2008/0255711 A1 | 10/2008 | Matos |
| 2009/0027253 A1 | 1/2009 | Van Tooren et al. |
| 2009/0102630 A1 | 4/2009 | Nordlund et al. |
| 2009/0118896 A1* | 5/2009 | Gustafsson ............ G05D 1/104 701/31.4 |
| 2009/0125221 A1 | 5/2009 | Estkowski et al. |
| 2009/0134981 A1 | 5/2009 | Shafaat et al. |
| 2009/0210109 A1 | 8/2009 | Ravenscroft |
| 2009/0212157 A1 | 8/2009 | Arlton et al. |
| 2009/0222148 A1 | 9/2009 | Knotts et al. |
| 2009/0318138 A1* | 12/2009 | Zeng ............... H04B 7/18506 455/431 |
| 2009/0319100 A1 | 12/2009 | Kale et al. |
| 2010/0004798 A1 | 1/2010 | Bodin et al. |
| 2010/0049376 A1 | 2/2010 | Schultz |
| 2010/0084513 A1 | 4/2010 | Gariepy et al. |
| 2010/0094481 A1 | 4/2010 | Anderson |
| 2010/0094499 A1 | 4/2010 | Anderson |
| 2010/0094981 A1 | 4/2010 | Cordray et al. |
| 2010/0100269 A1 | 4/2010 | Ekhaguere et al. |
| 2010/0121574 A1 | 5/2010 | Ariyur et al. |
| 2010/0127923 A1 | 5/2010 | Harper et al. |
| 2010/0131121 A1 | 5/2010 | Gerlock |
| 2010/0163621 A1 | 7/2010 | Ben-Asher et al. |
| 2010/0198514 A1 | 8/2010 | Miralles |
| 2010/0204867 A1 | 8/2010 | Longstaff |
| 2010/0224732 A1 | 9/2010 | Olson et al. |
| 2010/0250022 A1 | 9/2010 | Hines et al. |
| 2010/0292871 A1 | 11/2010 | Schultz et al. |
| 2010/0292874 A1 | 11/2010 | Duggan et al. |
| 2010/0302359 A1 | 12/2010 | Adams et al. |
| 2010/0332136 A1 | 12/2010 | Duggan et al. |
| 2011/0035149 A1 | 2/2011 | McAndrew et al. |
| 2011/0118907 A1 | 5/2011 | Elkins |
| 2011/0118981 A1 | 5/2011 | Chamlou |
| 2011/0134249 A1 | 6/2011 | Wood et al. |
| 2011/0169943 A1 | 7/2011 | Bachman, II et al. |
| 2012/0016534 A1 | 1/2012 | Lee et al. |
| 2012/0022719 A1 | 1/2012 | Matos |
| 2012/0083947 A1 | 4/2012 | Anderson et al. |
| 2012/0089274 A1 | 4/2012 | Lee et al. |
| 2012/0092208 A1 | 4/2012 | LeMire et al. |
| 2012/0106800 A1 | 5/2012 | Khan et al. |
| 2012/0123628 A1 | 5/2012 | Duggan et al. |
| 2012/0143482 A1 | 6/2012 | Gossen et al. |
| 2012/0167207 A1 | 6/2012 | Beckley et al. |
| 2012/0187243 A1 | 7/2012 | Goldie et al. |
| 2012/0200404 A1 | 8/2012 | Morris |
| 2012/0210853 A1 | 8/2012 | Abershitz et al. |
| 2012/0221168 A1 | 8/2012 | Zeng et al. |
| 2012/0296497 A1 | 11/2012 | Lee et al. |
| 2012/0306663 A1* | 12/2012 | Mudalige ............... G08G 1/163 340/903 |
| 2013/0131976 A1 | 5/2013 | Hubbard et al. |
| 2013/0197734 A1 | 8/2013 | Okura |
| 2013/0197739 A1 | 8/2013 | Gallagher et al. |
| 2013/0211656 A1* | 8/2013 | An ............... G05D 1/0221 701/25 |
| 2014/0142787 A1* | 5/2014 | Tillotson ............... G05D 1/101 701/3 |
| 2014/0156109 A1 | 6/2014 | Estkowski |

OTHER PUBLICATIONS

"Collision Avoidance—Where We Are: Detect See and Avoid versus See and Avoid", UAV MarketSpace Developing Commercial UAV Applications, http://www.uavna.com/uavregulatory/collisionavoidance.html, Dec. 5, 2012, pp. 1-5.

"Drone Hijacking? That's Just the Start of GPS Troubles", Danger Room Wired.com, http://www.wired.com/dangerroom/2012/07/drone-hijacking/all/, Jan. 11, 2013, pp. 1-4.

"Most U.S. Drones Openly Broadcast Secret Video Feeds", Danger Room Wired.com, http://www.wired.com/dangerroom/2012/10/hack-proof-drone, Jan. 11, 2013, pp. 1-4.

"Pentagon Looks to Fix 'Pervasive Vulnerability' in Drones", Danger Room Wired.com, http://www.wired.com/dangerroom/2012/12/darpa-drones/, Jan. 11, 2013, pp. 1-5.

"Robot Quadrotors Perform James Bond Theme", YouTube.com, http://www.youtube.com/watch?vs—sUeGc-8dyk, Feb. 28, 2012.

"Unmanned aerial vehicle", Wikipedia, http://en.wikipedia.org/wiki/Unmanned_aerial_vehicle, Dec. 3, 2012, pp. 1-21.

"Vijay Kumar: Robots that fly . . . and cooperate", TED.com; http://www.ted.com/talks/vjay_kumar_robots_that_fly_and_cooperate.htm, Mar. 2012.

Albaker; Rahim; "Autonomous unmanned aircraft collision avoidance system based on geometric intersection", International Journal of the Physical Sciences, Feb. 4, 2011, vol. 6, pp. 391-401.

Anderson, Chris; "How I Accidentally Kickstarted the Domestric Drone Boom", Danger Room Wired.com, http://www.wired.com/dangerroom/2012/06/ff_drones/all/, Dec. 6, 2012, pp. 1-10.

Bai; Hsu; Kochenderfer; Lee; "Unmanned Aircraft Collision Avoidance using Continuous-State POMDPs", National University of Singapore School of Computing;, https://www1.comp.nus.edu.sg/~leews/publications/rss11.pdf, Dec. 3, 2012.

(56) References Cited

OTHER PUBLICATIONS

Dean, Stephen; "Drone crashes into SWAT team tank during police test near Houston", Examiner.com, http://www.examiner.com/page-one-in-houston/drone-crashes-into-swat-team-tank-during-police-test-near-houston, Mar. 20, 2012, pp. 1-4.
Federal Aviation Administration; DOT Regs 14-CFR-91 Subchapter-F Subpart-B Flight Rules; Dec. 15, 2013 pp. 711-738.
Geyer; Singh; Chamerlain; "Avoiding Collisions Between Aircraft: State of the Art and Requirements for UAVs operating in Civilian Airspace", Robotics Institute, Carnegie Mellon University, Jan. 2008, pp. 1-19 Pittsburgh, Pennsylvania.
Gruen, Armin; "First Civilian Photogrammetric UAV Flight Over Singapore", Sensors & Systems, http://sensorsandsystems.com/article/features/26474-first-civilian-photogrammetric-uav-flig, Mar. 26, 2012; pp. 1-7.
Leopold, George; "U.S. to begin testing future drones", EE Times, http://www.eetimes.com/General/PrintView/4237809, Mar. 9, 2012, pp. 1.
Montgomery; Johnson; Roumeliotis; Matthies; "The JPL Autonomous Helicopter Testbed: A Platform for Planetary Exploration Technology Research and Development", Journal of Field Robotics, vol. 23(3), Dec. 3, 2012, Wiley Periodicals, Inc.
Subbaraman, Nidhi; "Drones over America: How unmanned fliers are already helping cops", NBC News.com, http://www.nbcnews.com/technology/drones-over-america-how-unmanned-fliers-are-already-helping-cops-1C9135554, Mar. 30, 201, pp. 1-5.
Zarzhitsky; Dimitri V.; "Physic-Based Approach to Chemical Source Localization Using Mobile Robotic Swarms"; a dissertation submitted to the Department of Computer Science and The Graduate School of The University of Wyoming; bearing a date of Aug. 2008; pp. 1-299; ProQuest LLC; UMI Microform 3338814; Ann Arbor; Michigan.

\* cited by examiner

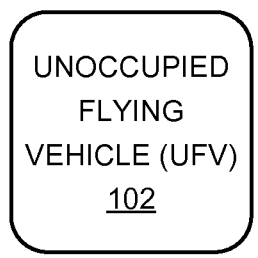
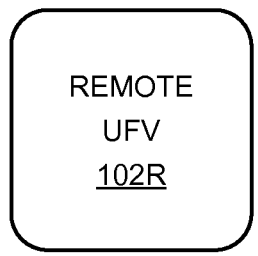
FIG. 1
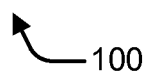

FIXED WING
UFV
102a

ROTARY WING
UFV
102b

ORNITHOPTER
UFV
102c

LIGHTER-
THAN-AIR
(LTA)
UFV
102d

TILT-WING
UFV
102e

HYBRID
UFV
102f

OTHER
UFV
102g

UNOCCUPIED
FLYING
VEHICLE (UFV)
102

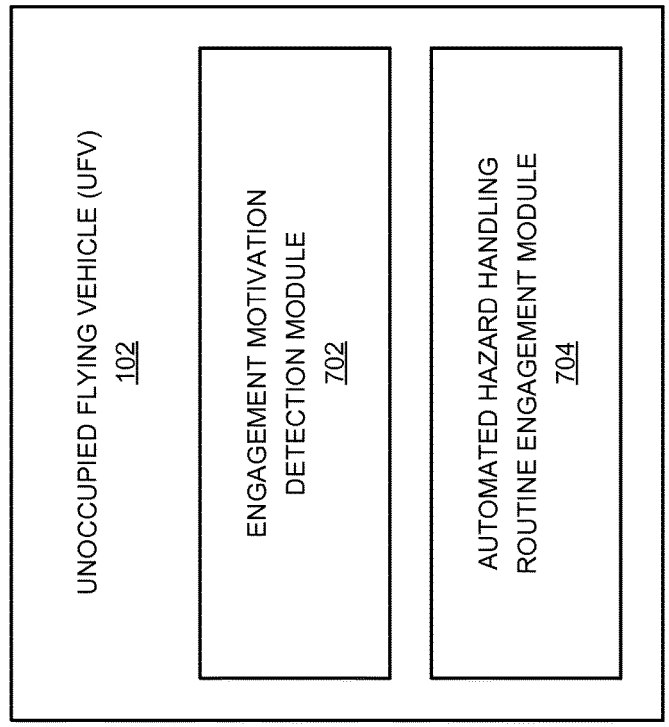

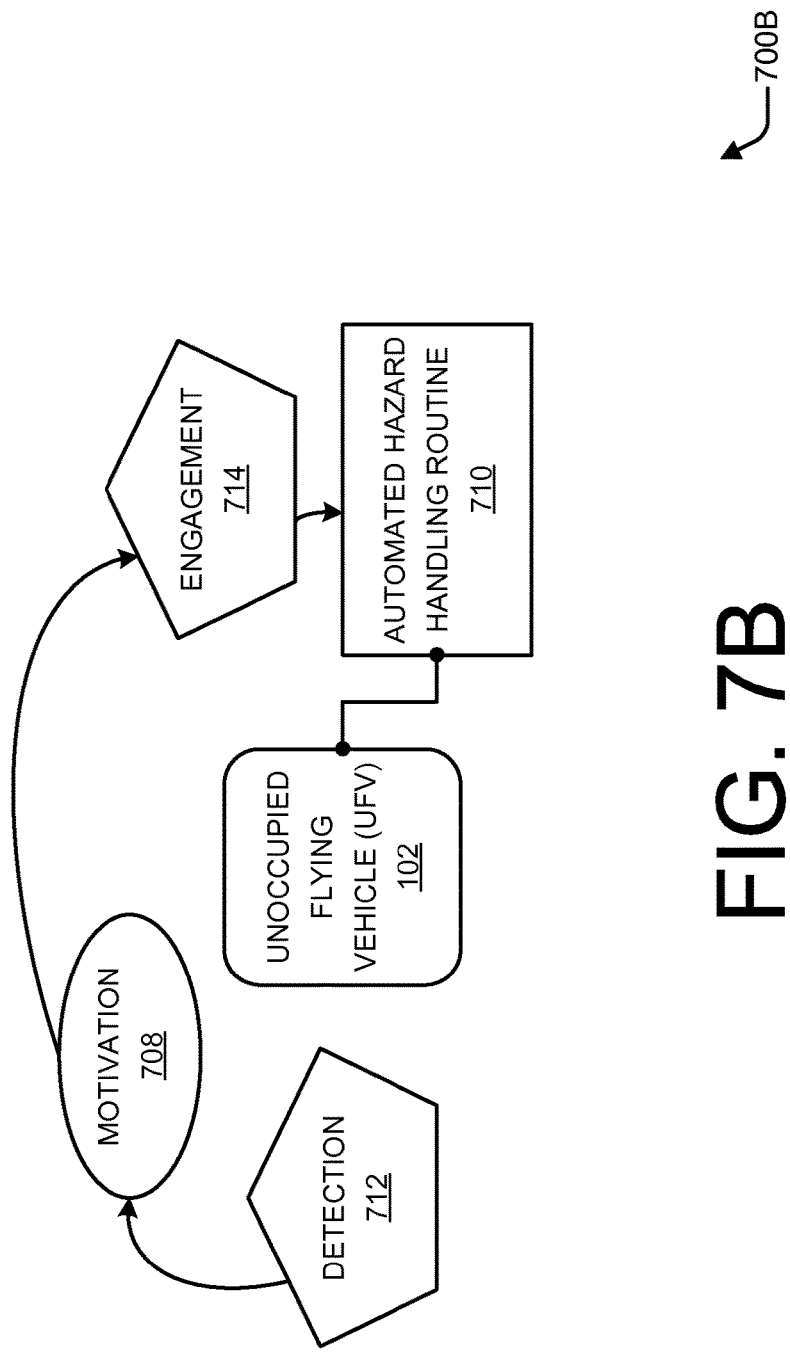

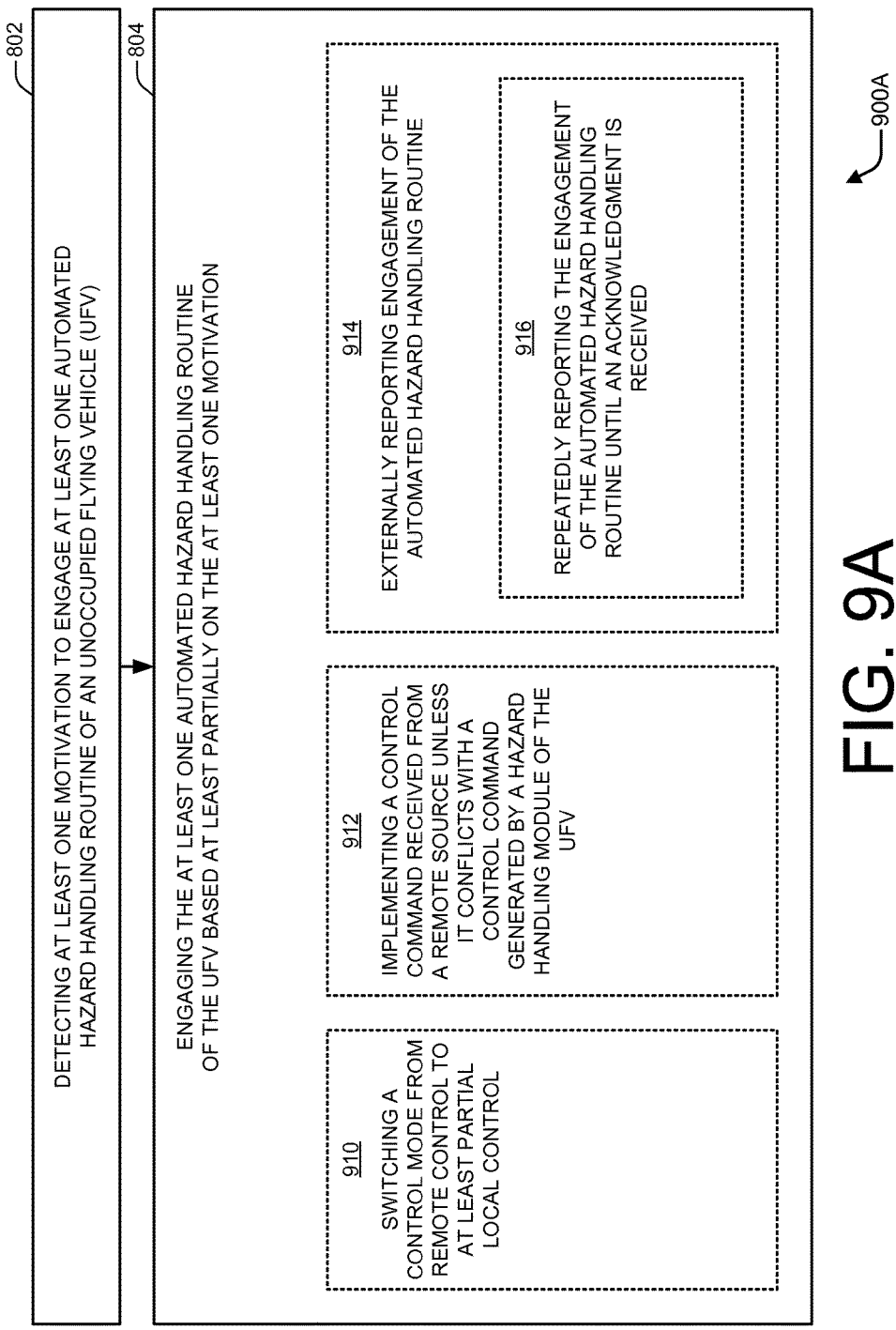

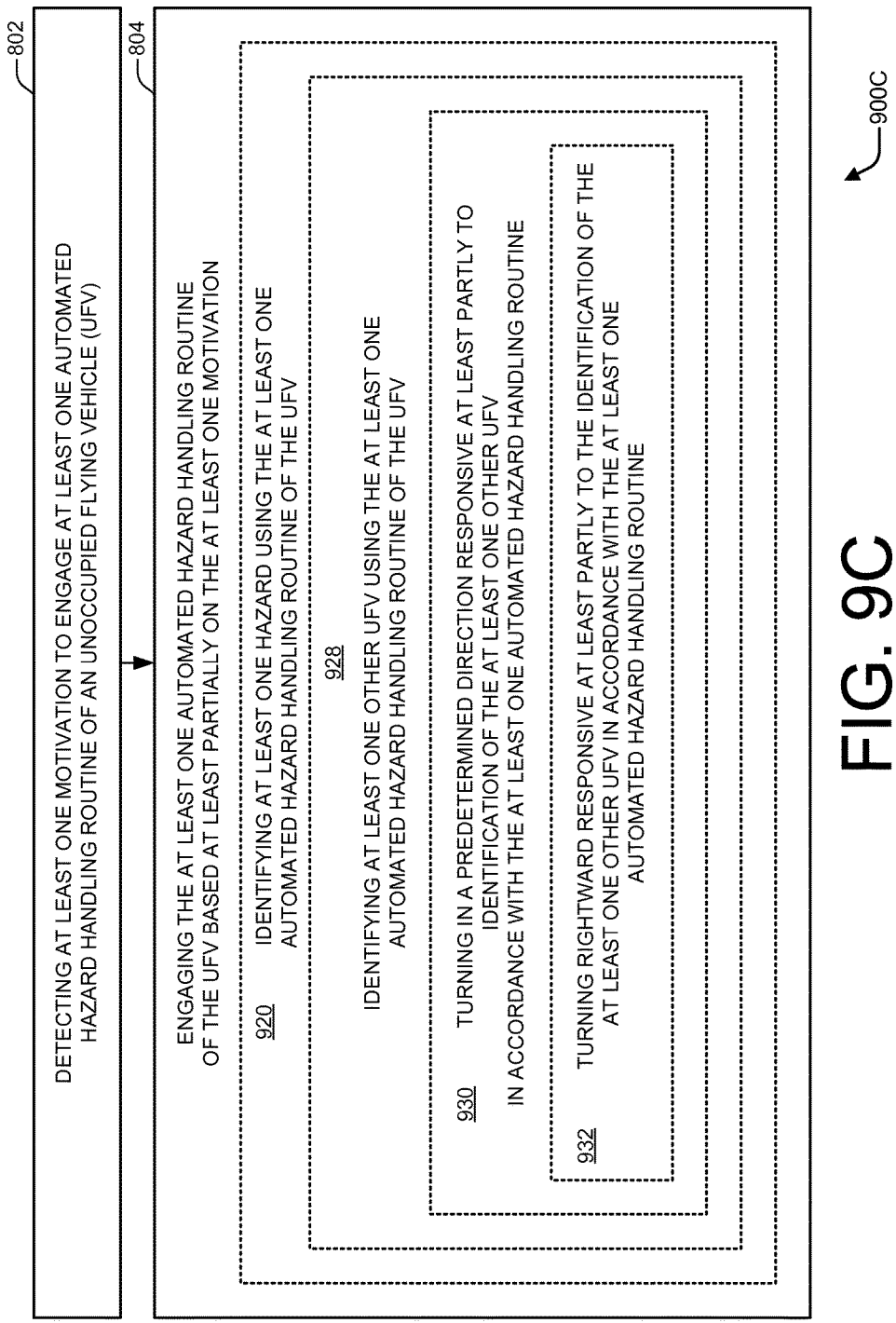

AUTOMATED HAZARD HANDLING ROUTINE ENGAGEMENT

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS (1) For purposes of the USPTO extra-statutory requirements, the present application constitutes a continuation-in-part of U.S. patent application Ser. No. 13/720,694, entitled "Inter-Vehicle Communication for Hazard Handling for an Unoccupied Flying Vehicle (UFV)", naming Royce A. Levien, Richard T. Lord, Robert W. Lord, Mark A. Malamud, John D. Rinaldo, Jr., and Lowell L. Wood, Jr. as inventors, filed 19 Dec. 2012, which is currently co-pending or is an application of which a currently co-pending application is entitled to the benefit of the filing date.

(2) For purposes of the USPTO extra-statutory requirements, the present application constitutes a continuation-in-part of U.S. patent application Ser. No. 13/722,874, entitled "Unoccupied Flying Vehicle (UFV) Inter-Vehicle Communication for Hazard Handling", naming Royce A. Levien, Richard T. Lord, Robert W. Lord, Mark A. Malamud, John D. Rinaldo, Jr., and Lowell L. Wood, Jr. as inventors, filed 20 Dec. 2012, which is currently co-pending or is an application of which a currently co-pending application is entitled to the benefit of the filing date.

(3) For purposes of the USPTO extra-statutory requirements, the present application constitutes a continuation-in-part of U.S. patent application Ser. No. 13/728,642, entitled "Inter-Vehicle Flight Attribute Communication for an Unoccupied Flying Vehicle (UFV)", naming Royce A. Levien, Richard T. Lord, Robert W. Lord, Mark A. Malamud, John D. Rinaldo, Jr., and Lowell L. Wood, Jr. as inventors, filed 27 Dec. 2012, which is currently co-pending or is an application of which a currently co-pending application is entitled to the benefit of the filing date.

(4) For purposes of the USPTO extra-statutory requirements, the present application constitutes a continuation-in-part of U.S. patent application Ser. No. 13/730,202, entitled "Base Station Control for an Unoccupied Flying Vehicle (UFV)", naming Royce A. Levien, Richard T. Lord, Robert W. Lord, Mark A. Malamud, John D. Rinaldo, Jr., and Lowell L. Wood, Jr. as inventors, filed 28 Dec. 2012, which is currently co-pending or is an application of which a currently co-pending application is entitled to the benefit of the filing date.

(5) For purposes of the USPTO extra-statutory requirements, the present application constitutes a continuation-in-part of U.S. patent application Ser. No. 13/731,407, entitled "Automated Hazard Handling Routine Activation", naming Royce A. Levien, Richard T. Lord, Robert W. Lord, Mark A. Malamud, John D. Rinaldo, Jr., and Lowell L. Wood, Jr. as inventors, filed 31 Dec. 2012 (on same date herewith), which is currently co-pending or is an application of which a currently co-pending application is entitled to the benefit of the filing date.

(6) For purposes of the USPTO extra-statutory requirements, the present application constitutes a continuation-in-part of U.S. patent application Ser. No. 13/731,450, entitled "Collision Targeting for an Unoccupied Flying Vehicle (UFV)", naming Royce A. Levien, Richard T. Lord, Robert W. Lord, Mark A. Malamud, John D. Rinaldo, Jr., and Lowell L. Wood, Jr. as inventors, filed 31 Dec. 2012 (on same date herewith), which is currently co-pending or is an application of which a currently co-pending application is entitled to the benefit of the filing date.

(7) For purposes of the USPTO extra-statutory requirements, the present application constitutes a continuation-in-part of U.S. patent application Ser. No. 13/731,721, entitled "Collision Targeting for Hazard Handling", naming Royce A. Levien, Richard T. Lord, Robert W. Lord, Mark A. Malamud, John D. Rinaldo, Jr., and Lowell L. Wood, Jr. as inventors, filed 31 Dec. 2012 (on same date herewith), which is currently co-pending or is an application of which a currently co-pending application is entitled to the benefit of the filing date.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BRIEF DESCRIPTION OF THE FIGURES

FIG. 1 is a schematic diagram of at least one unoccupied flying vehicle (UFV) in accordance with certain example embodiments.

FIG. 2 is a schematic diagram of example realizations for at least one UFV in accordance with certain example embodiments.

FIG. 7A is a schematic diagram that includes at least one example machine, such as an unoccupied flying vehicle (UFV), that is capable of handling scenarios for automated hazard handling routine engagement in accordance with certain example embodiments.

FIGS. 7B-7E are schematic diagrams that include at least one example machine and that depict example scenarios for implementing automated hazard handling routine engagement in accordance with certain example embodiments.

FIGS. 9A-9D depict example additions or alternatives for a flow diagram of FIG. 8A in accordance with certain example embodiments.

DETAILED DESCRIPTION

Figure 3A:
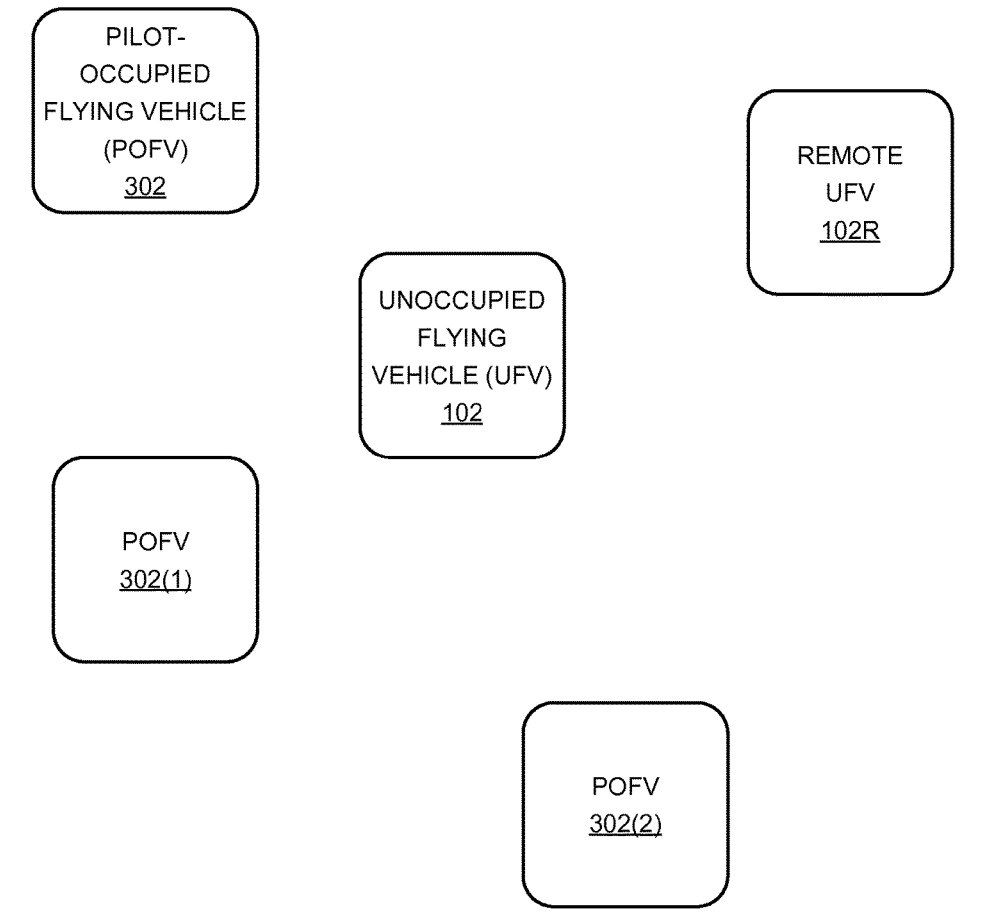
FIGS. 3A-3C are schematic diagrams of example UFV hazard handling scenarios or environments in accordance with certain example embodiments.
Figure 3A:
Figure 3A:
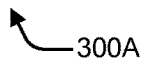

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a schematic diagram 100 of at least one unoccupied flying vehicle (UFV) in accordance with certain example embodiments. As shown in FIG. 1, by way of example but not limitation, schematic diagram 100 may include at least one unoccupied flying vehicle (UFV) 102 or at least one remote UFV 102R. For certain example implementations, any particular UFV: may be, comprise, or include a UFV 102, such as a local UFV, or may be, comprise, or include a remote UFV 102R. A given UFV scenario may be considered, analyzed, operated, viewed, or a combination thereof, etc. from a perspective of at least one local UFV 102 with regard to one or more remote UFVs 102R. Disclosure herein or in the accompany drawings, which form a part hereof, that is directed to a UFV 102 may additionally or alternatively be applicable to a remote UFV 102R, unless context dictates otherwise. However, claimed subject matter is not limited to any particular described embodiments, implementations, examples, etc.

For certain example embodiments, a UFV 102 may comprise or include a vehicle that is not capable of being occupied by a human pilot (e.g., due to size, shape, power, atmospheric pressure, or a combination thereof, etc. constraints), a vehicle that is not designed to seat or otherwise safely support a person, a vehicle that is not controllable by an onboard human pilot, a vehicle that is being autonomously controlled at least partially by at least one onboard module, a vehicle that is being autonomously controlled at least partially by at least one off-board module, a combination thereof, or so forth. For certain example embodiments, a UFV 102 may be at least comparable to or may comprise or include at least a portion of any one or more of: an unmanned aerial vehicle (UAV), a remotely piloted vehicle (RPV), an unmanned combat air vehicle (UCAV), an unmanned aircraft (UA), a drone, an optionally-piloted vehicle (OPV) that is not currently being controlled by an on-board pilot, a remotely piloted aircraft (RPA), a remotely operated aircraft (ROA), a radio-controlled aircraft (R/C aircraft), an unmanned-aircraft vehicle system (UAVS), an unmanned aircraft system (UAS), a small unmanned air system (sUAS), a combination thereof, or so forth. For certain example embodiments, a UFV 102 may fly through a fluid (e.g., the earth's atmosphere or the air), through at least a partial vacuum (e.g., space or near-earth orbit), a combination thereof, or so forth. However, claimed subject matter is not limited to any particular described embodiments, implementations, examples, etc.

FIG. 2 is a schematic diagram 200 of example realizations for at least one UFV in accordance with certain example embodiments. As shown in FIG. 2, by way of example but not limitation, schematic diagram 200 may include at least one unoccupied flying vehicle (UFV) 102, at least one fixed wing UFV 102a, at least one rotary wing UFV 102b, at least one ornithopter UFV 102c, at least one lighter-than-air (LTA) UFV 102d, at least one tilt-wing UFV 102e, at least one hybrid UFV 102f, or at least one other type of UFV 102g. However, claimed subject matter is not limited to any particular described embodiments, implementations, examples, etc.

For certain example embodiments, a UFV 102 may be realized as described by any one or more of the examples in this paragraph. First, a UFV 102 may be realized as a fixed wing UFV 102a, such as a propeller-driven biplane or a jet plane. Second, a UFV 102 may be realized as a rotary wing UFV 102*b*, such as a helicopter or a gyrodyne. Third, a UFV 102 may be realized as an ornithopter UFV 102*c*, such as small craft that has flapping wings like an animal (e.g., like a dragonfly, bee, bird, or bat, etc.). Fourth, a UFV 102 may be realized as an LTA UFV 102*d*, such as a blimp, a balloon, or a dirigible. Fifth, a UFV 102 may be realized as a tilt-wing UFV 102*e*, such as a propeller-driven airplane with wings that rotate at least during vertical takeoff or landing. Sixth, a UFV 102 may be realized as a hybrid UFV 102*f* that combines one or more capabilities or structural characteristics of at least one fixed wing UFV 102*a*, at least one rotary wing UFV 102*b*, at least one ornithopter UFV 102*c*, at least one LTA UFV 102*d*, at least one tilt-wing UFV 102*e*, or at least one other UFV 102*g*. Seventh, a UFV 102 may be realized as an other type of UFV 102*g*, such as a tilt-rotor craft, a submarine, a rocket, a spaceship, a satellite, a vertical take-off and landing (VTOL) craft, a combination thereof, or so forth. However, claimed subject matter is not limited to any particular described embodiments, implementations, examples, etc.

For certain example embodiments, a UFV 102 may additionally or alternatively be realized so as to have one or more features, capabilities, structural characteristics, or a combination thereof, etc. as described by any one or more of the examples in this paragraph. First, a UFV 102 may include one rotor, two rotors (e.g., in a tandem, transverse, coaxial, or intermeshing, etc. configuration), three rotors, four rotors (e.g., a quadcopter, or a quadrotor, etc.), a combination thereof, or so forth. Second, a UFV 102 may include a propeller engine, a jet engine, an electric engine, a rocket engine, a ramjet or scramjet engine, a combination thereof, or so forth. Third, a UFV 102 may have at least one wing (e.g., a monoplane, a biplane, or a triplane, etc. in a stacked or tandem wing configuration), which may include a straight wing, a swept wing, a delta wing, a variable sweep wing, a combination thereof, or so forth. Fourth, a UFV 102 may be realized as having a fuselage, as having a flying wing structure, as having a blended-wing body, a combination thereof, or so forth. However, claimed subject matter is not limited to any particular described embodiments, implementations, examples, etc.

Figure 3B:
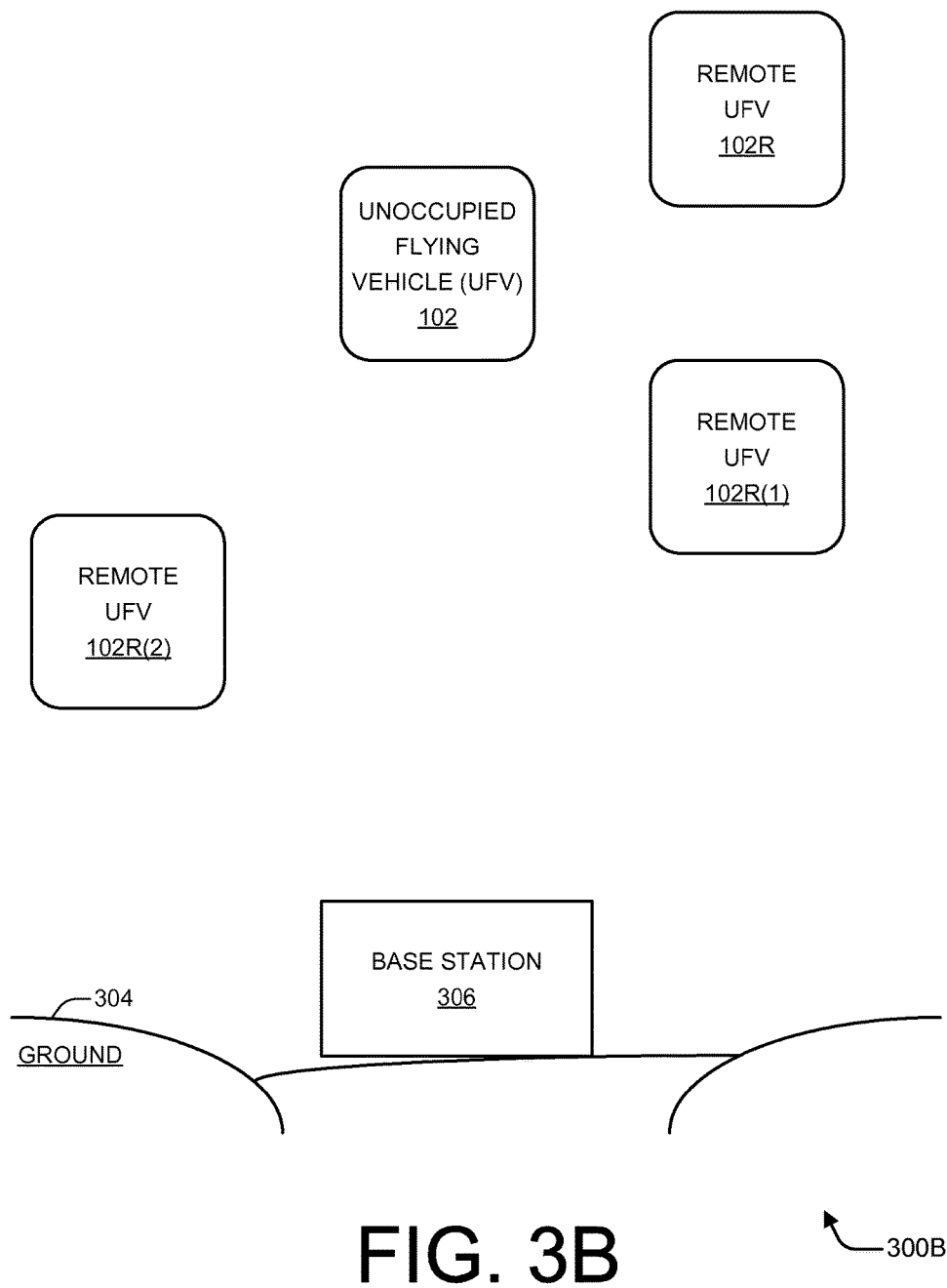
Figure 3C:
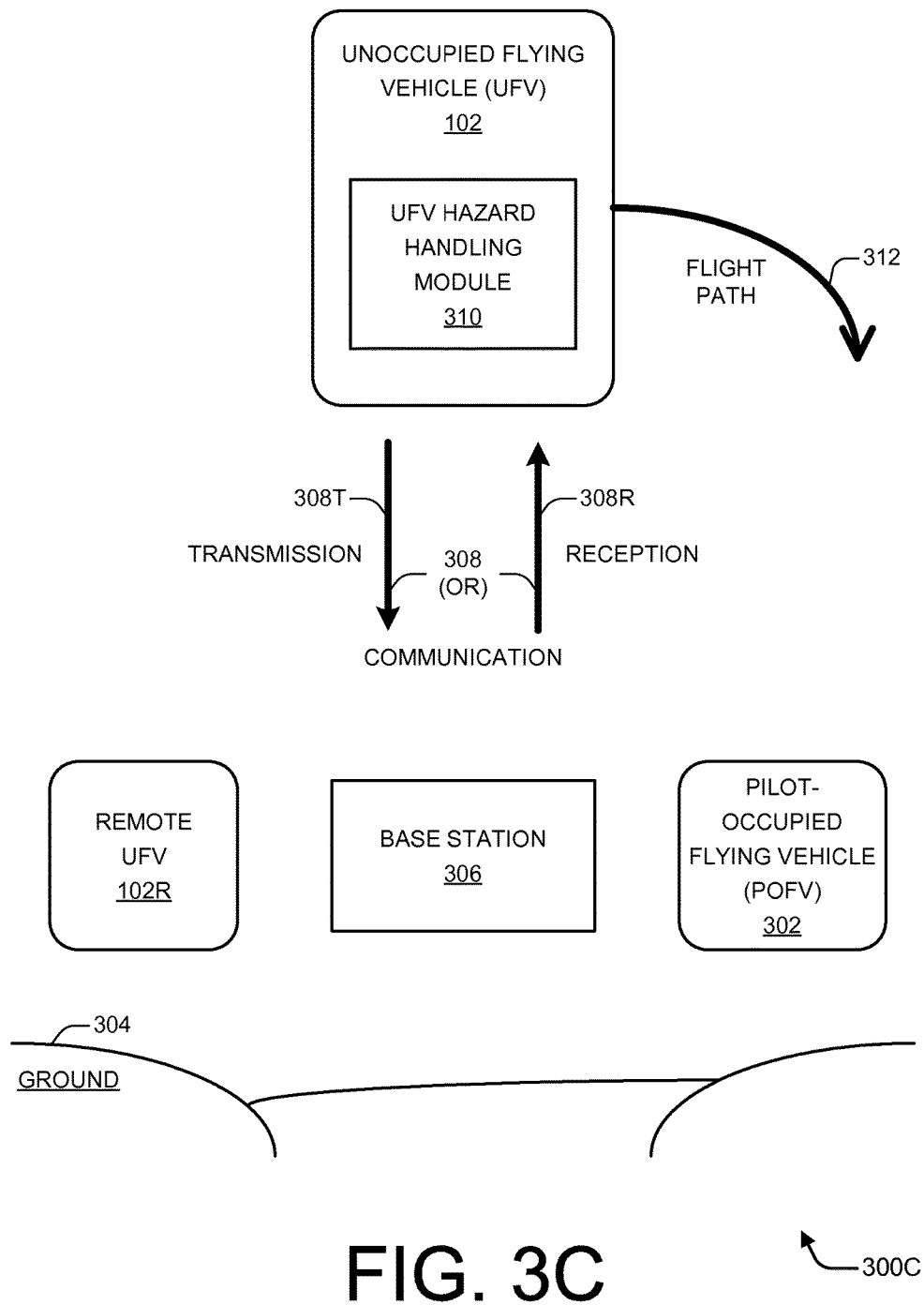

FIGS. 3A-3C are schematic diagrams 300A-300C, respectively, of example UFV hazard handling scenarios or environments in accordance with certain example embodiments. As shown in FIGS. 3A-3C, by way of example but not limitation, each of schematic diagrams 300A-300C may include at least one unoccupied flying vehicle (UFV) 102, at least one remote UFV 102R, or ground 304. In each scenario or environment of schematic diagrams 300A-300C, at least one UFV 102 may be flying above ground 304 and endeavoring to detect, sense, avoid, manage, mitigate, communicate about, coordinate over, eliminate, predict, remove, account for, remedy aftermath caused by, cooperate to address, or a combination thereof, etc. at least one hazard. For certain example embodiments, hazards may include, but are not limited to, other unoccupied flying vehicles, occupied flying vehicles, ground 304, buildings or other structures (not shown) on ground 304, moving objects, weather conditions, stationary objects, some combination thereof, or so forth. A UFV 102 may be attempting to accomplish a mission, an objective, a task, a combination thereof, or so forth. In operation, a UFV may be in communication with at least one remote UFV, at least one pilot-occupied flying vehicle (POFV), at least one base station (not shown in FIG. 3A), at least one other entity, a combination thereof, or so forth. Although scenarios or environments of schematic diagrams 300A-300C may be shown in the drawings or described herein individually or separately, at least portions or aspects of such scenarios or environments may be implemented or may otherwise occur at least partially jointly, simultaneously in time, overlapping in space, as part of a single or extended operational theater, a combination thereof, or so forth. However, claimed subject matter is not limited to any particular described embodiments, implementations, examples, etc.

FIG. 3A is a schematic diagram 300A of an example UFV hazard handling scenario or environment in accordance with certain example embodiments. As shown in FIG. 3A, by way of example but not limitation, schematic diagram 300A may include at least one UFV 102, at least one remote UFV 102R, at least one pilot-occupied flying vehicle (POFV) 302, or ground 304. More specifically, schematic diagram 300A may include a POFV 302, a first POFV 302(1), or a second POFV 302(2). For certain example embodiments, a POFV 302 may comprise or include a vehicle that is currently being controlled by an onboard human pilot. For certain example embodiments, ground 304 may include or comprise at least a portion of the earth, a landscape, a cityscape, a prairie, a hill, a mountain, a combination thereof, or so forth. However, claimed subject matter is not limited to any particular described embodiments, implementations, examples, etc.

FIG. 3B is a schematic diagram 300B of another example UFV hazard handling scenario or environment in accordance with certain example embodiments. As shown in FIG. 3B, by way of example but not limitation, schematic diagram 300B may include at least one UFV 102, at least one remote UFV 102R, ground 304, or at least one base station 306. More specifically, schematic diagram 300B may include a remote UFV 102R, a first remote UFV 102R(1), or a second remote UFV 102R(2). For certain example embodiments, a base station 306 may comprise or include a machine that is adapted to at least partially control or is capable of controlling a UFV 102 from a distance via at least one wireless communication (not explicitly shown in FIG. 3B). For certain example implementations, a base station 306 may be fixed within a building or on a mobile ground vehicle, may be capable of being hand-held, may be incorporated into or as part of another flying vehicle, a combination thereof, or so forth. For certain example implementations, a base station 306 may include or comprise a handheld controller (e.g., as may be used with an R/C model plane) for actual or near line-of-sight control, a workstation-sized or brief-case-sized controller that is mobile for operation out in the field (e.g., for police or corporate purposes), a larger apparatus that is typically stationary or may be housed in a secret or private building miles from an operational theater (e.g., for military or governmental purposes), a server-sized or distributed apparatus that provides control for a swarm of UFVs (e.g., for careful monitoring of a construction, agricultural, or warehouse site), some combination thereof, or so forth. For certain example embodiments, a base station 306 may be controlling at least one UFV, such as first remote UFV 102R(1) or second remote UFV 102R(2), while not controlling at least one other UFV, such as UFV 102 or remote UFV 102R (although it may be monitoring a UFV without controlling it). However, claimed subject matter is not limited to any particular described embodiments, implementations, examples, etc.

FIG. 3C is a schematic diagram 300C of another example UFV hazard handling scenario or environment in accordance with certain example embodiments. As shown in FIG. 3C, by way of example but not limitation, schematic diagram 300C may include at least one UFV 102, at least one remote UFV 102R, at least one POFV 302, ground 304, at least one base station 306, at least one communication 308, or at least one flight path 312. More specifically, UFV 102 may include at least one UFV hazard handling module 310, or communication 308 may include at least one transmission 308T or at least one reception 308R. For certain example embodiments, a UFV 102 may transmit at least one transmission 308T to or receive at least one reception 308R from at least one of a remote UFV 102R, a POFV 302, a base station 306, a combination thereof, or so forth. For certain example embodiments, a UFV hazard handling module 310 may affect or at least partially control a flight path of a UFV 102 at least partially based on at least one of a transmission 308T or a reception 308R. For certain example embodiments, a flight path 312 may comprise or include any one or more of: a flight trajectory, a heading, a speed, a direction, a velocity, an acceleration, a position, an altitude, a stability level, a destination, a two-dimensional course or a three-dimensional course through air or space, a course through a spherical geometrical space, a time or times at which a course is to be traversed, a time or times at which one or more positions or one or more altitudes are to be attained, a time or times at which other flight characteristic(s) are to be attained, extrapolated position-time stamp pairs based on current flight characteristic(s), extrapolated altitude-time stamp pairs based on current flight characteristic(s), a combination thereof, or so forth. However, claimed subject matter is not limited to any particular described embodiments, implementations, examples, etc.

For certain example embodiments, a remote UFV 102R, a POFV 302, or a base station 306 may engage in at least one communication 308, such as a transmission 308T or a reception 308R, with at least one UFV 102. Although not explicitly shown in schematic diagram 300C, for certain example embodiments, each of remote UFV 102R, POFV 302, or base station 306 may additionally or alternatively exchange at least one communication 308 with at least one other of remote UFV 102R, POFV 302, or base station 306. For certain example implementations, a remote UFV 102R may transmit at least one transmission 308T to or receive at least one reception 308R from at least one of a UFV 102, another remote UFV 102R, a POFV 302, a base station 306, a combination thereof, or so forth. For certain example implementations, a POFV 302 may transmit at least one transmission 308T to or receive at least one reception 308R from at least one of a UFV 102, a remote UFV 102R, another POFV 302, a base station 306, a combination thereof, or so forth. For certain example implementations, a base station 306 may transmit at least one transmission 308T to or receive at least one reception 308R from at least one of a UFV 102, a remote UFV 102R, a POFV 302, another base station 306, a combination thereof, or so forth. However, claimed subject matter is not limited to any particular described embodiments, implementations, examples, etc.

Figure 4:
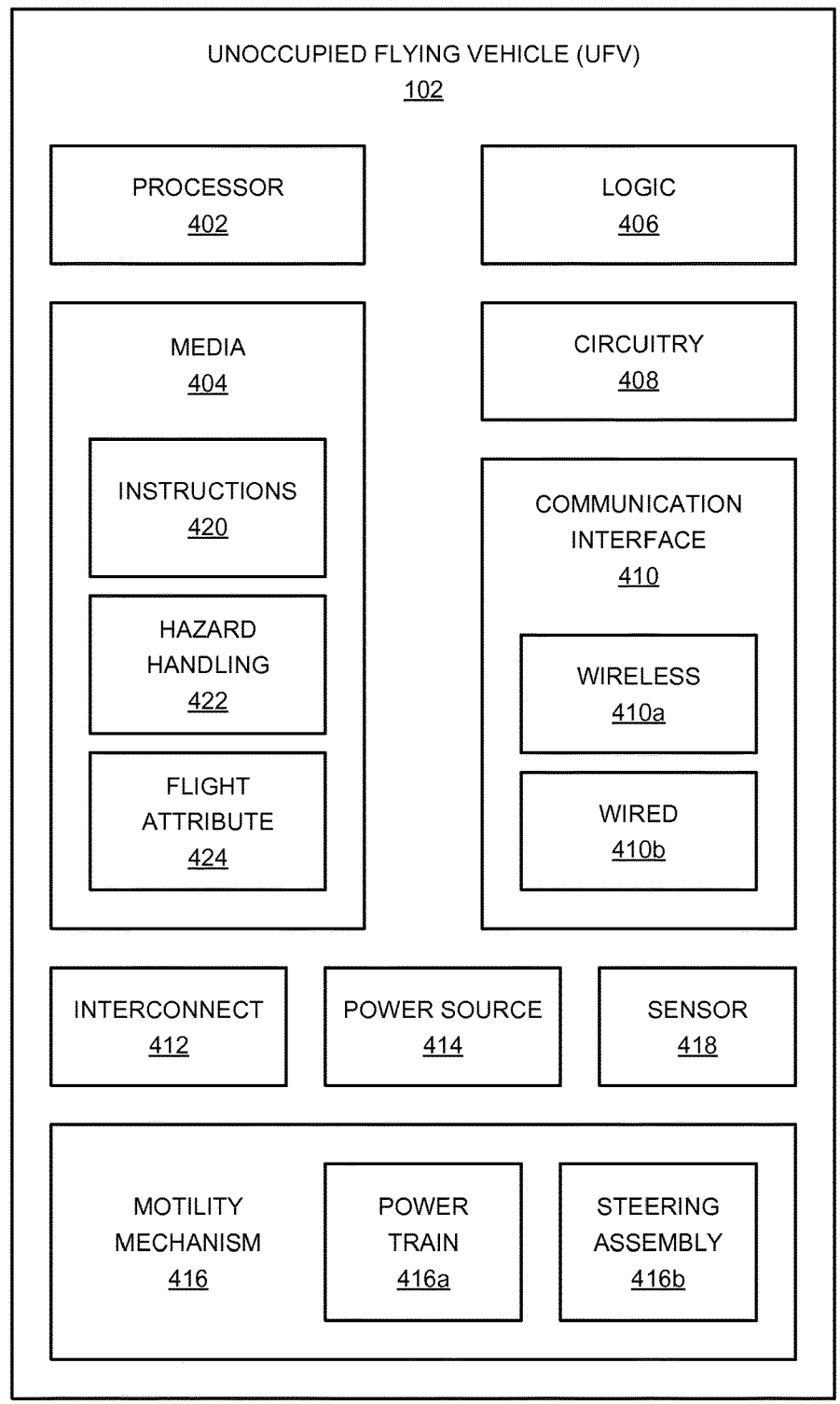
FIG. 4 is a schematic diagram of an example unoccupied flying vehicle (UFV) including one or more example components in accordance with certain example embodiments.

FIG. 4 is a schematic diagram 400 of an example unoccupied flying vehicle (UFV) including one or more example components in accordance with certain example embodiments. As shown in FIG. 4, a UFV 102 may include one or more components such as: at least one processor 402, one or more media 404, logic 406, circuitry 408, at least one communication interface 410, at least one interconnect 412, at least one power source 414, at least one motility mechanism 416, one or more sensors 418, some combination thereof, or so forth. Furthermore, as shown in schematic diagram 400, one or more media 404 may include one or more instructions 420, at least one hazard handling 422 routine, one or more flight attributes 424, some combination thereof, or so forth; a communication interface 410 may include at least one wireless communication interface 410a, at least one wired communication interface 410b, some combination thereof, or so forth; or a motility mechanism 416 may include at least one power train 416a, at least one steering assembly 416b, some combination thereof, or so forth. However, a UFV 102 may alternatively include more, fewer, or different component(s) from those that are illustrated without departing from claimed subject matter.

For certain example embodiments, a UFV 102 may include or comprise at least one machine that is capable of flight, flight control processing, (local) flight control, some combination thereof, or so forth. UFV 102 may include, for example, a computing platform or any electronic device having at least one processor or memory. Processor 402 may include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, some combination thereof, or so forth. Media 404 may bear, store, contain, include, provide access to, or a combination thereof, etc. instructions 420, which may be executable by a processor 402; at least one hazard handling 422 routine, which may at least partially form at least a portion of instructions 420; one or more flight attributes 424; some combination thereof; or so forth. Instructions 420 may include or comprise, by way of example but not limitation, a program, a module, an application or app (e.g., that is native, that runs in a browser, that runs within a virtual machine, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. Media 404 may include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions, one or more hazard handling routines, one or more flight attributes, some combination thereof, or so forth.

For certain example embodiments, execution of instructions 420 by one or more processors 402 may transform at least a portion of UFV 102 into a special-purpose computing device, apparatus, platform, some combination thereof, or so forth. Instructions 420 may include, for example, instructions that are capable of realizing at least a portion of one or more flow diagrams, methods, processes, procedures, operations, functionality, technology, mechanisms, or a combination thereof, etc. that are described herein or illustrated in the accompanying drawings. A hazard handling 422 routine may include, for example, instructions that are capable of realizing at least a portion of one or more flow diagrams, methods, processes, procedures, operations, functionality, technology, mechanisms, or a combination thereof, etc. that are described herein or illustrated in the accompanying drawings or that are directed toward detecting, sensing, avoiding, managing, mitigating, communicating about, coordinating over, eliminating, predicting, removing, accounting for, remedying aftermath caused by, cooperating to address, or a combination thereof, etc. at least one hazard. A flight attribute 424 may include, for example, data describing or representing at least one flight attribute of a UFV, such as one or more flight characteristics, one or more flight capabilities, a combination thereof, or so forth. Additionally or alternatively, at least a portion of flight attributes 424 may be at least partially accessible to or integrated with hazard handling 422.

For certain example embodiments, logic 406 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings. Circuitry 408 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 408 includes at least one physical or hardware component or aspect.

For certain example embodiments, one or more communication interfaces 410 may provide one or more interfaces between UFV 102 and another machine or a person/operator. With respect to a person/operator, a communication interface 410 may include, by way of example but not limitation, a screen, a speaker, keys/buttons, a microphone, or other person-device input/output apparatuses. A wireless communication interface 410a or a wired communication interface 410b may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, or a combination thereof, etc.), a physical or logical network adapter or port, a frequency converter, a baseband processor, a photoreceptor, or a combination thereof, etc. to communicate wireless signals or wired signals via one or more wireless communication links or wired communication links, respectively. Communications with at least one communication interface 410 may enable transmitting, receiving, or initiating of transmissions, just to name a few examples.

For certain example embodiments, at least one interconnect 412 may enable signal communication between or among components of UFV 102. Interconnect 412 may include, by way of example but not limitation, one or more buses, channels, switching fabrics, some combination thereof, or so forth. Although not explicitly illustrated in FIG. 4, one or more components of UFV 102 may be coupled to interconnect 412 via a discrete or integrated interface. By way of example only, one or more interfaces may couple a communication interface 410 or a processor 402 to at least one interconnect 412. For certain example embodiments, at least one power source 414 may provide power to one or more components of UFV 102. Power source 414 may include, by way of example but not limitation, a battery, a power connector, a solar power source or charger, a mechanical power source or charger, a fuel source, a generator, an engine, some combination thereof, or so forth.

For certain example embodiments, at least one sensor 418 may sense, produce, or otherwise provide at least one sensor value. Sensors 418 may include, by way of example only, a camera, a microphone, an accelerometer, a thermometer, a satellite positioning system (SPS) sensor, a barometer, a humidity sensor, a compass, an altimeter, an airspeed detector, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), some combination thereof, or so forth. Values provided by at least one sensor 418 may include, by way of example but not limitation, an image/video, a sound recording, an acceleration value, a temperature, one or more SPS coordinates, a barometric pressure, a humidity level, a compass direction, an altitude, an airspeed, a gyroscopic value, a magnetic reading, a pressure value, an oscillation value, an ambient light reading, inertial readings, touch detections, proximate object location, flex detections, some combination thereof, or so forth.

For certain example embodiments, a motility mechanism 416 may enable UFV 102 to fly, overcome gravitational forces, overcome wind resistance or drag, accelerate, avoid a hazard, some combination thereof, or so forth. For certain example embodiments, a power train 416a of a motility mechanism 416 may include one or more components that work separately or at least partially together to transform or convert stored energy into kinetic energy in order to propel UFV 102. For certain example implementations, a power train 416a may include at least one engine, at least one transmission, one or more blades or propellers, at least one motor, some combination thereof, or so forth. For certain example embodiments, a steering assembly 416b of a motility mechanism 416 may include one or more components that work separately or at least partially together to transform propulsive kinetic energy into forward, backward, up, down, right, left, a combination thereof, etc. movement or some other directionality change for a UFV. For certain example implementations, a steering assembly 416b may include at least one aileron, at least one rudder, at least one elevator, one or more blades or propellers, at least one transmission that routes power to different motors or other propulsive components, at least one rotor disk tilter, at least one blade pitch angle changer, or a combination thereof, or so forth. Although illustrated separately in schematic diagram 400, power train 416a and steering assembly 416b may be implemented at least partially jointly to realize motility mechanism 416.

However, claimed subject matter is not limited to any particular described embodiments, implementations, examples, or so forth. For instance, it should be understood that for certain example implementations components that are illustrated separately in FIG. 4 may not necessarily be separate or mutually exclusive. For example, a given component may provide multiple functionalities. By way of example only, a single component such as a photodetector may function as a wireless communication interface 410a or a sensor 418. Additionally or alternatively, one or more instructions 420 may function to realize or embody at least part of hazard handling 422 or flight attributes 424.

It should also be understood that for certain example implementations components that are illustrated in schematic diagram 400 or described herein may or may not be integral with or integrated into or onto a UFV 102. For example, a component may be removably connected to a UFV 102, a component may be wirelessly coupled to a UFV 102, some combination thereof, or so forth. By way of example only, instructions 420 may be stored on a removable card having at least one medium 404. Additionally or alternatively, at least a portion of a motility mechanism 416, such as an engine or a fuel source, may be detachable from or replaceable with a UFV 102. However, claimed subject matter is not limited to any particular described embodiments, implementations, examples, etc.

Figure 5:
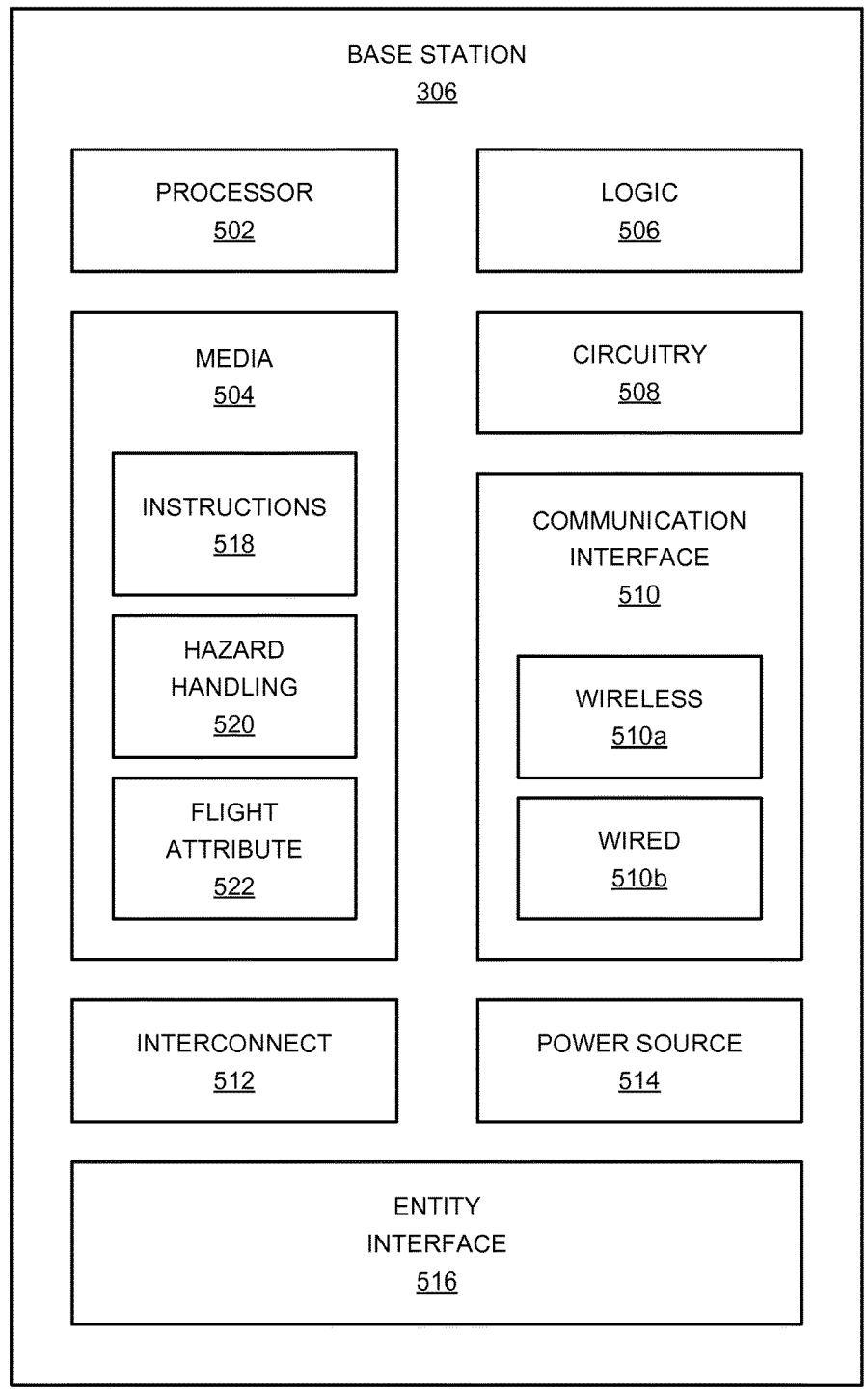
FIG. 5 is a schematic diagram of an example base station, which may be in communication with at least one UFV, including one or more example components for a base station in accordance with certain example embodiments.

FIG. 5 is a schematic diagram 500 of an example base station, which may be in communication with at least one UFV (not shown in FIG. 5), including one or more example components for a base station in accordance with certain example embodiments. As shown in FIG. 5, a base station 306 may include one or more components such as: at least one processor 502, one or more media 504, logic 506, circuitry 508, at least one communication interface 510, at least one interconnect 512, at least one power source 514, at least one entity interface 516, some combination thereof, or so forth. Furthermore, as shown in schematic diagram 500, one or more media 504 may include one or more instructions 518, at least one hazard handling 520 routine, at least one flight attribute 522, some combination thereof, or so forth; or communication interface 510 may include at least one wireless communication interface 510a, at least one wired communication interface 510b, some combination thereof, or so forth. However, a base station 306 may alternatively include more, fewer, or different component(s) from those that are illustrated without departing from claimed subject matter.

For certain example embodiments, a base station 306 may include or comprise at least one machine that is capable of flight control processing, (distant) flight control, some combination thereof, or so forth. Base station 306 may include, for example, a computing platform or any electronic device or devices having at least one processor or memory. Processor 502 may include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, some combination thereof, or so forth. Media 504 may bear, store, contain, include, provide access to, or a combination thereof, etc. instructions 518, which may be executable by a processor 502; at least one hazard handling 520 routine, which may at least partially form at least a portion of instructions 518; one or more flight attributes 522; some combination thereof; or so forth. Instructions 518 may include or comprise, by way of example but not limitation, a program, a module, an application or app (e.g., that is native, that runs in a browser, that runs within a virtual machine or server, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. Media 504 may include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions, one or more hazard handling routines, one or more flight attributes, some combination thereof, or so forth.

For certain example embodiments, execution of instructions 518 by one or more processors 502 may transform at least a portion of base station 306 into a special-purpose computing device, apparatus, platform, some combination thereof, or so forth. Instructions 518 may include, for example, instructions that are capable of realizing at least a portion of one or more flow diagrams methods, processes, procedures, operations, functionality, technology, mechanisms, or a combination thereof, etc. that are described herein or illustrated in the accompanying drawings. A hazard handling 520 routine may include, for example, instructions that are capable of realizing at least a portion of one or more flow diagrams, methods, processes, procedures, operations, functionality, technology, mechanisms, or a combination thereof, etc. that are described herein or illustrated in the accompanying drawings and that are directed toward interacting with at least one UFV to facilitate detecting, seeing, avoiding, managing, mitigating, communicating about, coordinating over, eliminating, predicting, removing, accounting for, remedying aftermath caused by, cooperating to address, or a combination thereof, etc. at least one hazard. A flight attribute 522 may include, for example, data describing or representing at least one flight attribute, such as one or more flight characteristics, one or more flight capabilities, a combination thereof, etc. of at least one UFV that base station 306 is communicating with, is at least partially controlling, is monitoring, some combination thereof, or so forth. Additionally or alternatively, at least a portion of flight attributes 522 may be at least partially accessible to or integrated with hazard handling 520.

For certain example embodiments, logic 506 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings. Circuitry 508 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 508 includes at least one physical or hardware component or aspect.

For certain example embodiments, one or more communication interfaces 510 may provide one or more interfaces between base station 306 and another machine or a person/operator/entity directly or indirectly. A wireless communication interface 510a or a wired communication interface 510b may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, a gateway, or a combination thereof, etc.), a physical or logical network adapter or port, a frequency converter, a baseband processor, an internet or telecommunications backbone connector, a fiber optic connector, a storage area network (SAN) connector, or a combination thereof, etc. to communicate wireless signals or wired signals via one or more wireless communication links or wired communication links, respectively. Communications with at least one communication interface 510 may enable transmitting, receiving, or initiating of transmissions, just to name a few examples.

For certain example embodiments, at least one interconnect 512 may enable signal communication between or among components of base station 306. Interconnect 512 may include, by way of example but not limitation, one or more buses, channels, switching fabrics, local area networks (LANs), storage area networks (SANs), some combination thereof, or so forth. Although not explicitly illustrated in FIG. 5, one or more components of base station 306 may be coupled to interconnect 512 via a discrete or integrated interface. By way of example only, one or more interfaces may couple a processor 502 or a medium 504 to at least one interconnect 512. For certain example embodiments, at least one power source 514 may provide power to one or more components of base station 306. Power source 514 may include, by way of example but not limitation, a power connector for accessing an electrical grid, a fuel cell, a solar power source, one or more batteries, some combination thereof, or so forth.

For certain example embodiments, an entity interface 516 may enable one or more entities (e.g., a person, a group, an electronic agent, a robotic entity, or a combination thereof, etc.) to provide input to or receive output from base station 306. Interactions between an entity and a base station may relate, by way of example but not limitation, to inputting or outputting instructions, commands, settings, flight characteristics, flight capabilities, some combination thereof, or so forth. Certain entity interfaces 516 may enable both entity input and entity output at base station 306 or over at least one network link.

However, claimed subject matter is not limited to any particular described embodiments, implementations, examples, or so forth. For instance, it should be understood that for certain example implementations components that are illustrated separately in FIG. 5 need not necessarily be separate or mutually exclusive. For example, a given component may provide multiple functionalities. By way of example only, hard-wired logic 506 may form circuitry 508. Additionally or alternatively, a single component such as a connector may function as a communication interface 510 or as an entity interface 516. Additionally or alternatively, one or more instructions 518 may function to realize or embody at least part of hazard handling 520 or flight attributes 522.

It should also be understood that for certain example implementations components that are illustrated in schematic diagram 500 or described herein may not be integral or integrated with a base station 306. For example, a component may be removably connected to a base station 306, a component may be wirelessly coupled to a base station 306, one or more components of a base station 306 may be geographically distributed or separated from one another, some combination thereof, or so forth. By way of example only, instructions 518 may be stored on one medium 504, and flight attributes 522 (or another portion of instructions 518) may be stored on a different medium 504, which may be part or a same server or a part of a different server of, e.g., a server farm. Additionally or alternatively, respective processor-media pairs, if any, may be physically realized on different or respective server blades or server containers for a base station 306 that is implemented on server hardware. However, claimed subject matter is not limited to any particular described embodiments, implementations, examples, etc.

Figure 6A:
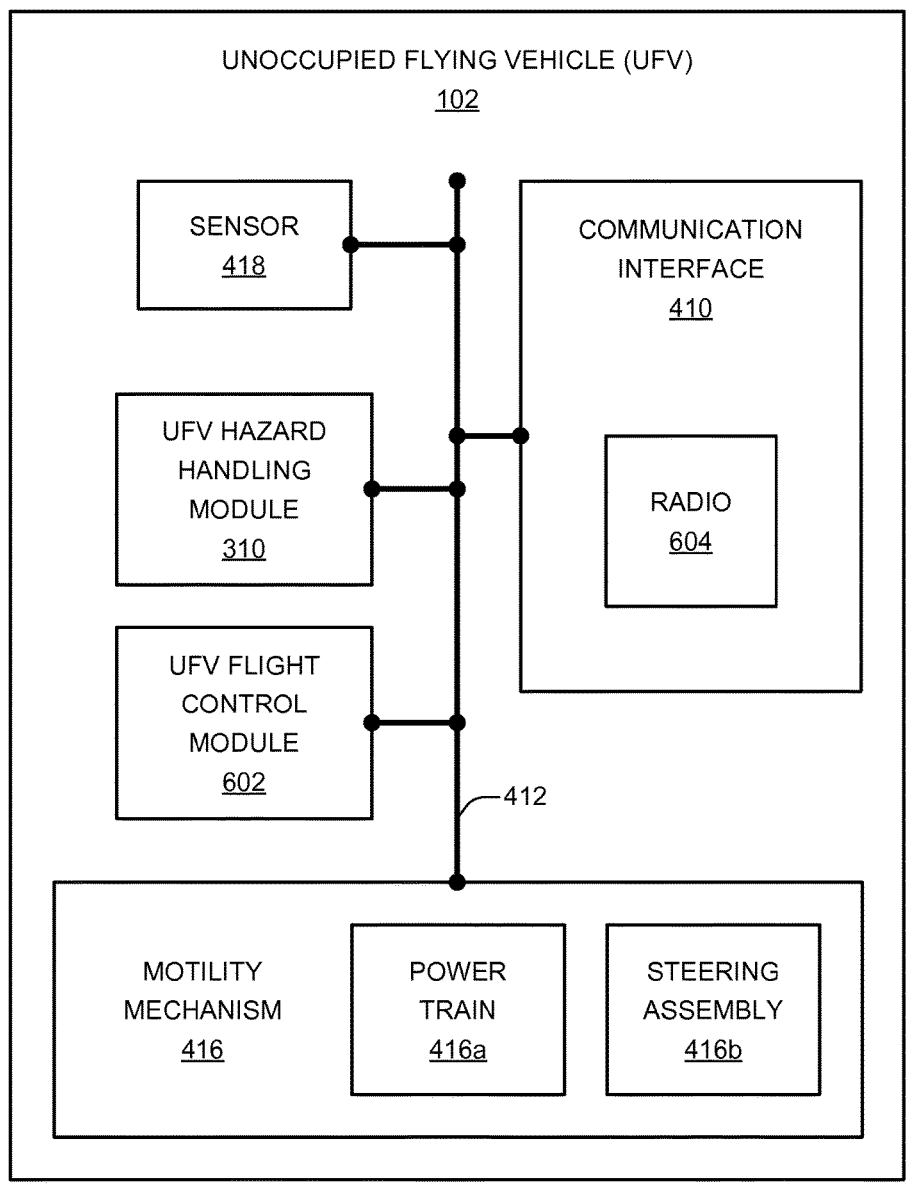
FIG. 6A is a schematic diagram of an example UFV that has one or more functional modules or one or more operational components in accordance with certain example embodiments.

FIG. 6A is a schematic diagram 600A of an example UFV that has one or more functional modules or one or more operational components in accordance with certain example embodiments. As shown in FIG. 6A, example UFV 102 of schematic diagram 600A may include, by way of example but not limitation, at least one UFV hazard handling module 310, at least one communication interface 410, at least one interconnect 412, at least one motility mechanism 416, one or more sensors 418, or at least one UFV flight control module 602. More specifically, communication interface 410 may include at least one radio 604, or so forth; or motility mechanism 416 may include at least one power train 416a, at least one steering assembly 416b, some combination thereof, or so forth. However, a UFV 102 may alternatively include more, fewer, or different module(s) or component(s) from those that are illustrated without departing from claimed subject matter.

For certain example embodiments, a UFV hazard handling module 310 or a UFV flight control module 602 may operate to implement, perform, facilitate performance of, or a combination thereof, etc. one or more flow diagrams, methods, processes, procedures, operations, functionality, technology, modules, mechanisms, or a combination thereof, etc. that are described herein or illustrated in the accompanying drawings or that relate to handling an actual or a potential hazard. Example aspects related to hazard handling in a UFV context are described further herein above and below. Although UFV hazard handling module 310 and UFV flight control module 602 are illustrated separately in schematic diagram 600A, they may additionally or alternatively be implemented at least partially in combination, jointly, with an overlapping functionality, some combination thereof, or so forth. For certain example embodiments, and by way of example but not limitation, at least a portion of one or more modules (e.g., module 702, module 704, or a combination thereof, etc.) that are described herein below with particular reference to FIG. 7A may be implemented as at least part of UFV hazard handling module 310, as at least part of UFV flight control module 602, some combination thereof, or so forth. However, claimed subject matter is not limited to any particular described embodiments, implementations, examples, etc.

For certain example embodiments, a module of a UFV 102 may include or be comprised of at least one processor (e.g., a processor 402 of FIG. 4, etc.), one or more media (e.g., a medium 404 of FIG. 4, etc.), executable instructions (e.g., processor-executable instructions, instructions 420 of FIG. 4, computer-implementable instructions, etc.) incorporated into one or more media, logic (e.g., logic 406 of FIG. 4, etc.), circuitry (e.g., circuitry 408 of FIG. 4, etc.), other described or illustrated component(s), may be comprised as otherwise described herein, some combination thereof, or so forth. For certain example implementations, one or more modules (e.g., a UFV hazard handling module 310, a UFV flight control module 602, or a combination thereof, etc.) of at least one UFV 102 may function or interoperate with one or more modules of at least one remote UFV 102R, at least one POFV 302, at least one base station 306 (e.g., each of FIGS. 3A-3C or FIG. 6B), or a combination thereof, etc. via at least one radio 604 of UFV 102. However, claimed subject matter is not limited to any particular described embodiments, implementations, examples, etc.

For certain example embodiments, UFV 102 may be in constant, infrequent, regular, irregular, intermittent, occasional, scheduled, unscheduled, a combination thereof, etc. communication with at least one remote UFV 102R, at least one POFV 302, at least one base station 306, or a combination thereof, etc. via at least one radio 604. One or more sensors 418 or at least one radio 604 may feed sensor readings, telemetry, flight attributes, weather conditions, topographical maps, coordination parameters, one or more automated hazard handling routines, a combination thereof, etc. to UFV hazard handling module 310, UFV flight control module 602, a combination thereof, or so forth. For certain example implementations, UFV hazard handling module 310 may at least make hazard-related flight control decisions or provide flight control input to UFV flight control module 602 with regard to handling actual or potential hazards. For certain example implementations, UFV flight control module 602 may at least partially make flight control decisions or provide flight control commands to motility mechanism 416 so as to implement flight control decisions, including, by way of example but not limitation, based at least partly on flight control input provided by UFV hazard handling module 310. Additionally or alternatively, a UFV hazard handling module 310 may supply flight control input, including by way of example but not limitation with at least one flight control command, directly (e.g., without routing it first through UFV flight control module 602) to motility mechanism 416. To implement flight control decisions, including flight control commands, motility mechanism 416 may employ power train 416a to provide at least one propulsive force or may employ steering assembly 416b to provide at least one directional change. However, claimed subject matter is not limited to any particular described embodiments, implementations, examples, etc.

Figure 6B:
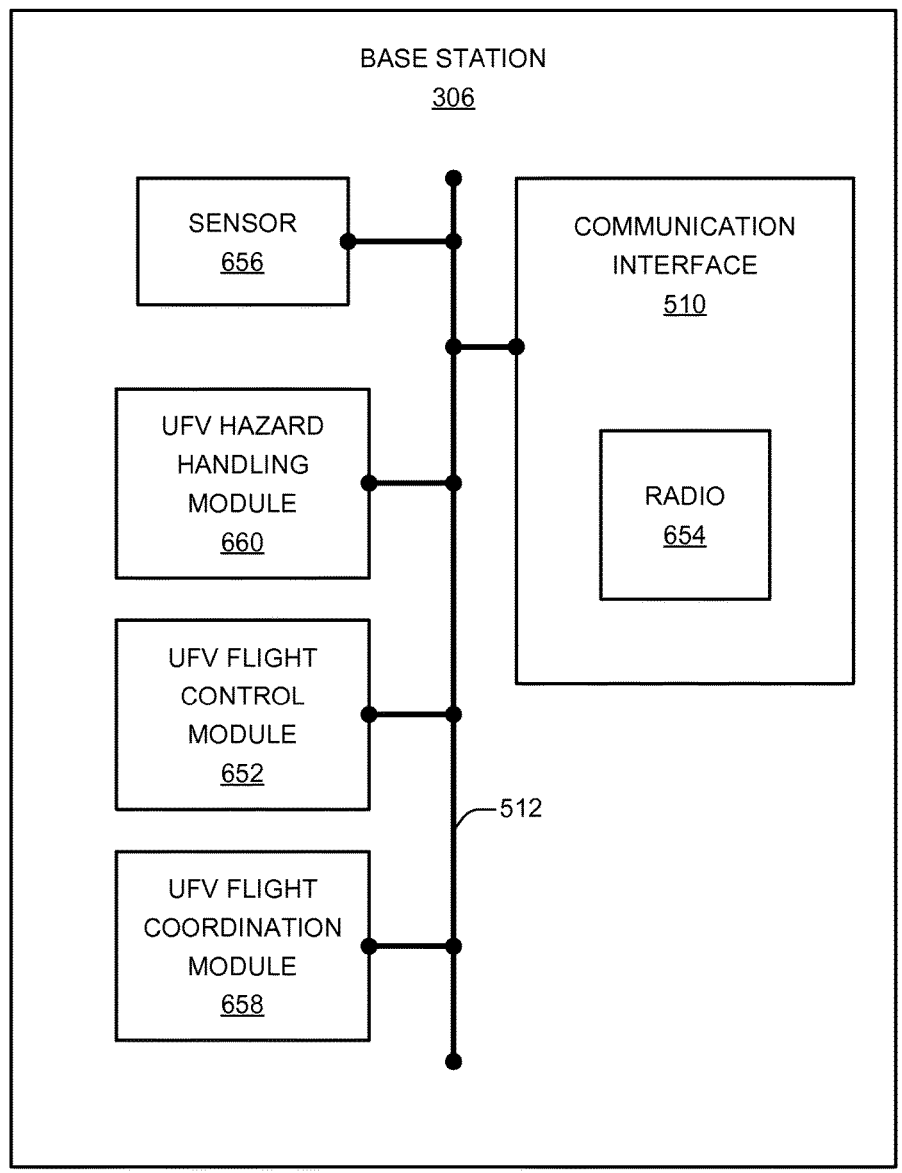
FIG. 6B is a schematic diagram of an example base station that has one or more functional modules or one or more operational components in accordance with certain example embodiments.

FIG. 6B is a schematic diagram 600B of an example base station that has one or more functional modules or one or more operational components in accordance with certain example embodiments. As shown in FIG. 6B, example base station 306 of schematic diagram 600B may include, by way of example but not limitation, at least one communication interface 510, at least one interconnect 512, at least one UFV flight control module 652, at least one sensor 656, at least one UFV flight coordination module 658, or at least one UFV hazard handling module 660. More specifically, communication interface 510 may include at least one radio 654, or so forth. However, a base station 306 may alternatively include more, fewer, or different module(s) or component(s) from those that are illustrated without departing from claimed subject matter. Moreover, module(s) or component(s) that are illustrated in schematic diagram 600B may alternatively or additionally be separate from or non-integrated with a base station 306, such as being external to a housing of or remotely-accessible to a base station 306, for certain example implementations.

For certain example embodiments, a UFV hazard handling module 660, a UFV flight coordination module 658, or a UFV flight control module 652 may operate to implement, perform, facilitate performance of, or a combination thereof, etc. one or more flow diagrams, methods, processes, procedures, operations, functionality, technology, modules, mechanisms, or a combination thereof, etc. that are described herein or illustrated in the accompanying drawings or that relate to handling of an actual or a potential hazard. Example aspects related to hazard handling in a UFV context with at least one base station are described further herein above and below. Although UFV hazard handling module 660, UFV flight control module 652, and UFV flight coordination module 658 are illustrated separately in schematic diagram 600B, they may additionally or alternatively be implemented at least partially in combination, jointly, with an overlapping functionality, some combination thereof, or so forth. However, claimed subject matter is not limited to any particular described embodiments, implementations, examples, etc.

For certain example embodiments, a module of a base station 306 may include or be comprised of at least one processor (e.g., a processor 502 of FIG. 5, etc.), one or more media (e.g., a medium 504 of FIG. 5, etc.), executable instructions (e.g., processor-executable instructions, instructions 518 of FIG. 5, computer-implementable instructions, etc.) incorporated into one or more media, logic (e.g., logic 506 of FIG. 5, etc.), circuitry (e.g., circuitry 508 of FIG. 5, etc.), other described or illustrated component(s), may be comprised as otherwise described herein, some combination thereof, or so forth. For certain example embodiments, one or more modules (e.g., a UFV hazard handling module 660, a UFV flight control module 652, a UFV flight coordination module 658, or a combination thereof, etc.) of at least one base station 306 may function or interoperate with one or more modules of at least one UFV 102, at least one remote UFV 102R, at least one POFV 302, at least one other base station 306 (e.g., each of FIG. 3A-3C or 6A), or a combination thereof, etc. via at least one radio 654 (or via a wired connection (not explicitly shown in FIG. 6B) of a communication interface 510) of base station 306. However, claimed subject matter is not limited to any particular described embodiments, implementations, examples, etc.

For certain example embodiments, a base station 306 may be in constant, infrequent, regular, irregular, intermittent, occasional, scheduled, unscheduled, a combination thereof, etc. communication with at least one UFV 102, at least one remote UFV 102R, at least one POFV 302, at least one first UFV, at least one second UFV, at least one other base station 306, or a combination thereof, etc. via at least one radio 654. For certain example implementations, one or more sensors 656 (e.g., such as one or more of example sensor types described herein above with particular reference to sensor 418 (e.g., for a UFV 102 of FIG. 4)) or at least one radio 654 may feed sensor readings, telemetry, flight attributes, weather conditions, topographical maps, coordination parameters, at least one automated hazard handling routine, a combination thereof, etc. to UFV hazard handling module 660, UFV flight control module 652, UFV flight coordination module 658, a combination thereof, or so forth. For certain example embodiments, UFV hazard handling module 660 may at least make hazard-related flight control decisions or provide flight control input to UFV flight control module 652 or UFV flight coordination module 658 with regard to handling actual or potential hazards. For certain example embodiments, UFV flight coordination module 658 may at least make multi-UFV coordination flight control decisions or provide flight control input to UFV flight control module 652 or UFV hazard handling module 660 with regard to coordinating two or more UFVs, with or without involvement by another base station. For certain example embodiments, UFV flight control module 652 may at least partially make flight control decisions or formulate flight control commands (e.g., for transmission via radio 654 to a UFV 102 and possible application to a motility mechanism 416 (e.g., of FIG. 6A) thereof) so as to realize flight control decisions, including, by way of example but not limitation, based at least partly on flight control input provided by at least UFV hazard handling module 660 or UFV flight coordination module 658. However, claimed subject matter is not limited to any particular described embodiments, implementations, examples, etc.

FIG. 7A is a schematic diagram 700A that includes at least one example machine, such as an unoccupied flying vehicle (UFV), that is capable of handling scenarios for automated hazard handling routine engagement in accordance with certain example embodiments. As shown in FIG. 7A, by way of example but not limitation, schematic diagram 700A includes at least one machine that may include an engagement motivation detection module 702 or an automated hazard handling routine engagement module 704. More specifically, schematic diagram 700A may include a machine that includes or comprises at least one UFV 102. By way of example but not limitation, an engagement motivation detection module 702 or an automated hazard handling routine engagement module 704 may include or comprise or be realized with at least one processor that executes instructions (e.g., sequentially, in parallel, at least partially overlapping in a time-multiplexed fashion, at least partially across multiple cores, or a combination thereof, etc.) as at least one special-purpose computing component, or otherwise as described herein. However, claimed subject matter is not limited to any particular described embodiments, implementations, examples, etc.

For certain example embodiments, an engagement motivation detection module 702 or an automated hazard handling routine engagement module 704 may be implemented separately or at least partially jointly or in combination. For certain example implementations, an engagement motivation detection module 702 may be configured to detect at least one motivation to engage at least one automated hazard handling routine of the UFV. For certain example implementations, an automated hazard handling routine engagement module 704 may be configured to engage at least one automated hazard handling routine of a UFV based at least partially on at least one motivation. However, claimed subject matter is not limited to any particular described embodiments, implementations, examples, etc.

FIGS. 7B-7E are schematic diagrams 700B-700E that include at least one example machine and that depict example scenarios for implementing automated hazard handling routine engagement in accordance with certain example embodiments. As shown in FIGS. 7B-7E, by way of example but not limitation, one or more of schematic diagrams 700B-700E may include at least one UFV 102, at least one motivation 708, at least one automated hazard handling routine 710, at least one detection 712, or at least one engagement 714. Each of schematic diagrams 700B-700E may include alternative or additional depictions, which may relate to automated hazard handling routine engagement, as described herein. In addition to or in alternative to description herein below with specific reference to FIGS. 7B-7E, illustrated aspects of schematic diagrams 700B-700E may be relevant to example description with reference to FIG. 8A-8C, 9A-9D, or 10A-10B. However, claimed subject matter is not limited to any particular described embodiments, implementations, examples, etc.

As shown in FIG. 7B, by way of example but not limitation, schematic diagram 700B may include at least one UFV 102, at least one motivation 708, at least one automated hazard handling routine 710, at least one detection 712, or at least one engagement 714. For certain example embodiments, at least one engagement motivation detection module 702 (e.g., of FIG. 7A) of a UFV 102 may effectuate at least one detection 712 of at least one motivation 708 to engage at least one automated hazard handling routine 710. For certain example implementations, at least one motivation 708 may include or comprise at least one reason, at least one stimulus, at least one impetus, at least one justification, at least one incentive, at least one trigger, at least one inducement, some combination thereof, or so forth. For certain example embodiments, at least one automated hazard handling routine engagement module 704 (e.g., of FIG. 7A) of a UFV 102 may effectuate at least one engagement 714 of at least one automated hazard handling routine 710 based at least partially on at least one motivation 708 that is detected. For certain example implementations, at least one automated hazard handling routine 710 may include or comprise at least one automatic approach to avoiding a hazard, at least one programmed response to a potential hazard, at least one electronic control for flight, at least one default procedure for ameliorating a hazardous situation, at least one automated mechanism for reducing a likelihood of becoming a hazard, some combination thereof, or so forth. However, claimed subject matter is not limited to any particular described embodiments, implementations, examples, etc. Additional or alternative description that may be relevant to schematic diagram 700B is provided herein below with particular reference to one or more of any of FIGS. 8A-8C, FIGS. 9A-9D, or FIGS. 10A-10B.

Figure 7C:
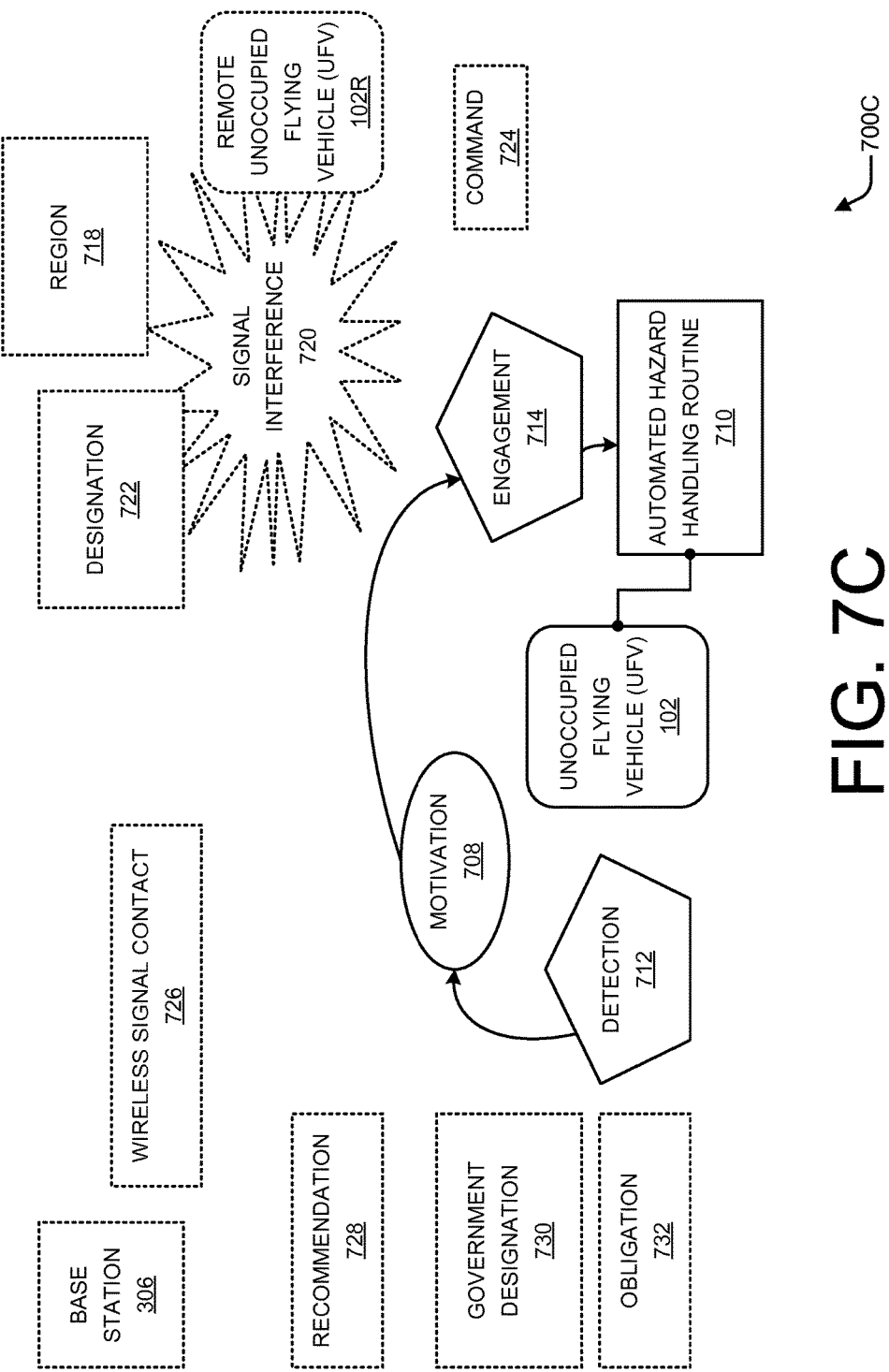

As shown in FIG. 7C, by way of example but not limitation, schematic diagram 700C may include at least one UFV 102, at least one remote UFV 102R, at least one base station 306, at least one motivation 708, at least one automated hazard handling routine 710, at least one detection 712, at least one engagement 714, at least one region 718, at least some signal interference 720, at least one designation 722, at least one command 724, at least some wireless signal contact 726, at least one recommendation 728, at least one governmental designation 730, or at least one obligation 732. However, claimed subject matter is not limited to any particular described embodiments, implementations, examples, etc. Additional or alternative description that may be relevant to schematic diagram 700C is provided herein below with particular reference to one or more of any of FIGS. 8A-8C, FIGS. 9A-9D, or FIGS. 10A-10B.

Figure 7D:
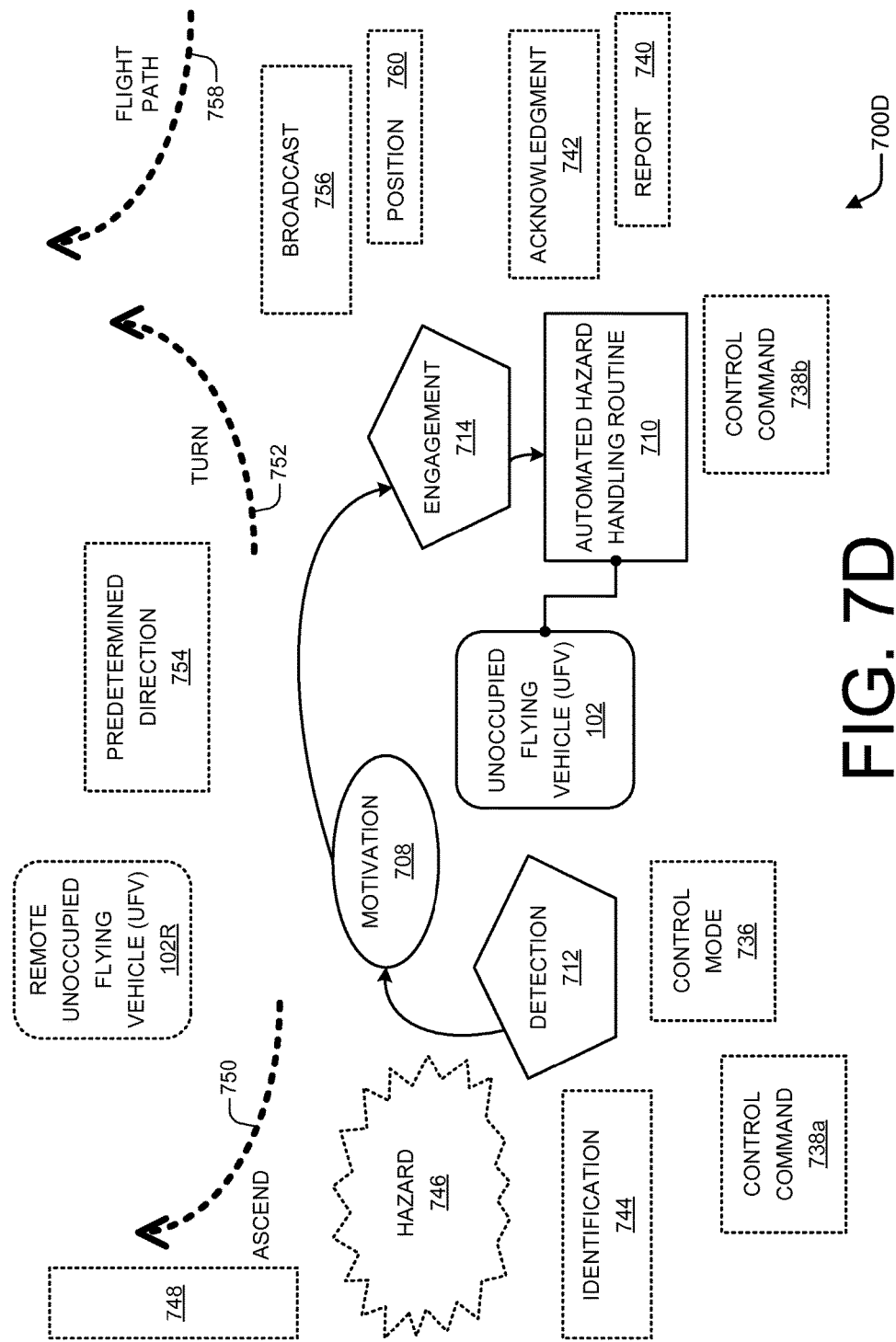

As shown in FIG. 7D, by way of example but not limitation, schematic diagram 700D may include at least one UFV 102, at least one remote UFV 102R, at least one motivation 708, at least one automated hazard handling routine 710, at least one detection 712, at least one engagement 714, at least one control mode 736, at least one control command 738a, at least one control command 738b, at least one report 740, at least one acknowledgment 742, at least one identification 744, at least one hazard 746, at least one vertical surface 748, at least one ascension 750, at least one turn 752, at least one predetermined direction 754, at least one broadcast 756, at least one flight path 758, or at least one position 760. However, claimed subject matter is not limited to any particular described embodiments, implementations, examples, etc. Additional or alternative description that may be relevant to schematic diagram 700D is provided herein below with particular reference to one or more of any of FIGS. 8A-8C, FIGS. 9A-9D, or FIGS. 10A-10B.

Figure 7E:
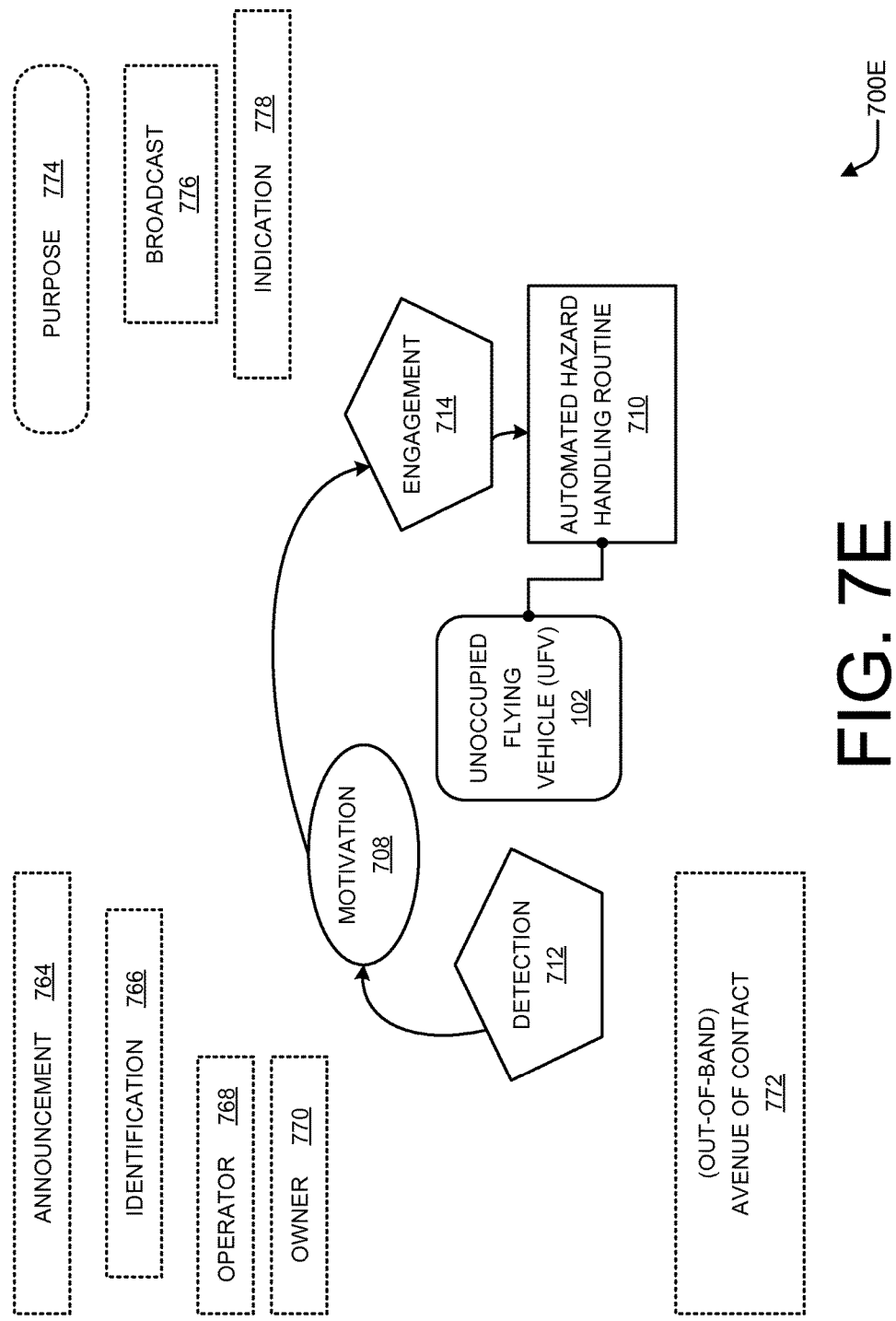

As shown in FIG. 7E, by way of example but not limitation, schematic diagram 700E may include at least one UFV 102, at least one motivation 708, at least one automated hazard handling routine 710, at least one detection 712, at least one engagement 714, at least one announcement 764, at least one identification 766, at least one operator 768, at least one owner 770, at least one avenue of contact 772, at least one purpose 774, at least one broadcast 776, or at least one indication 778. However, claimed subject matter is not limited to any particular described embodiments, implementations, examples, etc. Additional or alternative description that may be relevant to schematic diagram 700E is provided herein below with particular reference to one or more of any of FIGS. 8A-8C, FIGS. 9A-9D, or FIGS. 10A-10B.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 8A:
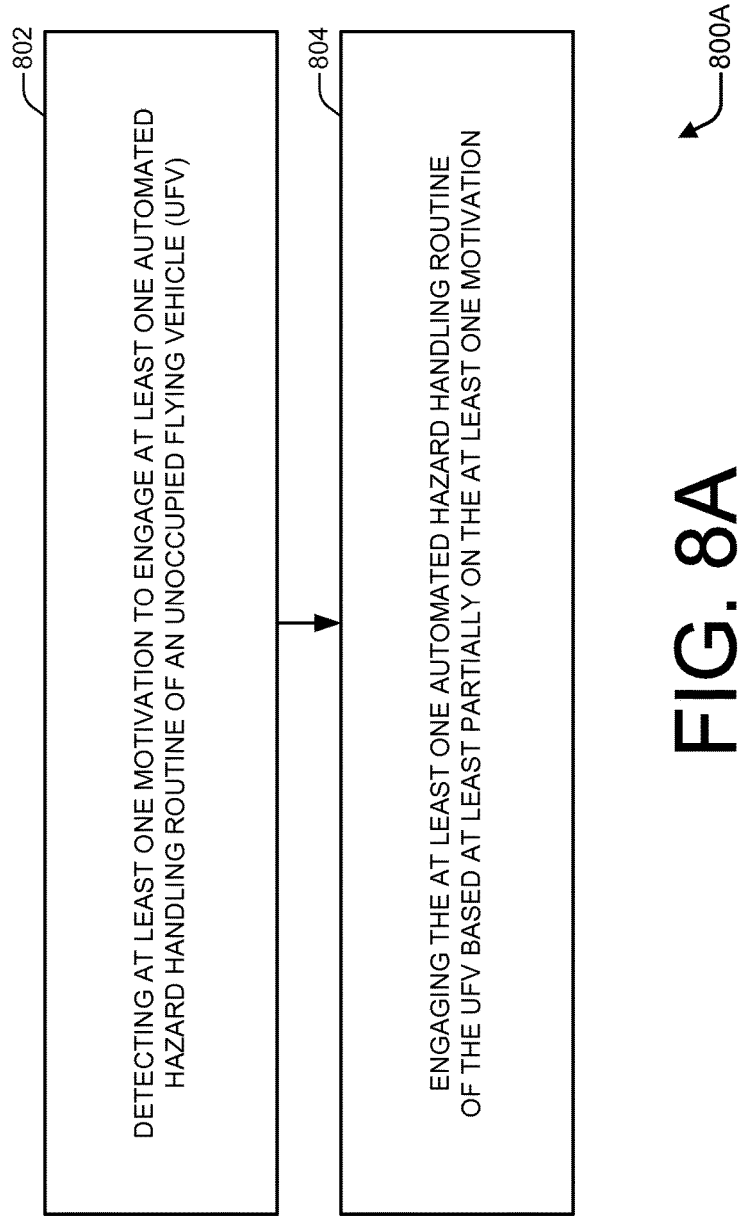
FIG. 8A is a flow diagram illustrating an example method for at least one machine with regard to automated hazard handling routine engagement in accordance with certain example embodiments.

FIG. 8A is a flow diagram 800A illustrating an example method for at least one machine with regard to automated hazard handling routine engagement in accordance with certain example embodiments. As illustrated, flow diagram 800A may include any of operations 802-804. Although operations 802-804 are shown or described in a particular order, it should be understood that methods may be performed in alternative manners without departing from claimed subject matter, including, but not limited to, with a different order or number of operations or with a different relationship between or among operations. Also, at least some operation(s) of flow diagram 800A may be performed so as to be fully or partially overlapping with other operation(s). For certain example embodiments, one or more operations of flow diagram 800A may be performed by at least one machine (e.g., a UFV 102 or at least a portion thereof).

For certain example embodiments, a method for hazard handling for an unoccupied flying vehicle (UFV) (e.g., that includes, involves, addresses, reacts to, or a combination thereof, etc. or other otherwise handles at least one remote UFV 102R, at least one first UFV 102(1), at least one second UFV 102(2), at least one POFV 302, at least one other object that may present a collision risk, at least one weather-related condition, at least one obstacle to a mission objective, at least one hindrance to accomplishing a task, at least one delay to achieving a goal, or a combination thereof, etc.), which method may be at least partially implemented using hardware (e.g., circuitry, at least one processor, processor-accessible memory, at least one module, or a combination thereof, etc.) of a machine such as a UFV, may include an operation 802 or an operation 804. An operation 802 may be directed at least partially to detecting at least one motivation to engage at least one automated hazard handling routine of the UFV. For certain example implementations, at least one machine may detect (e.g., ascertain, discover, encounter, identify, spot, determine, or a combination thereof, etc., such as via at least one detection 712) at least one motivation 708 (e.g., a reason, a stimulus, an impetus, a justification, an incentive, a trigger, an inducement, or a combination thereof, etc.) to engage at least one automated hazard handling routine 710 (e.g., at least one automatic approach to avoiding a hazard, at least one programmed response to a potential hazard, at least one electronic control for flight, at least one default procedure for ameliorating a hazardous situation, at least one automated mechanism for reducing a likelihood of becoming a hazard, or a combination thereof, etc. that is realized as at least part of at least one module, that is encoded into circuitry, that is being performed by at least part of at least one machine, or a combination thereof, etc.) of an unoccupied flying vehicle (UFV) 102 (e.g., a UAV, an RPV, a UCAV, a UA, an RPA, an ROA, an R/C aircraft, a UAVS, a UAS, an sUAS, or a combination thereof, etc.). By way of example but not limitation, at least one UFV may detect at least one motivation to engage at least one automated hazard handling routine of the UFV (e.g., a UAV may discover a stimulus to implement a procedure of the UAV that is intended to ameliorate or avoid a hazard, such as another UAV that is proximate thereto). However, claimed subject matter is not limited to any particular described embodiments, implementations, examples, etc.

For certain example embodiments, an operation 804 may be directed at least partially to engaging the at least one automated hazard handling routine of the UFV based at least partially on the at least one motivation. For certain example implementations, at least one machine may engage (e.g., employ, initiate, prompt into effect, apply, bring into force or operation, turn on, or a combination thereof, etc., such as via at least one engagement 714) at least one automated hazard handling routine 710 of a UFV 102 based at least partially on at least one motivation 708. By way of example but not limitation, at least one UFV may engage the at least one automated hazard handling routine of the UFV based at least partially on the at least one motivation (e.g., a UAV may start or segue to a procedure that adjusts a flight path of the UAV to avoid approaching a flight trajectory of another UAV). However, claimed subject matter is not limited to any particular described embodiments, implementations, examples, etc.

Figure 8B:
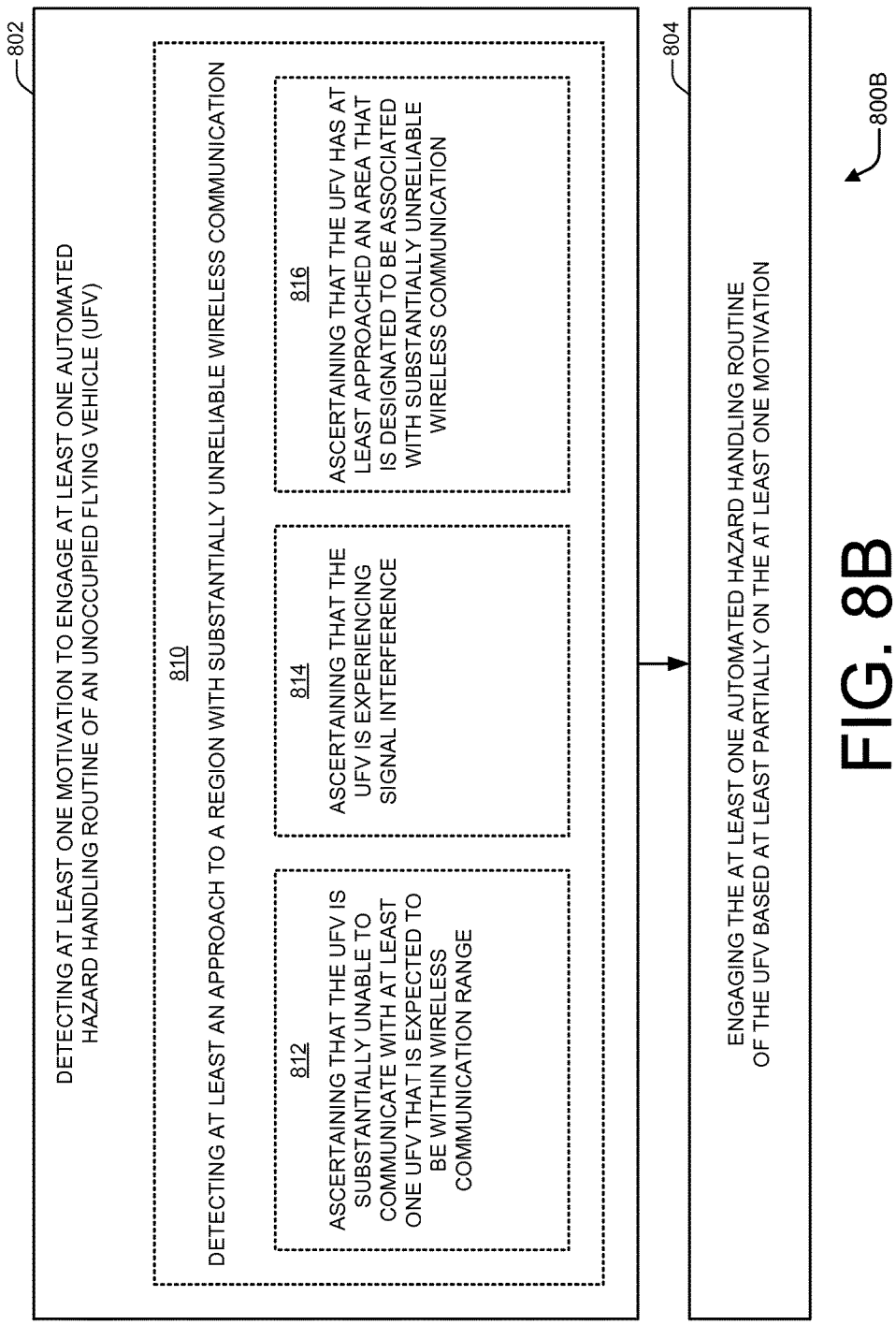
FIGS. 8B-8C depict example additions or alternatives for a flow diagram of FIG. 8A in accordance with certain example embodiments.
Figure 8C:
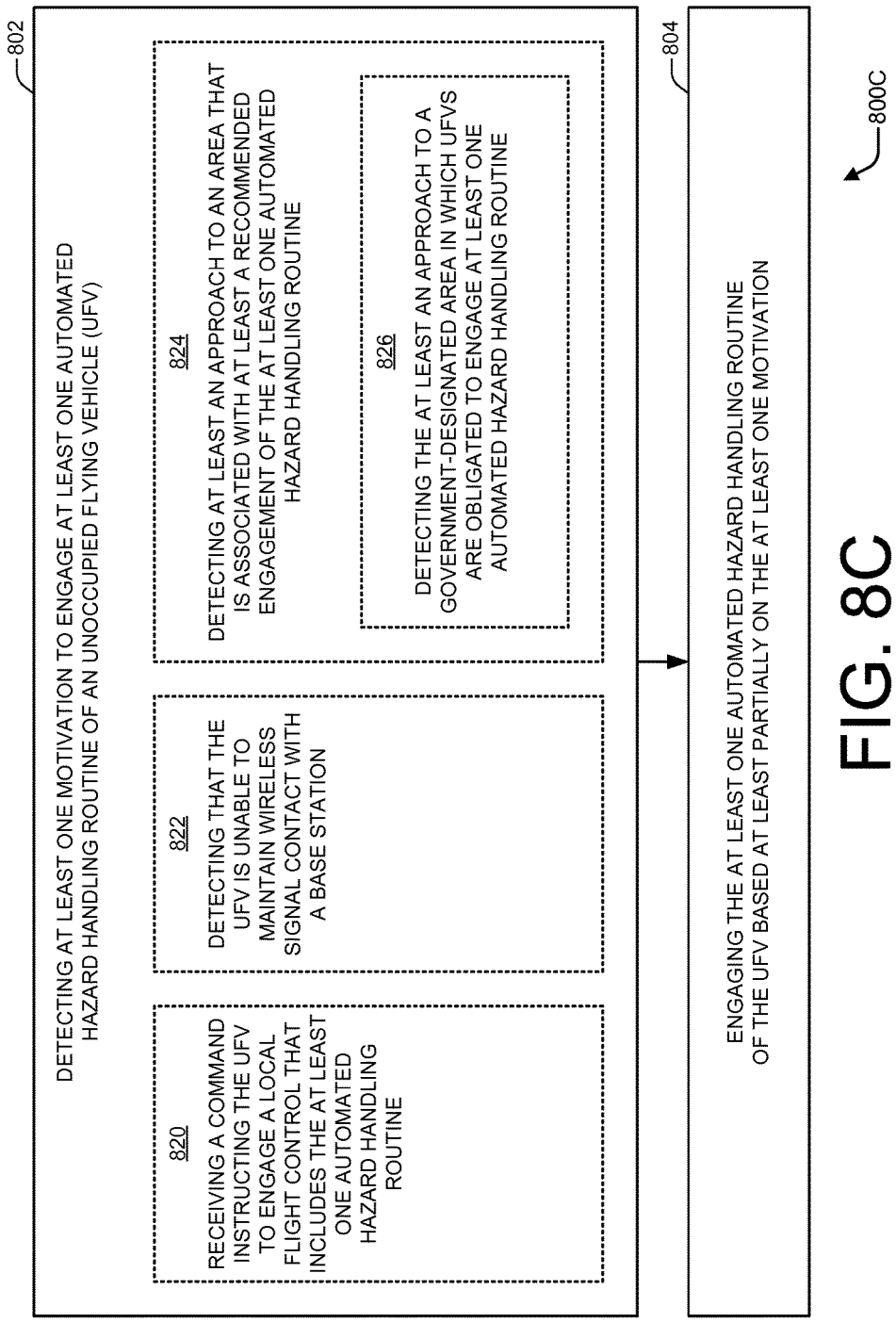

FIGS. 8B-8C depict example additions or alternatives for a flow diagram of FIG. 8A in accordance with certain example embodiments. As illustrated, flow diagrams of FIGS. 8B-8C may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 8B-8C may be performed so as to be fully or partially overlapping with other operation(s). For certain example embodiments, one or more operations of flow diagrams 800B-800C (of FIGS. 8B-8C) may be performed by at least one machine (e.g., a UFV 102 or at least a portion thereof).

FIG. 8B illustrates a flow diagram 800B having example operations 810, 812, 814, or 816. For certain example embodiments, an operation 810 may be directed at least partially to wherein the detecting at least one motivation to engage at least one automated hazard handling routine of the UFV (of operation 802) includes detecting at least an approach to a region with substantially unreliable wireless communication. For certain example implementations, at least one machine may detect at least an approach to (e.g., entry into, nearing, being within a certain time away from such that a current trajectory makes it likely that entry will occur, being a certain distance from such that a flight path is predicted to lead to intrusion into, being sufficiently close to such that those vehicles already within should start to consider a UAV in their flight traffic planning, or a combination thereof, etc.) a region 718 (e.g., an identifiable geographical space, a span of altitude, a designated flight area, a city, a government-delineated area, or a combination thereof, etc.) with substantially unreliable (e.g., more likely than not for a transmission to not be received, not sufficiently likely to have a successful transmission-reception exchange for real-time sensor readings to be obtained by a remote controller, not sufficiently likely to have a successful transmission-reception exchange for real-time flight control commands to be obtained by UAV in time to implement them safely, or a combination thereof, etc.) wireless communication. By way of example but not limitation, a UFV may detect at least an approach to a region with substantially unreliable wireless communication (e.g., a UAV may determine that it has entered a region in which wireless control signals from a base station may not be received with sufficient certainty to ensure that remote human-pilot control is superior to local computerized entity control). However, claimed subject matter is not limited to any particular described embodiments, implementations, examples, etc.

For certain example embodiments, an operation 812 may be directed at least partially to wherein the detecting at least an approach to a region with substantially unreliable wireless communication (of operation 810) includes ascertaining that the UFV is substantially unable to communicate with at least one UFV that is expected to be within wireless communication range. For certain example implementations, at least one machine may ascertain (e.g., determine, compute, figure out, or a combination thereof, etc.) that a UFV 102 is substantially unable to communicate with at least one UFV (e.g., a remote UFV 102R) that is expected (e.g., planned, intended, predicted, predetermined, scheduled, prescribed, known, or a combination thereof, etc.) to be within wireless communication range (e.g., a UFV that was within wireless communication range previously with respective flight trajectories that would be bringing them closer together, a UFV that is within a visual detection range, a UFV that radar indicates or indicated should be located such that an exchange of wireless signals would normally be successful, a UFV that was part of an orchestrated plan to be in proximity with one another, or a combination thereof, etc.). By way of example but not limitation, a UFV may ascertain that it is substantially unable to communicate with at least one UFV that is expected to be within wireless communication range (e.g., a UAV may realize that another proximate UAV with which it was previously communicating by wire and to which it was getting closer, is inexplicably no longer participating in flight coordination communications). However, claimed subject matter is not limited to any particular described embodiments, implementations, examples, etc.

For certain example embodiments, an operation 814 may be directed at least partially to wherein the detecting at least an approach to a region with substantially unreliable wireless communication (of operation 810) includes ascertaining that the UFV is experiencing signal interference. For certain example implementations, at least one machine may ascertain (e.g., determine, compute, figure out, or a combination thereof, etc.) that a UFV 102 is experiencing signal interference 720 (e.g., determines that a signal-to-noise (S/N) ratio is too low for reliable communications, detects that no intelligible signal is being received, realizes that transmitted signals are not being acknowledged with adequate frequency, realizes that no command or inquiry has been received from an associated base station for a predetermined period of time, detects that another UAV is communicating on a same channel, or a combination thereof, etc.). By way of example but not limitation, a UFV may ascertain that the UFV is experiencing signal interference (e.g., a UAV may discover that it is not capable of receiving or has not recently received a signal containing an ordered modulation of data by frequency, or by code, or by a combination thereof, etc.). However, claimed subject matter is not limited to any particular described embodiments, implementations, examples, etc.

For certain example embodiments, an operation 816 may be directed at least partially to wherein the detecting at least an approach to a region with substantially unreliable wireless communication (of operation 810) includes ascertaining that the UFV has at least approached an area that is designated to be associated with substantially unreliable wireless communication. For certain example implementations, at least one machine may ascertain (e.g., determine, compute, figure out, or a combination thereof, etc.) that a UFV 102 has at least approached an area (e.g., a space, an ad hoc region defined by a description, a geographical region bounded by GPS coordinates, a location described with a distance and a reference to a known or determinable position, or a combination thereof, etc.) that is designated 722 (e.g., delineated on a chart or map, identified by another vehicle, broadcast publicly on a beacon, or a combination thereof, etc.) to be associated with (e.g., correspond to, include, be afflicted with, cause UFVs to suffer from, or a combination thereof, etc.) substantially unreliable wireless communication. By way of example but not limitation, a UFV may ascertain that the UFV has at least approached an area that is designated to be associated with substantially unreliable wireless communication (e.g., a UAV may determine that it has entered a geographical area or altitude thereof that is known to have a substandard communication environment as indicated on a map in conjunction with knowing the UAV's current location). However, claimed subject matter is not limited to any particular described embodiments, implementations, examples, etc.

FIG. 8C illustrates a flow diagram 800C having example operations 820, 822, 824, or 826. For certain example embodiments, an operation 820 may be directed at least partially to wherein the detecting at least one motivation to engage at least one automated hazard handling routine of the UFV (of operation 802) includes receiving a command instructing the UFV to engage a local flight control that includes the at least one automated hazard handling routine. For certain example implementations, at least one machine may receive (e.g., accept, decode, demodulate, down-convert, detect, obtain from or via a communication, route from an antenna, or a combination thereof, etc.) a command 724 instructing (e.g., a packet with an indicator causing, a message with code ordering, a signal having control capabilities for, or a combination thereof, etc.) a UFV 102 to engage a local flight control (e.g., an ability to adjust a flight path, computational capability for situational self-awareness, on-board piloting circuitry, or a combination thereof, etc.) that includes at least one automated hazard handling routine. By way of example but not limitation, a UFV may receive a command instructing the UFV to engage a local flight control that includes the at least one automated hazard handling routine (e.g., a UAV may receive from an associated base station a command that instructs the UAV to activate a flight control module of the UAV, which flight control module includes a computerized hazard handling routine, to enable the UAV to make onboard flight path adjustments to avoid colliding with one or more upcoming buildings). However, claimed subject matter is not limited to any particular described embodiments, implementations, examples, etc.

For certain example embodiments, an operation 822 may be directed at least partially to wherein the detecting at least one motivation to engage at least one automated hazard handling routine of the UFV (of operation 802) includes detecting that the UFV is unable to maintain wireless signal contact with a base station. For certain example implementations, at least one machine may detect that a UFV 102 is unable to maintain wireless signal contact 726 (e.g., is unable to detect a broadcast beacon from a base station, is unable to receive responses back from a base station, has not successfully demodulated a signal for a threshold period of time, has failed to receive a signal as expected at some frequency over the past—such as 40% failures over the last two minutes, or a combination thereof, etc.) with a base station 306. By way of example but not limitation, a UFV may detect that it is unable to maintain wireless signal contact with a base station (e.g., a UAV may realize that it has experienced a failure to receive an expected communication originating at an associated base station or to receive from the associated base station an expected acknowledgment of a communication transmitted by the UAV three times in succession). However, claimed subject matter is not limited to any particular described embodiments, implementations, examples, etc.

For certain example embodiments, an operation 824 may be directed at least partially to wherein the detecting at least one motivation to engage at least one automated hazard handling routine of the UFV (of operation 802) includes detecting at least an approach to an area that is associated with at least a recommended engagement of the at least one automated hazard handling routine. For certain example implementations, at least one machine may detect at least an approach to (e.g., entry into, nearing, being within a certain time away from such that a current trajectory makes it likely that entry will occur, being a certain distance from such that a flight path is predicted to lead to intrusion into, being sufficiently close to such that those vehicles already within should start to consider a UAV in their flight traffic planning, or a combination thereof, etc.) an area (e.g., a space, an ad hoc region defined by a description, a geographical region bounded by GPS coordinates, a location described with a distance and a reference to a known or determinable position, or a combination thereof, etc.) that is associated with (e.g., corresponds to, includes, is tagged with, or a combination thereof, etc.) at least a recommended 728 (e.g., suggested, included as part of an advisory, not necessarily required, preferable, or a combination thereof, etc.) engagement of at least one automated hazard handling routine 710. By way of example but not limitation, a UFV may detect at least an approach to an area that is associated with at least a recommended engagement of the at least one automated hazard handling routine (e.g., a UAV may detect that it is within a given distance from entering (and has a direction toward) a zone—such as by using at least one map and one or more current GPS coordinates of the UAV—with the zone having an indication that local implementation of at least one hazard handling routine is advisable due to high winds and heavy UAV traffic in the area). However, claimed subject matter is not limited to any particular described embodiments, implementations, examples, etc.

For certain example embodiments, an operation 826 may be directed at least partially to wherein the detecting at least an approach to an area that is associated with at least a recommended engagement of the at least one automated hazard handling routine (of operation 824) includes detecting the at least an approach to a government-designated area in which UFVs are obligated to engage at least one automated hazard handling routine. For certain example implementations, at least one machine may detect at least an approach to a government-designated 730 (e.g., FAA-designated, statutorily identified, indicated by way of federal regulations, stipulated by state or local government, or a combination thereof, etc.) area in which UFVs are obligated 732 (e.g., via a regulation, as a result of a law, following from an order of a law enforcement officer or suitably-empowered government bureaucrat, required to avoid risking civil fines or criminal penalties, necessary, or a combination thereof, etc.) to engage at least one automated hazard handling routine 710. By way of example but not limitation, a UFV may detect the at least an approach to a government-designated area in which UFVs are obligated to engage at least one automated hazard handling routine (e.g., a UAV may be informed by a beacon that it is nearing a zone for which the FAA has promulgated regulations requiring rule-abiding UAVs to activate an on-board navigation coordination system that is configured to reduce a likelihood that any single UAV will disproportionally interfere with operations of other rule-abiding UAVs). However, claimed subject matter is not limited to any particular described embodiments, implementations, examples, etc.

FIGS. 9A-9D depict example additions or alternatives for a flow diagram of FIG. 8A in accordance with certain example embodiments. As illustrated, flow diagrams of FIGS. 9A-9D may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 9A-9D may be performed so as to be fully or partially overlapping with other operation(s). For certain example embodiments, one or more operations of flow diagrams 900A-900D (of FIGS. 9A-9D) may be performed by at least one machine (e.g., a UFV 102 or at least a portion thereof).

FIG. 9A illustrates a flow diagram 900A having example operations 910, 912, 914, or 916. For certain example embodiments, an operation 910 may be directed at least partially to wherein the engaging the at least one automated hazard handling routine of the UFV based at least partially on the at least one motivation (of operation 804) includes switching a control mode from remote control to at least partial local control. For certain example implementations, at least one machine may switch (e.g., swap, exchange, replace, move along a continuum toward, increase a percentage control input of, change, or a combination thereof, etc.) a control mode 736 (e.g., a state of utilizing control commands, a state of producing or formulating control commands, a state of implementing received flight control commands versus formulating flight control commands, or a combination thereof, etc.) from remote control (e.g., control by a human or an electronic entity located some distance away, located off of a UFV, located at a base station, or a combination thereof, etc.) to at least partial local control (e.g., having flight path adjustments determined at least partially using an onboard electronic entity). By way of example but not limitation, a UFV may switch a control mode from remote control to at least partial local control (e.g., a UAV may switch from being remotely-controlled—such as being responsive to received flight control commands—to being at least temporarily locally-controlled by an onboard computing apparatus in order to efficiently or quickly handle a detected hazard using obtained telemetry or sensor readings). However, claimed subject matter is not limited to any particular described embodiments, implementations, examples, etc.

For certain example embodiments, an operation 912 may be directed at least partially to wherein the engaging the at least one automated hazard handling routine of the UFV based at least partially on the at least one motivation (of operation 804) includes implementing a control command received from a remote source unless it conflicts with a control command generated by a hazard handling module of the UFV. For certain example implementations, at least one machine may implement a control command 738a (e.g., an order, an instruction, one or more steps to follow, one or more operations to perform, or a combination thereof, etc. to adjust a flight path, to change control modes, to realize a communication protocol, or a combination thereof, etc.) received from a remote source (e.g., a base station, another UFV, a location off-board a UFV that is to implement a command, or a combination thereof, etc.) unless it conflicts with (e.g., violates, produces a contrary result, fails to account for or otherwise handle a hazard, interferes with, or a combination thereof, etc.) a control command 738b generated by a hazard handling module 310 of a UFV 102. By way of example but not limitation, a UFV may implement a control command received from a remote source unless it conflicts with a control command generated by a hazard handling module of the UFV (e.g., after engaging a local computerized hazard handling routine, a UAV may continue to implement flight control commands received from an associated base station unless a received flight control command conflicts with—such as it results in a different heading from—an internally-generated flight control command). However, claimed subject matter is not limited to any particular described embodiments, implementations, examples, etc.

For certain example embodiments, an operation 914 may be directed at least partially to wherein the engaging the at least one automated hazard handling routine of the UFV based at least partially on the at least one motivation (of operation 804) includes externally reporting engagement of the automated hazard handling routine. For certain example implementations, at least one machine may externally report 740 (e.g., send an informing message, transmit a wireless signal via at least one antenna indicating, send an acknowledgement to a base station in response to successfully implementing an instruction to realize an, communicate to a location off-board a vehicle regarding an, or a combination thereof, etc.) engagement 714 of an automated hazard handling routine 710. By way of example but not limitation, a UFV may externally report engagement of the automated hazard handling routine (e.g., a UAV may send a communication—such as via both a wireless signal and a wired internet signal successively—to a government agency, such as a portion of the FAA, to indicate that on-board circuitry has been activated to control flight of the UAV). However, claimed subject matter is not limited to any particular described embodiments, implementations, examples, etc.

For certain example embodiments, an operation 916 may be directed at least partially to wherein the externally reporting engagement of the automated hazard handling routine (of operation 914) includes repeatedly reporting the engagement of the automated hazard handling routine until an acknowledgment is received. For certain example implementations, at least one machine may repeatedly report 740 engagement 714 of an automated hazard handling routine 710 until an acknowledgment 742 (e.g., a confirmation of receipt, a signal indicating successful reception, a message revealing that a communication was understood, or a combination thereof, etc.) is received (e.g., from a base station, from a governmental agency, from another UFV, or a combination thereof, etc.). By way of example but not limitation, a UFV may repeatedly report the engagement of the automated hazard handling routine until an acknowledgment is received (e.g., a UAV may send a signal to an associated base station indicative that control has been entrusted to a UAV hazard handling module onboard the UAV until the UAV receives a signal indicative that the associated base station is aware of the entrustment). However, claimed subject matter is not limited to any particular described embodiments, implementations, examples, etc.

Figure 9B:
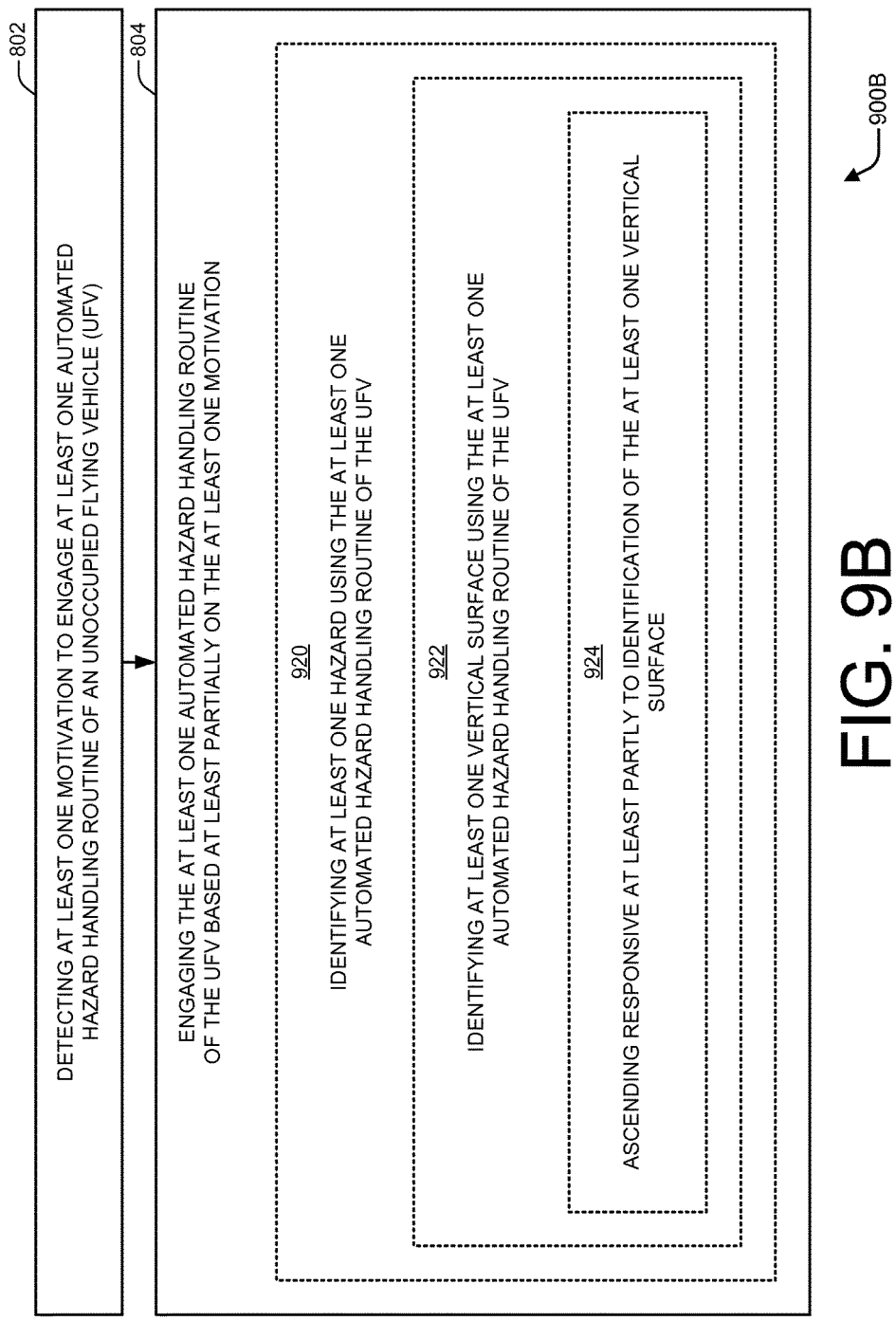

FIG. 9B illustrates a flow diagram 900B having example operations 920, 922, or 924. For certain example embodiments, an operation 920 may be directed at least partially to wherein the engaging the at least one automated hazard handling routine of the UFV based at least partially on the at least one motivation (of operation 804) includes identifying at least one hazard using the at least one automated hazard handling routine of the UFV. For certain example implementations, at least one machine may identify 744 (e.g., recognize, associate a description to, apply meaning to, categorize, label, classify, distinguish, tag, or a combination thereof, etc.) at least one hazard 746 (e.g., at least one remote UFV 102R, at least other UFV, at least one POFV 302, at least one building, at least one portion of a terrain, at least one other object that may present a collision risk, at least one weather-related condition, at least one obstacle to a mission objective, at least one hindrance to accomplishing a task, at least one delay to achieving a goal, or a combination thereof, etc.) using at least one automated hazard handling routine 710 of a UFV 102. By way of example but not limitation, a UFV may identify at least one hazard using the at least one automated hazard handling routine of the UFV (e.g., a UAV may send an image of upcoming terrain, which image is captured with a camera of the UAV, under the direction of a hazard handling module to a location that is capable of recognizing objects within an image—such as a web-accessible server or internet service—and receive in return an identification of one or more obstacles, such as a hill or a bridge, in the upcoming terrain). However, claimed subject matter is not limited to any particular described embodiments, implementations, examples, etc.

For certain example embodiments, an operation 922 may be directed at least partially to wherein the identifying at least one hazard using the at least one automated hazard handling routine of the UFV (of operation 920) includes identifying at least one vertical surface using the at least one automated hazard handling routine of the UFV. For certain example implementations, at least one machine may identify 744 at least one vertical surface 748 (e.g., a wall, a hillside, a billboard, a mountainside, a side of a building, or a combination thereof, etc.) using at least one automated hazard handling routine 710 of a UFV 102. By way of example but not limitation, a UFV may identify at least one vertical surface using the at least one automated hazard handling routine of the UFV (e.g., a UAV may recognize that an upcoming object is a face of a building with a hazard handling module using GPS coordinates of the UAV and compass readings in conjunction with a three-dimensional representation of terrain in the vicinity of the GPS coordinates). However, claimed subject matter is not limited to any particular described embodiments, implementations, examples, etc.

For certain example embodiments, an operation 924 may be directed at least partially to wherein the identifying at least one vertical surface using the at least one automated hazard handling routine of the UFV (of operation 922) includes ascending responsive at least partly to identification of the at least one vertical surface. For certain example implementations, at least one machine may ascend 750 (e.g., climb, increase elevation, fly upwards, or a combination thereof, etc.) responsive at least partly to (e.g., as a result of, based at least partially on, as a consequence of, or a combination thereof, etc.) identification 744 of at least one vertical surface 748. By way of example but not limitation, a UFV may ascend responsive at least partly to identification of the at least one vertical surface (e.g., if a side of a building is detected along an upcoming portion of a trajectory, a UAV with rotating wings may automatically ascend to an altitude that is greater than a height of the building—which building height may be ascertainable from a camera or from information in three-dimensional mapping data—and then continue the trajectory once the building is cleared). However, claimed subject matter is not limited to any particular described embodiments, implementations, examples, etc.

For certain example embodiments, an operation may be directed at least partially to adjusting a flight path of a UFV based at least partially on the one or more flight attributes received from the remote UFV including adjusting the flight path of the UFV based at least partially on at least one negotiation that includes at least the UFV and the remote UFV. For certain example implementations, at least one machine may adjust (e.g., change, deviate to accommodate a negotiated option, adopt a negotiated option that has been agreed to, alter to avoid a path the other has agreed to adopt, or a combination thereof, etc.) a flight path of a UFV 102 based at least partially on at least one negotiation (e.g., an offer and an acceptance (such as an acknowledgment), an offer and a rejection, an offer and a counter-offer, a suggestion for an alteration to a planned course, an exchange of signals, a swapping of offers or intentions, or a combination thereof, etc.) that includes at least UFV 102 and a remote UFV 102R. By way of example but not limitation, at least one UFV may adjust the flight path of the UFV based at least partially on at least one negotiation that includes at least the UFV and the remote UFV (e.g., a local UAV may descend and accelerate based at least partly on the local UAV transmitting to the remote UAV a flight trajectory that is desired by the local UAV and the local UAV receiving from the remote UAV an acknowledgment or a non-conflicting flight trajectory that is intended by the remote UAV). However, claimed subject matter is not limited to any particular described embodiments, implementations, examples, etc.

For certain example embodiments, an operation may be directed at least partially to wherein the adjusting the flight path of the UFV based at least partially on at least one negotiation that includes at least the UFV and the remote UFV includes exchanging between or among at least the UFV and the remote UFV one or more flight path adjustment options. For certain example implementations, at least one machine may exchange (e.g., send and receive, send and receive an acknowledgment, receive and send an acknowledgment, send one and receive one, or a combination thereof, etc.) between or among at least a UFV 102 and a remote UFV 102R one or more flight path adjustment options (e.g., suggestions, requests, offers, possibilities, or a combination thereof, etc. pertaining to a change in speed, a change in direction, a change in destination, a positive acceleration, a negative acceleration, an alteration to flight trajectory, a delay in effecting a previously-planned flight path, a change in altitude, or a combination thereof, etc.). By way of example but not limitation, at least one UFV may exchange between or among at least the UFV and the remote UFV one or more flight path adjustment options (e.g., a local UAV may send a prospective local flight path adjustment for the local UAV to a remote UAV, and the local UAV may receive from the remote UAV a prospective remote flight path adjustment for the remote UAV or a revised, suggested prospective local fight path adjustment for the local UAV that the remote UAV would prefer). However, claimed subject matter is not limited to any particular described embodiments, implementations, examples, etc.

A method of obtaining or transmitting flight control commands can include transmitting to a first UFV a flight control command to adjust a flight path corresponding to the first UFV, the flight control command based at least partially on at least one flight attribute indicator received from and corresponding to a second UFV. For certain example implementations, at least one machine may transmit to a first UFV a flight control command (e.g., an instruction to adjust a flight path; an order to change a flight state, such as changing a velocity, an acceleration, or an altitude; or a combination thereof; etc.) to adjust (e.g., change, decrease, increase, replace, cause a deviation in, adapt, modify, alter, deviate from, add something to, take something away from, or a combination thereof, etc., such as at least part of an adjustment for) a flight path (e.g., a heading, a flight trajectory, a position, an altitude, a speed, a direction a velocity, an acceleration, a stability level, a destination, a course through air or space or a time at which the course is to be traversed, or a combination thereof, etc.) corresponding to first UFV, with flight control command based at least partially on at least one flight attribute indicator (e.g., a description, a designation, an expression, a representation, an indirect identification, a direct identification, a reference, a code providing a linkage to, a signal, a value, or a combination thereof, etc.) received from and corresponding to a second UFV. By way of example but not limitation, at least one base station may transmit to the first UFV a flight control command to adjust a flight path corresponding to the first UFV, with the flight control command based at least partially on at least one flight attribute indicator received from and corresponding to the second UFV (e.g., a UAV base station may send to a first UAV a flight control command to accelerate by increasing its airspeed or by changing its direction of travel with the flight control command based on a flight attribute received from a second UAV that indicates that the second UAV is a lighter-than-air (LTA) vehicle with relatively limited maneuverability). However, claimed subject matter is not limited to any particular described embodiments, implementations, examples, etc.

For certain example embodiments, an operation may be directed at least partially to wherein a method of obtaining or transmitting further includes negotiating with the second UFV for at least one flight path adjustment. For certain example implementations, at least one machine may negotiate (e.g., conduct, engage in, or participate in: an offer and an acceptance (such as an acknowledgment), an offer to adjust a flight path and a rejection of the offer, an offer and a counter-offer, a suggestion for an alteration to a planned course, an exchange of signals, a request to adjust a flight path, a rejection of a request, an acceptance of a request, a swapping of offers or intentions or requests, or a combination thereof, etc., via at least one negotiation) with a second UFV for at least one flight path adjustment (e.g., change, decrease, increase, replace, cause a deviation in, adapt, modify, alter, deviate from, add something to, take something away from, or a combination thereof, etc. to a flight path (e.g., a heading, a flight trajectory, a position, an altitude, a speed, a direction a velocity, an acceleration, a stability level, a destination, a course through air or space or a time at which the course is to be traversed, or a combination thereof, etc.)). By way of example but not limitation, at least one base station may negotiate with the second UFV for at least one flight path adjustment (e.g., a UAV base station may send a flight adjustment offer or a flight adjustment request to a second UAV or may receive a flight adjustment offer or a flight adjustment request from the second UAV in an effort to reach an agreement on at least one adjustment to a flight path of a first UAV or on at least one adjustment to a flight path of the second UAV). However, claimed subject matter is not limited to any particular described embodiments, implementations, examples, etc.

For certain example embodiments, an operation may be directed at least partially to wherein the negotiating with the second UFV for at least one flight path adjustment includes transmitting to the second UFV an offer to make at least one adjustment to a flight path corresponding to the first UFV. For certain example implementations, at least one machine may transmit to a second UFV an offer (e.g., a description of potential change(s) to a flight path in terms of deltas to a current flight path, a description of potential change(s) to a flight path in terms of a new flight path, one or more indications of changes to current or future flight characteristics, a suggestion of changes that may be made, notice of changes that are to be made, or a combination thereof, etc.) to make at least one adjustment (e.g., change, decrease, increase, replace, cause a deviation in, adapt, modify, alter, deviate from, add something to, take something away from, or a combination thereof, etc.) to a flight path (e.g., a heading, a flight trajectory, a position, an altitude, a speed, a direction a velocity, an acceleration, a stability level, a destination, a course through air or space or a time at which the course is to be traversed, or a combination thereof, etc.) corresponding to a first UFV. By way of example but not limitation, at least one base station may transmit to the second UFV an offer to make at least one adjustment to a flight path corresponding to the first UFV (e.g., a UAV base station may send to a second UAV a communication that suggests that the UAV base station may cause a first UAV to change its flight path by increasing a rate of ascent of the first UAV and invite a response to this suggestion from the second UAV). However, claimed subject matter is not limited to any particular described embodiments, implementations, examples, etc.

For certain example embodiments, an operation may be directed at least partially to wherein the negotiating with the second UFV for at least one flight path adjustment includes receiving from the second UFV a request to make at least one adjustment to a flight path corresponding to the first UFV, with the request associated with a reference to a previous offer by the base station to make a flight path adjustment corresponding to the first UFV and with the request differing from the previous offer. For certain example implementations, at least one machine may receive (e.g., accept, decode, demodulate, down-convert, detect, obtain from or via a communication, route from an antenna, or a combination thereof, etc.) from a second UFV a request (e.g., a description of potential change(s) to a flight path in terms of deltas to a current flight path, a description of potential change(s) to a flight path in terms of a new flight path, one or more indications of changes to flight characteristics, a suggestion of changes that may be made, or a combination thereof, etc.) to make at least one adjustment (e.g., change, decrease, increase, replace, cause a deviation in, adapt, modify, alter, deviate from, add something to, take something away from, or a combination thereof, etc.) to a flight path (e.g., a heading, a flight trajectory, a position, an altitude, a speed, a direction a velocity, an acceleration, a stability level, a destination, a course through air or space or a time at which the course is to be traversed, or a combination thereof, etc.) corresponding to a first UFV, with request associated with a reference to (e.g., an identification of, a transaction number associated with, a negotiation code, an inclusion as part of an ongoing exchange regarding, or a combination thereof, etc.) a previous (e.g., an earlier, a prior in time, a prior in space relative to current positions, or a combination thereof, etc.) offer (e.g., a suggestion, an expression of a willingness, a description of possible or permitted changes, or a combination thereof, etc.) by a base station to make a flight path adjustment (e.g., a change, decrease, increase, replace, cause a deviation in, adapt, modify, alter, deviate from, add something to, take something away from, or a combination thereof, etc. to a flight path (e.g., a heading, a flight trajectory, a position, an altitude, a speed, a direction, a set of flight characteristics, a velocity, an acceleration, a stability level, a destination, a course through air or space or a time at which the course is to be traversed, or a combination thereof, etc.)) corresponding to first UFV and with request differing from (e.g., being directed to one or more different flight characteristics, suggesting different changes to a same one or more flight characteristics, suggesting no changes instead of changes, or a combination thereof, etc.) previous offer. By way of example but not limitation, at least one base station may receive from the second UFV a request to make at least one adjustment to a flight path corresponding to the first UFV, with the request associated with a reference to a previous offer by the base station to make a flight path adjustment corresponding to the first UFV and with the request differing from the previous offer (e.g., a UAV base station may receive from a second UAV a communication asking that the UAV base station command a first UAV to veer left by 30 degrees and accelerate to alter its flight path in lieu of decreasing a rate of decent, which received communication may include an identifier of an earlier communication or may be part of an ongoing exchange that includes the earlier communication, wherein the earlier communication was sent from the UAV base station to the second UAV and suggested that the UAV base station could command the first UAV to descend more slowly to avoid an airspace conflict between the first and second UAVs). However, claimed subject matter is not limited to any particular described embodiments, implementations, examples, etc.

For certain example embodiments, a method for hazard handling for an unoccupied flying vehicle (UFV) (e.g., that includes, involves, addresses, reacts to, or a combination thereof, etc. or other otherwise handles at least one remote UFV 102R, at least one POFV 302, at least one other object that may present a collision risk, at least one weather-related condition, at least one obstacle to a mission objective, at least one hindrance to accomplishing a task, at least one delay to achieving a goal, or a combination thereof, etc.), which method may be at least partially implemented using hardware (e.g., circuitry, at least one processor, processor-accessible memory, at least one module, or a combination thereof, etc.) of a machine such as a UFV, may include an operation(s). An operation may be directed at least partially to obtaining at least one indication related to imparting at least one flight attribute corresponding to a UFV. For certain example implementations, at least one machine may obtain (e.g., acquire, ascertain, determine, receive, retrieve, or a combination thereof, etc. via at least one obtainment) at least one indication (e.g., a sign, evidence, a showing, a reception, a received communication, a retrieval, a memory location, a data structure, a received flight attribute inquiry, a received negotiation request, a retrieved flight attribute update procedure, a retrieved flight attribute announcement procedure, or a combination thereof, etc.) related to imparting (e.g., disclosing, relating, bestowing, communicating, providing, or a combination thereof, etc.) at least one flight attribute (e.g., a flying capability, an identification of a craft category, an identification of a craft owner or operator, an indication of a flight path, a description of a flight purpose, a flight trajectory, a description of a flying state, a specified flight performance ability, an aircraft type, an altitude or location restriction, a safe acceleration level, an acceleration, a stability rating, a payload, an intended destination, a flight characteristic, a flight capability, or a combination thereof, etc.) corresponding to a UFV 102. By way of example but not limitation, at least one UFV may obtain at least one indication related to imparting at least one flight attribute corresponding to a UFV (e.g., e.g., a local UAV may receive a request for a flight attribute or acquire a disclosure schedule identifying a flight attribute, such as a current speed or a maximum vertical acceleration of the local UAV, that is to be shared or disseminated). However, claimed subject matter is not limited to any particular described embodiments, implementations, examples, etc.

For certain example embodiments, an operation may be directed at least partially to transmitting to a remote UFV at least one indicator of the at least one flight attribute corresponding to the UFV based at least partially on the at least one indication related to imparting the at least one flight attribute. For certain example implementations, at least one machine may transmit (e.g., send, communicate by wire, communicate wirelessly, frequency up-convert, modulate, encode, propagate, emanate from an emitter or antenna, or a combination thereof, etc. via at least one transmission) to a remote UFV 102R at least one indicator (e.g., a description, a designation, an expression, a representation, an indirect identification, a direct identification, a reference, a code providing a linkage to, a signal, a value, or a combination thereof, etc.) of at least one flight attribute corresponding to a UFV 102 based at least partially on at least one indication related to imparting at least one flight attribute. By way of example but not limitation, at least one UFV may transmit to a remote UFV at least one indicator of the at least one flight attribute corresponding to the UFV based at least partially on the at least one indication related to imparting the at least one flight attribute (e.g., a local UAV may transmit to a remote UAV a value of or a reference to a flight attribute, such as a current altitude or a turning ability, wherein the remote UAV may or may not have made a previous inquiry regarding the flight attribute). However, claimed subject matter is not limited to any particular described embodiments, implementations, examples, etc.

For certain example embodiments, an operation may be directed at least partially to wherein the obtaining at least one indication related to imparting at least one flight attribute corresponding to a UFV includes receiving from the remote UFV at least one negotiation request for a flight path adjustment. For certain example implementations, at least one machine may receive (e.g., accept, decode, demodulate, down-convert, detect, obtain from or via a communication, route from an antenna, or a combination thereof, etc.) from a remote UFV 102R at least one negotiation request (e.g., a communication or exchange asking to discuss suggestions, options, possibilities, or a combination thereof, etc.) for a flight path adjustment (e.g., a change to, a modification to, a deviation for, or a combination thereof, etc. at least one flight path 312 of a local or a remote UFV, such as by changing a spatial location of a flight path or a time at which a trajectory of a flight path is to be traversed). By way of example but not limitation, at least one UFV may receive from the remote UFV at least one negotiation request for a flight path adjustment (e.g., a local UAV may receive from a remote UAV a request to begin negotiating between or among at least the local UAV and the remote UAV for the local UAV to adjust its flight path or for the remote UAV to adjust its flight path to avoid a potential collision or to cooperatively achieve a goal). However, claimed subject matter is not limited to any particular described embodiments, implementations, examples, etc.

For certain example embodiments, an operation may be directed at least partially to wherein the obtaining at least one indication related to imparting at least one flight attribute corresponding to a UFV includes retrieving from at least one memory at least a portion of at least one flight attribute update procedure that includes at least one plan for imparting one or more flight characteristics. For certain example implementations, at least one machine may retrieve (e.g., acquire, read, extract, load, or a combination thereof, etc.) from at least one memory (e.g., a processor register, a cache memory, RAM, flash memory, or a combination thereof, etc., such as for media 404 of FIG. 4) at least a portion of at least one flight attribute update procedure (e.g., a schedule of flight characteristic sharings or disseminations, an agreed-upon or known channel for disseminating flight attributes, a mandated flight attribute beacon, a standardized broadcast of one or more prescribed flight characteristics that are to be disseminated, a stored or broadcast plan for disseminating, flight attributes, a time or channel for sending a recently-acquired flight characteristic to a remote UFV that previously-inquired about it or them, or a combination thereof, etc.) that includes at least one plan (e.g., a time, a schedule, a channel, a direction, a content, or a combination thereof, etc.) for imparting one or more flight characteristics (e.g., a description of flying state, an indication of flight path, a flight trajectory, a position, an altitude, a speed, a direction, a velocity, an acceleration, a current stability level, an intended destination, or a combination thereof, etc.). By way of example but not limitation, at least one UFV may retrieve from at least one memory at least a portion of at least one flight attribute update procedure that includes at least one plan for imparting one or more flight characteristics (e.g., a local UAV may retrieve from an onboard cache memory a time to transmit, such as 12:30 p.m. or every minute, or a specific flight characteristic, such as velocity or position, that is to be transmitted). However, claimed subject matter is not limited to any particular described embodiments, implementations, examples, etc.

For certain example embodiments, an operation may be directed at least partially to wherein the obtaining at least one indication related to imparting at least one flight attribute corresponding to a UFV includes retrieving from at least one memory at least a portion of at least one flight attribute announcement procedure that includes at least one plan for imparting one or more flight capabilities. For certain example implementations, at least one machine may retrieve (e.g., acquire, read, extract, load, or a combination thereof, etc.) from at least one memory (e.g., a processor register, a cache memory, RAM, flash memory, or a combination thereof, etc., such as for media 404 of FIG. 4) at least a portion of at least one flight attribute announcement procedure (e.g., a schedule of flight capability broadcasts, an agreed-upon or known channel for sharing or disseminating flight attributes, a mandated flight attribute beacon, a standardized broadcast for one or more prescribed flight capabilities that are to be disseminated, a stored or broadcast plan for sharing flight attributes, or a combination thereof, etc.) that includes at least one plan (e.g., a time, a schedule, a channel, a direction, a content, or a combination thereof, etc.) for imparting one or more flight capabilities (e.g., indication of flying capabilities, a specified flight performance ability, identification of craft or operator, description of flight purpose, an aircraft type, indication of what is achievable in contrast with what may be currently occurring, altitude restrictions, a safe acceleration level, weather constraints on flight adjustments, payload limitations, or a combination thereof, etc.). By way of example but not limitation, at least one UFV may retrieve from at least one memory at least a portion of at least one flight attribute announcement procedure that includes at least one plan for imparting one or more flight capabilities (e.g., a local UAV may retrieve from flash memory a listing of one or more flight capabilities, such as a maximum acceleration or a vehicle craft type, that are to be transmitted at specified times or are to be transmitted if another UAV approaches to a minimum distance range away from the UAV). However, claimed subject matter is not limited to any particular described embodiments, implementations, examples, etc.

For certain example embodiments, an operation may be directed at least partially to wherein the transmitting to a remote UFV at least one indicator of the at least one flight attribute corresponding to the UFV based at least partially on the at least one indication related to imparting the at least one flight attribute includes transmitting to the remote UFV the at least one indicator of the at least one flight attribute corresponding to the UFV via at least one wireless signal. For certain example implementations, at least one machine may transmit to a remote UFV 102R at least one indicator of at least one flight attribute corresponding to a UFV 102 via at least one wireless signal (e.g., a radio frequency (RF) signal, an electromagnetic transmission propagating through air or space or water, a laser beam having information encoded thereon, or a combination thereof, etc.). By way of example but not limitation, at least one UFV may transmit to the remote UFV the at least one indicator of the at least one flight attribute corresponding to the UFV via at least one wireless signal (e.g., a local UAV may transmit a code representative of a flight capability, such as a turning capability, via a laser signal to a remote UAV). However, claimed subject matter is not limited to any particular described embodiments, implementations, examples, etc.

For certain example embodiments, an operation may be directed at least partially to wherein the transmitting to the remote UFV the at least one indicator of the at least one flight attribute corresponding to the UFV via at least one wireless signal includes transmitting to the remote UFV the at least one indicator of the at least one flight attribute corresponding to the UFV via at least one radio frequency (RF) wireless signal using at least one directional beam. For certain example implementations, at least one machine may transmit to a remote UFV 102R at least one indicator of at least one flight attribute corresponding to a UFV 102 via at least one radio frequency (RF) wireless signal (e.g., a radio wave, an electromagnetic transmission in a radio frequency spectrum, or a combination thereof, etc.) using at least one directional beam (e.g., a transmissive or receptive signal created using a phased array, a spatially-filtered signal, an electromagnetic wave that is directed to cover an intended area while excluding other areas, or a combination thereof, etc.). By way of example but not limitation, at least one UFV may transmit to the remote UFV the at least one indicator of the at least one flight attribute corresponding to the UFV via at least one radio frequency (RF) wireless signal using at least one directional beam (e.g., a local UAV may transmit an RF signal over the air to a remote UAV with a directional, beam-forming antenna with a beam aimed toward the remote UAV and with the RF signal including a numeric value of a flight characteristic, such a current altitude in meters). However, claimed subject matter is not limited to any particular described embodiments, implementations, examples, etc.

For certain example embodiments, an operation may be directed at least partially to wherein the transmitting to a remote UFV at least one indicator of the at least one flight attribute corresponding to the UFV based at least partially on the at least one indication related to imparting the at least one flight attribute includes transmitting to the remote UFV at least one indicator of at least one flight characteristic of the UFV, the at least one flight characteristic representative of at least one flight attribute that is changeable by the UFV to adjust a flight path of the UFV. For certain example implementations, at least one machine may transmit to a remote UFV 102R at least one indicator of at least one flight characteristic (e.g., a description of flying state, an indication of flight path, a flight trajectory, a position, an altitude, a speed, a direction, a velocity, an acceleration, a current stability level, an intended destination, or a combination thereof, etc.) of a UFV 102, with at least one flight characteristic representative of at least one flight attribute that is changeable (e.g., able to be decreased, able to be increased, malleable, alterable, capable of being deviated from, or a combination thereof, etc.) by UFV 102 to adjust (e.g., change, decrease, increase, replace, cause a deviation in, adapt, modify, alter, deviate from, add something to, take something away from, or a combination thereof, etc.) a flight path (e.g., a heading, a flight trajectory, a position, an altitude, a speed, a direction a velocity, an acceleration, a stability level, a destination, a course through air or space or a time at which the course is to be traversed, or a combination thereof, etc.) of UFV 102. By way of example but not limitation, at least one UFV may transmit to the remote UFV at least one indicator of at least one flight characteristic of the UFV, with the at least one flight characteristic representative of at least one flight attribute that is changeable by the UFV to adjust a flight path of the UFV (e.g., a local UAV may transmit to a remote UAV at least part of a flight state, such as a current velocity or a current altitude, which flight state may be at least partially changed to affect a flight path of the local UAV). However, claimed subject matter is not limited to any particular described embodiments, implementations, examples, etc.

For certain example embodiments, an operation may be directed at least partially to wherein the transmitting to the remote UFV at least one indicator of at least one flight characteristic of the UFV, the at least one flight characteristic representative of at least one flight attribute that is changeable by the UFV to adjust a flight path of the UFV, includes transmitting to the remote UFV at least one indicator of a position of the UFV. For certain example implementations, at least one machine may transmit to a remote UFV 102R at least one indicator of a position (e.g., at least one location above or on the earth; one or more geographical coordinates; one or more satellite positioning service (SPS) coordinates, such as GPS, GLONASS, or Galileo coordinates, that are at least partially determined using at least one satellite; one or more map coordinates; at least one reference to at least one determinable position, such as a landmark, a waypoint, or an address; one or more cardinal directions in degrees/minutes/seconds; at least one longitude or latitude; or a combination thereof; etc.) of a UFV 102. By way of example but not limitation, at least one UFV may transmit to the remote UFV at least one indicator of a position of the UFV (e.g., a local UAV may transmit to a remote UAV one or more GPS coordinates representative of a location over/on the earth of the local UAV). However, claimed subject matter is not limited to any particular described embodiments, implementations, examples, etc.

For certain example embodiments, an operation may be directed at least partially to wherein the transmitting to the remote UFV at least one indicator of at least one flight characteristic of the UFV, the at least one flight characteristic representative of at least one flight attribute that is changeable by the UFV to adjust a flight path of the UFV, includes transmitting to the remote UFV at least one indicator of at least one of a speed or a direction of the UFV. For certain example implementations, at least one machine may transmit to a remote UFV 102R at least one indicator of at least one of a speed (e.g., an airspeed, an absolute speed, a relative speed, a true airspeed, a closing speed, miles per hour, meters per second, or a combination thereof, etc.) or a direction (e.g., a cardinal direction, a heading, a compass direction, a direction with regard to a known or determinable point of reference, or a combination thereof, etc.) of a UFV 102. By way of example but not limitation, at least one UFV may transmit to the remote UFV at least one indicator of at least one of a speed or a direction of the UFV (e.g., a local UAV may transmit to a remote UAV an airspeed or a heading or a velocity of the local UAV). However, claimed subject matter is not limited to any particular described embodiments, implementations, examples, etc.

For certain example embodiments, an operation may be directed at least partially to wherein the transmitting to the remote UFV at least one indicator of at least one flight characteristic of the UFV, the at least one flight characteristic representative of at least one flight attribute that is changeable by the UFV to adjust a flight path of the UFV, includes transmitting to the remote UFV at least one indicator of an acceleration of the UFV. For certain example implementations, at least one machine may transmit to a remote UFV 102R at least one indicator of an acceleration (e.g., a rate of change in speed, a rate of change in direction, a rate of change in velocity, meters per second per second, one or more values that may be used to calculate an acceleration, or a combination thereof, etc.) of a UFV 102. By way of example but not limitation, at least one UFV may transmit to the remote UFV at least one indicator of an acceleration of the UFV (e.g., a local UAV may transmit to a remote UAV a rate of change in speed or a rate of change in direction that the local UAV is currently undergoing). However, claimed subject matter is not limited to any particular described embodiments, implementations, examples, etc.

For certain example embodiments, an operation may be directed at least partially to wherein the transmitting to the remote UFV at least one indicator of at least one flight characteristic of the UFV, the at least one flight characteristic representative of at least one flight attribute that is changeable by the UFV to adjust a flight path of the UFV, includes transmitting to the remote UFV at least one indicator of an altitude of the UFV. For certain example implementations, at least one machine may transmit to a remote UFV 102R at least one indicator of an altitude (e.g., a height about ground, a height above sea level, one or more altimeter readings, a vertical elevation above a surface, an atmospheric pressure that corresponds to an elevation, one or more values that can be used to calculate an altitude, or a combination thereof, etc.) of a UFV 102. By way of example but not limitation, at least one UFV may transmit to the remote UFV at least one indicator of an altitude of the UFV (e.g., a local UAV may transmit to a remote UAV an elevation in feet that the local UAV is above ground or sea level). However, claimed subject matter is not limited to any particular described embodiments, implementations, examples, etc.

For certain example embodiments, an operation may be directed at least partially to wherein the transmitting to the remote UFV at least one indicator of at least one flight characteristic of the UFV, the at least one flight characteristic representative of at least one flight attribute that is changeable by the UFV to adjust a flight path of the UFV, includes transmitting to the remote UFV at least one indicator of an expected future flight characteristic of the UFV. For certain example implementations, at least one machine may transmit to a remote UFV 102R at least one indicator of an expected (e.g., planned, intended, predicted, predetermined, scheduled, slated, prescribed, known, what will occur if anticipated maneuverings transpire, or a combination thereof, etc.) future (e.g., occurring later, upcoming, happening after a transmission or reception including an indicator of, imminent, impending, to be realized after a current time, or a combination thereof, etc.) flight characteristic of a UFV 102. By way of example but not limitation, at least one UFV may transmit to the remote UFV at least one indicator of an expected future flight characteristic of the UFV (e.g., a local UAV may transmit to a remote UAV a position at which the local UAV anticipates being located if planned maneuvers, if any, are successfully carried out, plus a temporal index as a delta or an absolute time for when the local UAV anticipates achieving the position). However, claimed subject matter is not limited to any particular described embodiments, implementations, examples, etc.

For certain example embodiments, an operation may be directed at least partially to wherein the transmitting to a remote UFV at least one indicator of the at least one flight attribute corresponding to the UFV based at least partially on the at least one indication related to imparting the at least one flight attribute includes transmitting to the remote UFV at least one indicator of at least one flight capability corresponding to the UFV, the at least one flight capability representative of a degree to which the UFV is capable of adjusting a flight path of the UFV. For certain example implementations, at least one machine may transmit to a remote UFV 102R at least one indicator of at least one flight capability (e.g., an indication of flying capabilities, a specified flight performance ability, an identification of craft or operator, a description of flight purpose, an aircraft type, an indication of what is achievable in contrast with what may be currently occurring, altitude restrictions, a safe acceleration level, weather constraints, payload limitations, or a combination thereof, etc.) corresponding to a UFV 102, with at least one flight capability representative of (e.g., descriptive of, identifying directly or indirectly, indicative of, signifying, designating, expressing, or a combination thereof, etc.) of a degree (e.g., an extent, a rate, an amount, a length of time, or a combination thereof, etc.) to which UFV 102 is capable of adjusting (e.g., changing, decreasing, increasing, replacing, causing a deviation in, adapting, modifying, altering, deviating from, adding something to, taking something away from, or a combination thereof, etc.) a flight path (e.g., a heading, a flight trajectory, a position, an altitude, a speed, a direction a velocity, an acceleration, a stability level, a destination, a course through air or space or a time at which the course is to be traversed, or a combination thereof, etc.) of UFV 102. By way of example but not limitation, at least one UFV may transmit to the remote UFV at least one indicator of at least one flight capability corresponding to the UFV, with the at least one flight capability representative of a degree to which the UFV is capable of adjusting a flight path of the UFV (e.g., a local UAV may transmit to a remote UAV at least part of a set of parameters restricting or limiting changes to a flight path, such as a maximum acceleration or a minimum altitude, which parameters may affect a rate or an extent to which a local UAV may alter its flight path). However, claimed subject matter is not limited to any particular described embodiments, implementations, examples, etc.

For certain example embodiments, an operation may be directed at least partially to wherein the transmitting to the remote UFV at least one indicator of at least one flight capability corresponding to the UFV, the at least one flight capability representative of a degree to which the UFV is capable of adjusting a flight path of the UFV, includes transmitting to the remote UFV at least one indicator of an acceleration identified in a specification corresponding to the UFV. For certain example implementations, at least one machine may transmit to a remote UFV 102R at least one indicator of an acceleration (e.g., a rate of change in speed, a rate of change in direction, a rate of change in velocity, meters per second per second, one or more values that may be used to calculate an acceleration, or a combination thereof, etc.) identified in a specification (e.g., an owner's manual, marketing material, a manufacturer's spec sheet, or a combination thereof, etc. that is indicated as a maximum acceleration, a recommended prudent acceleration given particular conditions, or a combination thereof, etc.) corresponding to a UFV 102. By way of example but not limitation, at least one UFV may transmit to the remote UFV at least one indicator of an acceleration identified in a specification corresponding to the UFV (e.g., a local UAV may transmit an acceleration value in m/s/s that is specified in a manufacturer's product description for the local UFV). However, claimed subject matter is not limited to any particular described embodiments, implementations, examples, etc.

For certain example embodiments, an operation may be directed at least partially to wherein the transmitting to the remote UFV at least one indicator of at least one flight capability corresponding to the UFV, the at least one flight capability representative of a degree to which the UFV is capable of adjusting a flight path of the UFV, includes transmitting to the remote UFV at least one indicator of a maximum recommended speed corresponding to the UFV. For certain example implementations, at least one machine may transmit to a remote UFV 102R at least one indicator of a maximum recommended speed (e.g., a maximum airspeed, a maximum descending speed, a top-end speed according to marketing materials, a recommended speed in an owner's manual, or a combination thereof, etc.) corresponding to a UFV 102. By way of example but not limitation, at least one UFV may transmit to the remote UFV at least one indicator of a maximum recommended speed corresponding to the UFV (e.g., a local UAV may transmit to the remote UAV a model reference number of the local UAV that is associated with a suggested top speed for the local UAV, which remote UAV is able to acquire a value for the top speed using at least the model reference number and a lookup table). However, claimed subject matter is not limited to any particular described embodiments, implementations, examples, etc.

For certain example embodiments, an operation may be directed at least partially to wherein the transmitting to the remote UFV at least one indicator of at least one flight capability corresponding to the UFV, the at least one flight capability representative of a degree to which the UFV is capable of adjusting a flight path of the UFV, includes transmitting to the remote UFV at least one indicator of a turning ability corresponding to the UFV. For certain example implementations, at least one machine may transmit to a remote UFV 102R at least one indicator of a turning ability (e.g., a turning radius, a banking ability, a radius of turn, a rotational speed, standard rate turn capability, rate one turn (ROT), rate two turn, number of degrees per second, or a combination thereof, etc.) corresponding to a UFV 102. By way of example but not limitation, at least one UFV may transmit to the remote UFV at least one indicator of a turning ability corresponding to the UFV (e.g., a local UAV may transmit to a remote UAV a radius of turn for the local UAV at a given airspeed, with the given airspeed being transmitted or being a known or determinable default airspeed). However, claimed subject matter is not limited to any particular described embodiments, implementations, examples, etc.

For certain example embodiments, an operation may be directed at least partially to wherein the transmitting to the remote UFV at least one indicator of at least one flight capability corresponding to the UFV, the at least one flight capability representative of a degree to which the UFV is capable of adjusting a flight path of the UFV, includes transmitting to the remote UFV at least one indicator of a hovering ability corresponding to the UFV. For certain example implementations, at least one machine may transmit to a remote UFV 102R at least one indicator of a hovering ability (e.g., an ability or inability to maintain a stable position in the air, an ability or inability to produce substantially stationary flight, a degree or extent to which a craft has such an ability, a Boolean value, a coefficient, or a combination thereof, etc.) corresponding to a UFV 102. By way of example but not limitation, at least one UFV may transmit to the remote UFV at least one indicator of a hovering ability corresponding to the UFV (e.g., a local UAV may transmit to a remote UAV a signal that indicates if the local UAV is capable of hovering in one place over a location on the earth or next to a location above the earth, such as a next to a particular floor of a building). However, claimed subject matter is not limited to any particular described embodiments, implementations, examples, etc.

For certain example embodiments, an operation may be directed at least partially to wherein the transmitting to the remote UFV at least one indicator of at least one flight capability corresponding to the UFV, the at least one flight capability representative of a degree to which the UFV is capable of adjusting a flight path of the UFV, includes transmitting to the remote UFV at least one maneuverability indicator corresponding to the UFV. For certain example implementations, at least one machine may transmit to a remote UFV 102R at least one maneuverability indicator (e.g., a label or value representative of how well a UFV can adjust its flight path; a relative indication; an absolute indication; a score; a class-like a regulatory certification class for meeting at least one predetermined maneuverability criterion, such as hovering, acceleration, minimum velocity, stability in particular weather conditions, or a combination thereof, etc., or comportment with a set of construction or feature regulations for a craft type, a label equating to a set of minimal standards to achieve the label, or some combination thereof, etc.—; a rating—like an industry certification rating for meeting at least one predetermined maneuverability criterion, such as hovering, acceleration, minimum velocity, stability in particular weather conditions, or a combination thereof, etc., or comportment with a set of flight capabilities, a grade representing a maneuvering score achieved by a make or model of a vehicle, a title equating to a set of minimal standards, such as a minimum negative acceleration, to achieve the title, or some combination thereof, etc.—; a level; an indication of a degree to which a vehicle is agile; a craft category, such as fixed wing, rotary wing, LTA, ornithopter, or a combination thereof, etc.; some combination thereof; or so forth) corresponding to a UFV 102. By way of example but not limitation, at least one UFV may transmit to the remote UFV at least one maneuverability indicator corresponding to the UFV (e.g., a local UAV may transmit to a remote UAV an industry-defined UAV class type having an associated set of performance criteria that a sample/test model comparable to the local UAV is certified to have met). However, claimed subject matter is not limited to any particular described embodiments, implementations, examples, etc.

For certain example embodiments, an operation may be directed at least partially to wherein the transmitting to the remote UFV at least one indicator of at least one flight capability corresponding to the UFV, the at least one flight capability representative of a degree to which the UFV is capable of adjusting a flight path of the UFV, includes transmitting to the remote UFV at least one indicator of a remaining available airtime corresponding to the UFV. For certain example implementations, at least one machine may transmit to a remote UFV 102R at least one indicator of a remaining available airtime (e.g., a time, a fuel level, a rate of fuel usage, an average rate of fuel usage, values usable to determine a time until flying operations are to cease due to insufficiency of fuel, an amount of jet fuel onboard, an amount of charge left in at least one battery, a rate of charge depletion, a total amount of time flight time remaining, a total amount of time remaining minus time to land safely, a time until a vehicle will be compelled to leave a theater of operations due to insufficiency of fuel, a time until a vehicle will be compelled to cease flight due to insufficiency of fuel, or a combination thereof, etc.) corresponding to a UFV 102. By way of example but not limitation, at least one UFV may transmit to the remote UFV at least one indicator of a remaining available airtime corresponding to the UFV (e.g., a local UAV may transmit to a remote UAV a predicted or estimated number of minutes left that the local UAV is able to stay in the air before fuel becomes sufficiently low that landing becomes imminent). However, claimed subject matter is not limited to any particular described embodiments, implementations, examples, etc.

For certain example embodiments, an operation may be directed at least partially to wherein the transmitting to the remote UFV at least one indicator of at least one flight capability corresponding to the UFV, the at least one flight capability representative of a degree to which the UFV is capable of adjusting a flight path of the UFV, includes transmitting to the remote UFV at least one indicator for a flight bubble corresponding to the UFV. For certain example implementations, at least one machine may transmit to a remote UFV 102R at least one indicator (e.g., a label representing a standardized classification of flight bubbles, a number representing a minimum distance around a UFV, a shape of a flight bubble, a description of a spatial zone, or a combination thereof, etc.) for a flight bubble (e.g., at least one buffer zone, a shape defined by one or more distances extending from a UFV in one or more different directions, a margin of safety around, an extended area that is to be kept free of objects to facilitate safe flight by a UFV, or a combination thereof, etc.), as shown with an example shape at flight bubble, corresponding to a UFV 102. By way of example but not limitation, at least one UFV may transmit to the remote UFV at least one indicator for a flight bubble corresponding to the UFV (e.g., a local UAV may transmit to a remote UAV at least one measurement representative of at least one dimension, such as a vertical or a longitudinal dimension, of a buffer zone around itself that the local UAV intends to maintain clear of other objects). However, claimed subject matter is not limited to any particular described embodiments, implementations, examples, etc.

For certain example embodiments, an operation may be directed at least partially to wherein a method of obtaining or transmitting further includes adjusting a flight path corresponding to the UFV based at least partially on at least one flight attribute indicator received from and corresponding to the remote UFV. For certain example implementations, at least one machine may adjust (e.g., change, decrease, increase, replace, cause a deviation in, adapt, modify, alter, deviate from, add something to, take something away from, or a combination thereof, etc., such as at least part of an adjustment for) a flight path (e.g., a heading, a flight trajectory, a position, an altitude, a speed, a direction a velocity, an acceleration, a stability level, a destination, a course through air or space or a time at which the course is to be traversed, or a combination thereof, etc.) corresponding to a UFV 102 based at least partially on at least one flight attribute indicator (e.g., a description, a designation, an expression, a representation, an indirect identification, a direct identification, a reference, a code providing a linkage to, a signal, a value, or a combination thereof, etc.) received from and corresponding to a remote UFV 102R. By way of example but not limitation, at least one UFV may adjust a flight path corresponding to the UFV based at least partially on at least one flight attribute indicator received from and corresponding to the remote UFV (e.g., a local UAV may accelerate by increasing an airspeed or changing a direction of travel based on a flight attribute received from a remote UAV that indicates that the remote UAV is a lighter-than-air (LTA) vehicle with limited maneuverability). However, claimed subject matter is not limited to any particular described embodiments, implementations, examples, etc.

For certain example embodiments, an operation may be directed at least partially to wherein a method of obtaining or transmitting further includes negotiating with the remote UFV at least one flight path adjustment. For certain example implementations, at least one machine may negotiate (e.g., conduct, engage in, or participate in an offer and an acceptance (such as an acknowledgment), an offer to adjust a flight path and a rejection, an offer and a counter-offer, a suggestion for an alteration to a planned course, an exchange of signals, a request to adjust a flight path, a rejection of a request, an acceptance of a request, a swapping of offers or intentions or requests, or a combination thereof, etc., via at least one negotiation) with a remote UFV 102R at least one flight path adjustment (e.g., a change, decrease, increase, replace, cause a deviation in, adapt, modify, alter, deviate from, add something to, take something away from, or a combination thereof, etc. to a flight path (e.g., a heading, a flight trajectory, a position, an altitude, a speed, a direction a velocity, an acceleration, a stability level, a destination, a course through air or space or a time at which the course is to be traversed, or a combination thereof, etc.)). By way of example but not limitation, at least one UFV may negotiate with the remote UFV at least one flight path adjustment (e.g., a local UAV may send a flight adjustment offer or request to a remote UAV or receive a flight adjustment offer or request from the remote UAV in an effort to reach an agreement on at least one adjustment to a flight path of the local UAV or a flight path of the remote UAV). However, claimed subject matter is not limited to any particular described embodiments, implementations, examples, etc.

For certain example embodiments, an operation may be directed at least partially to wherein the negotiating with the remote UFV at least one flight path adjustment includes transmitting to the remote UFV an offer to make at least one adjustment to a flight path corresponding to the UFV. For certain example implementations, at least one machine may transmit to a remote UFV 102R an offer (e.g., a description of potential change(s) to a flight path in terms of deltas to a current flight path, a description of potential change(s) to a flight path in terms of a new flight path, one or more indications of changes to current or future flight characteristics, a suggestion of changes that may be made, notice of changes that are to be made, or a combination thereof, etc.) to make at least one adjustment to a flight path (e.g., a heading, a flight trajectory, a position, an altitude, a speed, a direction a velocity, an acceleration, a stability level, a destination, a course through air or space or a time at which the course is to be traversed, or a combination thereof, etc.) corresponding to a UFV 102. By way of example but not limitation, at least one UFV may transmit to the remote UFV an offer to make at least one adjustment to a flight path corresponding to the UFV (e.g., a local UAV may send to a remote UAV a communication that suggests that the local UAV may change a flight path of the local UAV by increasing a rate of descent if the remote UAV authorizes, agrees to, acknowledges, or merely fails to affirmatively reject the offer). However, claimed subject matter is not limited to any particular described embodiments, implementations, examples, etc.

For certain example embodiments, an operation may be directed at least partially to wherein the negotiating with the remote UFV at least one flight path adjustment includes receiving from the remote UFV a request to make at least one adjustment to a flight path corresponding to the UFV, with the request associated with a reference to but differing from an offer to make a flight path adjustment that was a previously-transmitted from the UFV to the remote UFV. For certain example implementations, at least one machine may receive (e.g., accept, decode, demodulate, down-convert, detect, obtain from or via a communication, route from an antenna, or a combination thereof, etc.) from a remote UFV 102R a request (e.g., a description of potential change(s) to a flight path in terms of deltas to a current flight path, a description of potential change(s) to a flight path in terms of a new flight path, one or more indications of changes to flight characteristics, a suggestion of changes that may be made, or a combination thereof, etc.) to make at least one adjustment to a flight path corresponding to a UFV 102, with request associated with a reference to (e.g., an identification of, a transaction number, a negotiation code, inclusion as part of an ongoing exchange regarding, or a combination thereof, etc.) but differing from (e.g., being directed to one or more different flight characteristics, suggesting different changes to a same one or more flight characteristics, suggesting no changes instead of changes, or a combination thereof, etc.) an offer (e.g., a suggestion, an expression of a willingness, a description of possible or permitted changes, or a combination thereof, etc.) to make a flight path adjustment (e.g., a change, decrease, increase, replace, cause a deviation in, adapt, modify, alter, deviate from, add something to, take something away from, or a combination thereof, etc. to a flight path (e.g., a heading, a flight trajectory, a position, an altitude, a speed, a direction, a set of flight characteristics, a velocity, an acceleration, a stability level, a destination, a course through air or space or a time at which the course is to be traversed, or a combination thereof, etc.)) that was a previously-transmitted from UFV 102 to remote UFV 102R. By way of example but not limitation, at least one UFV may receive from the remote UFV a request to make at least one adjustment to a flight path corresponding to the UFV, with the request associated with a reference to but differing from an offer to make a flight path adjustment that was a previously-transmitted from the UFV to the remote UFV (e.g., a local UAV may receive from a remote UAV a communication asking the local UAV to veer right by 20 degrees and decelerate to alter a flight path in lieu of increasing a rate of decent, which communication may include an identifier of an earlier communication or may be part of an ongoing exchange, which earlier communication was sent from the local UAV to the remote UAV and suggested that the local UAV could descend more quickly to avoid an airspace conflict between the two UAVs). However, claimed subject matter is not limited to any particular described embodiments, implementations, examples, etc.

FIG. 9C illustrates a flow diagram 900C having example operations 928, 930, or 932. For certain example embodiments, an operation 928 may be directed at least partially to wherein the identifying at least one hazard using the at least one automated hazard handling routine of the UFV (of operation 920) includes identifying at least one other UFV using the at least one automated hazard handling routine of the UFV. For certain example implementations, at least one machine may identify 744 at least one other UFV (e.g., a UFV other than a (local) UFV 102 effectuating an identification, a remote UFV 102R, a first remote UFV 102R(1) or a second remote UFV 102R(2) (both of FIG. 3B), or a combination thereof, etc.) using at least one automated hazard handling routine 710 of a UFV 102. By way of example but not limitation, a UFV may identify at least one other UFV using the at least one automated hazard handling routine of the UFV (e.g., a UAV may recognize that an object is another UAV—such as by detecting changes in an image thereof from a camera's field of view that does not comport with a stationary object or by receiving a positional UAV wireless beacon from the other UAV—using a hazard handling module that is searching for potential elevated hazards having motion). However, claimed subject matter is not limited to any particular described embodiments, implementations, examples, etc.

For certain example embodiments, an operation 930 may be directed at least partially to wherein the identifying at least one other UFV using the at least one automated hazard handling routine of the UFV (of operation 928) includes turning in a predetermined direction responsive at least partly to identification of the at least one other UFV in accordance with the at least one automated hazard handling routine. For certain example implementations, at least one machine may turn 752 (e.g., gradually change to; stop, rotate towards, and continue forward progression; bank; move towards; veer towards; steer towards; or a combination thereof; etc.) in a predetermined direction 754 (e.g., a direction that is retrieved from storage, a direction that is automatically selected, a direction that is utilized regardless of a hazard's character, a number of preset degrees from a current heading, or a combination thereof, etc.) responsive at least partly to (e.g., as a result of, based at least partially on, as a consequence of, or a combination thereof, etc.) identification 744 of at least one other UFV (e.g., a UFV other than a (local) UFV 102 effectuating an identification, a remote UFV 102R, a first remote UFV 102R(1) or a second remote UFV 102R(2) (both of FIG. 3B), or a combination thereof, etc.) in accordance with (e.g., under control of, following, adhering to, based at least partially on, or a combination thereof, etc.) at least one automated hazard handling routine 710. By way of example but not limitation, a UFV may turn in a predetermined direction responsive at least partly to identification of the at least one other UFV in accordance with the at least one automated hazard handling routine (e.g., a UAV may be programmed to have a default turning direction—such as left, right, upward, downward, north, south, east, west, or a combination thereof, etc.—if confronted with a potential overlap of respective buffer zones, such as 50 meters or half a mile, around itself or another UAV, including but not limited to a potential collision of the UAV and the other UAV). However, claimed subject matter is not limited to any particular described embodiments, implementations, examples, etc.

For certain example embodiments, an operation 932 may be directed at least partially to wherein the turning in a predetermined direction responsive at least partly to identification of the at least one other UFV in accordance with the at least one automated hazard handling routine (of operation 930) includes turning rightward responsive at least partly to the identification of the at least one other UFV in accordance with the at least one automated hazard handling routine. For certain example implementations, at least one machine may turn 752 rightward (e.g., opposite of left, veer toward starboard side of craft, away from port side of craft, change a flight path towards right of vehicle, or a combination thereof, etc.) responsive at least partly to identification 744 of at least one other UFV in accordance with at least one automated hazard handling routine 710. By way of example but not limitation, a UFV may turn rightward responsive at least partly to the identification of the at least one other UFV in accordance with the at least one automated hazard handling routine (e.g., a UAV may automatically turn toward its right side—with a radius or rate of turn dependent at least partially on an estimated distance between the UAV and another UAV or a relative closing velocity—to avoid potential flight interference with another UAV). However, claimed subject matter is not limited to any particular described embodiments, implementations, examples, etc.

Figure 9D:
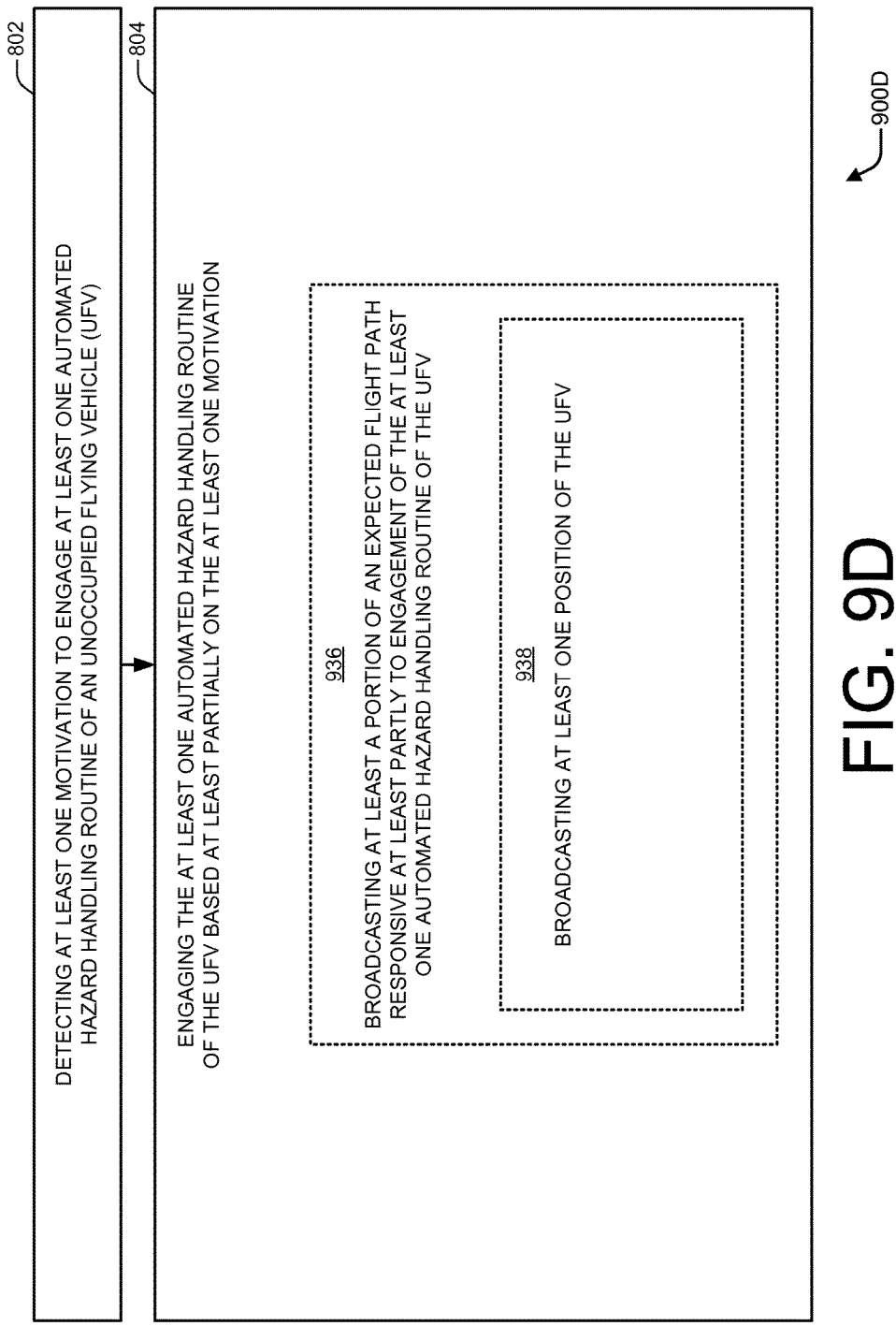

FIG. 9D illustrates a flow diagram 900D having example operations 936 or 938. For certain example embodiments, an operation 936 may be directed at least partially to wherein the engaging the at least one automated hazard handling routine of the UFV based at least partially on the at least one motivation (of operation 804) includes broadcasting at least a portion of an expected flight path responsive at least partly to engagement of the at least one automated hazard handling routine of the UFV. For certain example implementations, at least one machine may broadcast 756 (e.g., transmit in the open, send without encryption, communicate to multiple recipients, transmit for unknown potential recipients, communicate without knowing possible relevant receivers, or a combination thereof, etc.) at least a portion of an expected (e.g., planned, intended, predicted, programmed, predetermined, scheduled, prescribed, known, laid out, or a combination thereof, etc.) flight path 758 (e.g., a heading, a flight trajectory, a position, an altitude, a speed, a direction a velocity, an acceleration, a stability level, a destination, a course through air or space or a time at which the course is to be traversed, or a combination thereof, etc.) responsive at least partly to (e.g., as a result of, based at least partially on, as a consequence of, flowing from, or a combination thereof, etc.) engagement 714 of at least one automated hazard handling routine 710 of a UFV 102. By way of example but not limitation, a UFV may broadcast at least a portion of an expected flight path responsive at least partly to engagement of the at least one automated hazard handling routine of the UFV (e.g., a UAV may start transmitting an intended heading and direction for receipt by other UAVs or base stations thereof that are in the vicinity of the UAV if local flight control is activated for the UAV). However, claimed subject matter is not limited to any particular described embodiments, implementations, examples, etc.

For certain example embodiments, an operation 938 may be directed at least partially to wherein the broadcasting at least a portion of an expected flight path responsive at least partly to engagement of the at least one automated hazard handling routine of the UFV (of operation 936) includes broadcasting at least one position of the UFV. For certain example implementations, at least one machine may broadcast 758 (e.g., transmit in the open, send without encryption, communicate to multiple recipients, transmit for unknown potential recipients, communicate without knowing possible relevant receivers, or a combination thereof, etc.) at least one position 760 (e.g., at least one location above or on the earth; one or more geographical coordinates; one or more satellite positioning service (SPS) coordinates, such as GPS, GLONASS, or Galileo coordinates, that are at least partially determined using at least one satellite; one or more map coordinates; at least one reference to at least one determinable position, such as a landmark, a waypoint, or an address; one or more cardinal directions in degrees/minutes/seconds; at least one longitude or latitude; or a combination thereof; etc.) of a UFV 102. By way of example but not limitation, a UFV may broadcast at least one position of the UFV (e.g., a UAV may transmit current GPS coordinates or future expected GPS coordinates as a warning to other UAVs or an invitation to negotiate respective flight paths between or among the UAV and one or more of the other UAVs as part of a hazard handling routine if UAV flight control is entrusted to one or more onboard modules). However, claimed subject matter is not limited to any particular described embodiments, implementations, examples, etc.

Figure 10A:
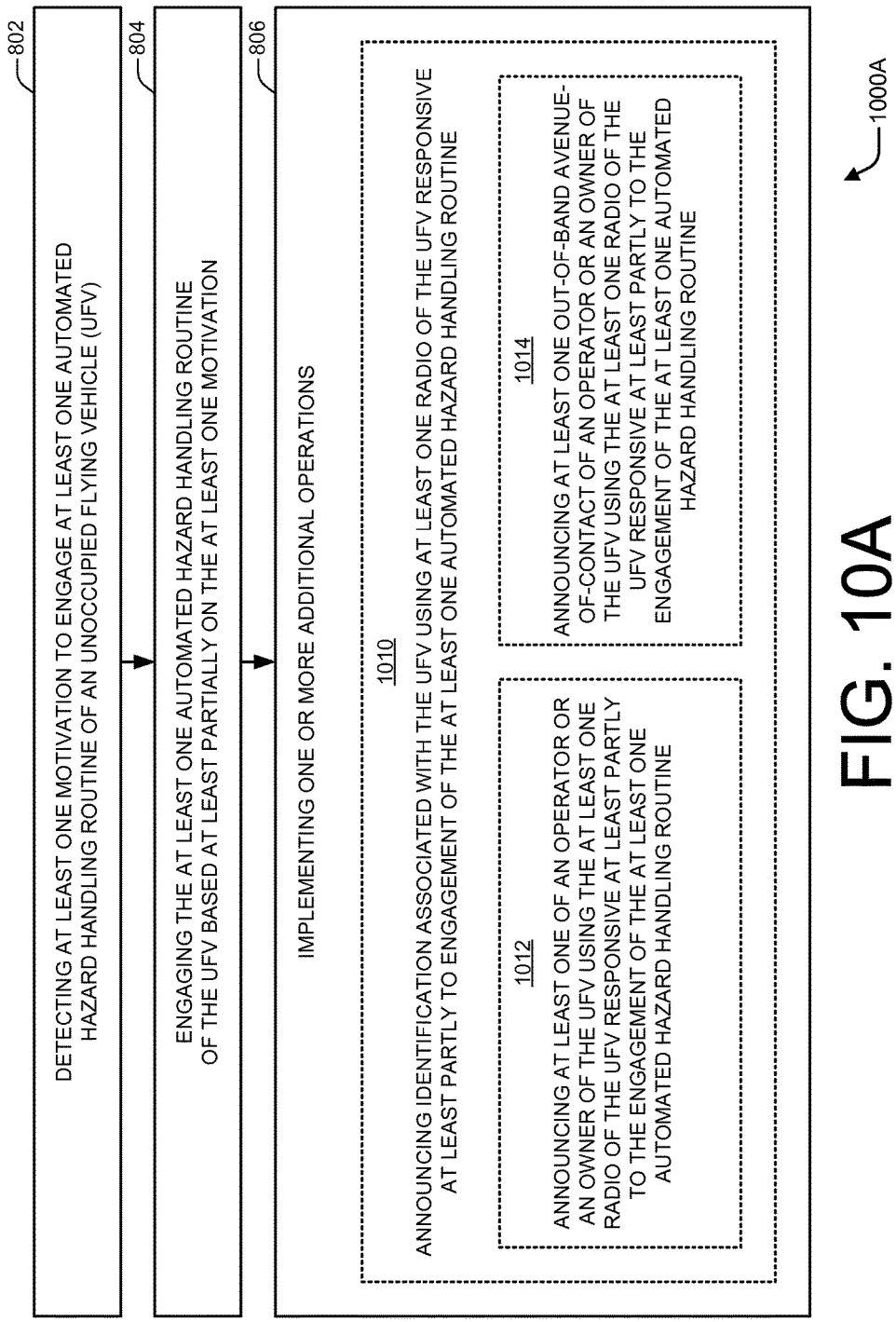
FIGS. 10A-10B depict example additions or alternatives for a flow diagram of FIG. 8A in accordance with certain example embodiments.
Figure 10B:
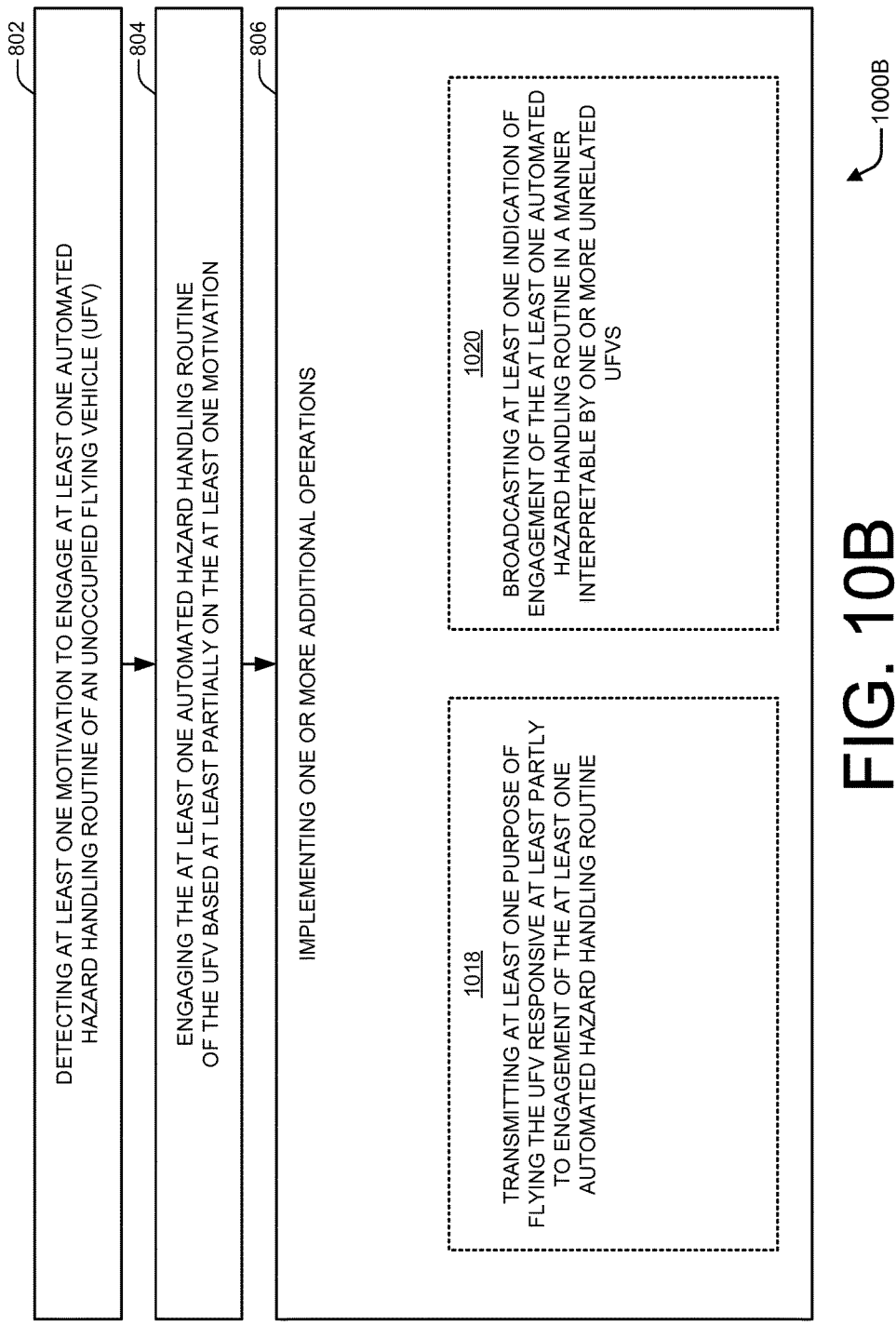

FIGS. 10A-10B depict example additions or alternatives for a flow diagram of FIG. 8A in accordance with certain example embodiments. As illustrated, flow diagrams of FIGS. 10A-10B may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 10A-10B may be performed so as to be fully or partially overlapping with other operation(s). For certain example embodiments, one or more operations of flow diagrams 1000A-1000B (of FIGS. 10A-10B) may be performed by at least one machine (e.g., a UFV 102 or at least a portion thereof).

FIGS. 10A-10B each illustrate a flow diagram 1000A-1000B, respectively, having an example operation 806. For certain example embodiments, an operation 806 may be directed at least partially to wherein a method further includes implementing one or more additional operations. For certain example implementations, at least one machine may implement one or more operations in addition to detecting (of operation 802) or engaging (of operation 804). Example additional operations may include, by way of example but not limitation, 1010, 1012, 1014, 1018, or 1020 (of FIGS. 10A-10B).

FIG. 10A illustrates a flow diagram 1000A having example operations 1010, 1012, or 1014. For certain example embodiments, an operation 1010 may be directed at least partially to wherein a method of detecting (of operation 802) or engaging (of operation 804) further includes (at additional operation 806) announcing identification associated with the UFV using at least one radio of the UFV responsive at least partly to engagement of the at least one automated hazard handling routine. For certain example implementations, at least one machine may announce 764 (e.g., broadcast, transmit, implement a beacon containing, promulgate, or a combination thereof, etc.) identification 766 (e.g., name or alphanumeric identifier of owner, operator, manufacturer, UFV model, or a combination thereof, etc.; point of contact for owner, operator, manufacturer, or combination thereof, etc.; avenue of contact for owner, operator, manufacturer, UFV model, or a combination thereof, etc.; web, email, or physical address; phone number; point or avenue of contact via social media; or some combination thereof; etc.) associated with (e.g., corresponding to, related to, linked to, or a combination thereof, etc.) a UFV 102 using at least one radio 604 (e.g., of FIG. 6A) of UFV 102 responsive at least partly to (e.g., as a result of, based at least partially on, as a consequence of, flowing from, or a combination thereof, etc.) engagement 714 of at least one automated hazard handling routine 710. By way of example but not limitation, at least one UFV may announce identification associated with the UFV using at least one radio of the UFV responsive at least partly to engagement of the at least one automated hazard handling routine (e.g., a UAV may broadcast information providing an indicia of identification for the UAV—to provide public notice or a mechanism for contacting—using a transceiver thereof if a hazard handling module is engaged such that at least a portion of navigational flight control is vested in onboard electronics). However, claimed subject matter is not limited to any particular described embodiments, implementations, examples, etc.

For certain example embodiments, an operation 1012 may be directed at least partially to wherein the announcing identification associated with the UFV using at least one radio of the UFV responsive at least partly to engagement of the at least one automated hazard handling routine (of operation 1010) includes announcing at least one of an operator or an owner of the UFV using the at least one radio of the UFV responsive at least partly to the engagement of the at least one automated hazard handling routine. For certain example implementations, at least one machine may announce 764 at least one of an operator 768 (e.g., sub-contractor, employee, subsidiary, individual, flight service, name thereof, alphanumeric identifier thereof, or a combination thereof, etc. that is launching, landing, managing, or at least partially remotely controlling a UFV) or an owner 770 (e.g., company, general contractor, person, partnership, name thereof, alphanumeric identifier thereof, or a combination thereof, etc. having at least a partial ownership interest in a UFV) of a UFV 102 using at least one radio 604 of UFV 102 responsive at least partly to engagement 714 of at least one automated hazard handling routine 710. By way of example but not limitation, a UFV may announce at least one of an operator or an owner of the UFV using the at least one radio of the UFV responsive at least partly to the engagement of the at least one automated hazard handling routine (e.g., a UAV may broadcast a name, such as that of a company or an individual, or may broadcast an alphanumeric identifier, which identifier may be linked to a person or legal entity in a governmental or industry database, if an onboard hazard handling module is engaged so that interested parties in the vicinity of the UAV may be aware of who may be gathering sensor-acquired data about them). However, claimed subject matter is not limited to any particular described embodiments, implementations, examples, etc.

For certain example embodiments, an operation 1014 may be directed at least partially to wherein the announcing identification associated with the UFV using at least one radio of the UFV responsive at least partly to engagement of the at least one automated hazard handling routine (of operation 1010) includes announcing at least one out-of-band avenue-of-contact of at least one of an operator or an owner of the UFV using the at least one radio of the UFV responsive at least partly to the engagement of the at least one automated hazard handling routine. For certain example implementations, at least one machine may announce 764 at least one out-of-band (e.g., non-UFV, not involving transmitting to a UFV, not involving receiving from a UFV, or a combination thereof, etc.) avenue-of-contact 772 (e.g., contact mechanism, path of communication, email address, postal mail address, phone call number, social media message posting, or a combination thereof, etc.) of at least one of an operator 768 (e.g., sub-contractor, employee, subsidiary, individual, flight service, or a combination thereof, etc. that is launching, landing, managing, or at least partially remotely controlling a UFV) or an owner 770 (e.g., company, general contractor, person, partnership, or a combination thereof, etc. having at least a partial ownership interest in a UFV) of a UFV 102 using at least one radio 604 of UFV 102 responsive at least partly to engagement 714 of at least one automated hazard handling routine 710. By way of example but not limitation, a UFV may announce at least one out-of-band avenue-of-contact of at least one of an operator or an owner of the UFV using the at least one radio of the UFV responsive at least partly to the engagement of the at least one automated hazard handling routine (e.g., a UAV may transmit an avenue-of-contact for an owner or operate of a UAV that is separate from the UAV's communication interfaces—such as a phone number, an email address, a physical or postal address, a web address, an instant message identifier, or a combination thereof, etc.—in response to an avenue-of-contact inquiry received via a UAV's radio). However, claimed subject matter is not limited to any particular described embodiments, implementations, examples, etc.

FIG. 10B illustrates a flow diagram 1000B having example operations 1018 or 1020. For certain example embodiments, an operation 1018 may be directed at least partially to wherein a method of detecting (of operation 802) or engaging (of operation 804) further includes (at additional operation 806) transmitting at least one purpose of flying the UFV responsive at least partly to engagement of the at least one automated hazard handling routine. For certain example implementations, at least one machine may transmit (e.g., send, communicate wirelessly, frequency up-convert, modulate, encode, propagate, emanate from an emitter or antenna, or a combination thereof, etc.) at least one purpose 774 (e.g., sensor readings being taken, communication relay functionality, sensor capabilities, camera resolution, intended destination or usage of sensor readings, destination of UFV, aerial coverage, hovering zone, or a combination thereof, etc.) of flying a UFV 102 responsive at least partly to (e.g., as a result of, based at least partially on, as a consequence of, flowing from, or a combination thereof, etc.) engagement 714 of at least one automated hazard handling routine 710. By way of example but not limitation, a UFV may transmit at least one purpose of flying the UFV responsive at least partly to engagement of the at least one automated hazard handling routine (e.g., if a UAV is being locally-controlled by an on-board hazard handling module and receives a wireless flight purpose inquiry from some remote transmitter, a UAV may automatically responsively transmit its purpose, such as to loiter in a certain area to acquire video, to detect Wi-Fi hotspots as it transits through various areas, or to fly through a particular region without taking non-flying-related sensor readings). However, claimed subject matter is not limited to any particular described embodiments, implementations, examples, etc.

For certain example embodiments, an operation 1020 may be directed at least partially to wherein a method of detecting (of operation 802) or engaging (of operation 804) further includes (at additional operation 806) broadcasting at least one indication of engagement of the at least one automated hazard handling routine in a manner interpretable by one or more unrelated UFVs. For certain example implementations, at least one machine may broadcast 776 (e.g., transmit in the open, send without encryption, communicate to multiple recipients, transmit for unknown potential recipients, communicate without knowing possible relevant receivers, or a combination thereof, etc.) at least one indication 778 (e.g., a signal, a message, an electronic control indicator bit, a code, or a combination thereof, etc.) of engagement 714 of at least one automated hazard handling routine 710 in a manner interpretable (e.g., understandable, decodable, capable of being demodulated, according to a standard or regulation, or a combination thereof, etc.) by one or more unrelated UFVs (e.g., a UFV that is owned or operated by an entity other than one that owns or operates a (local) UFV 102 that is performing a broadcast, such as a remote UFV 102R, a first remote UFV 102R(1) or a second remote UFV 102R(2) (both of FIG. 3B), or a combination thereof, etc.). By way of example but not limitation, a UFV may broadcast at least one indication of engagement of the at least one automated hazard handling routine in a manner interpretable by one or more unrelated UFVs (e.g., if a UAV is being locally-controlled by virtue of activation of an on-board hazard handling module, a UAV may automatically—such as periodically or every 30 seconds or if another UAV approaches—broadcast an indication of being at least partially electronically controlled to serve as a warning to near-by UAVs). However, claimed subject matter is not limited to any particular described embodiments, implementations, examples, etc.

Those skilled in the art will appreciate that the foregoing specific exemplary processes and/or machines and/or technologies are representative of more general processes and/or machines and/or technologies taught elsewhere herein, such as in the claims filed herewith and/or elsewhere in the present application.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL) or other circuitry model which may then be used to create a physical implementation having hardware (e.g., an Application Specific Integrated Circuit).

Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Modules, logic, circuitry, hardware and software combinations, firmware, or so forth may be realized or implemented as one or more general-purpose processors, one or more processing cores, one or more special-purpose processors, one or more microprocessors, at least one Application-Specific Integrated Circuit (ASIC), at least one Field Programmable Gate Array (FPGA), at least one digital signal processor (DSP), some combination thereof, or so forth that is executing or is configured to execute instructions, a special-purpose program, an application, software, code, some combination thereof, or so forth as at least one special-purpose computing apparatus or specific computing component. One or more modules, logic, or circuitry, etc. may, by way of example but not limitation, be implemented using one processor or multiple processors that are configured to execute instructions (e.g., sequentially, in parallel, at least partially overlapping in a time-multiplexed fashion, at least partially overlapping across multiple cores, or a combination thereof, etc.) to perform a method or realize a particular computing machine. For example, a first module may be embodied by a given processor executing a first set of instructions at or during a first time, and a second module may be embodied by the same given processor executing a second set of instructions at or during a second time. Moreover, the first and second times may be at least partially interleaved or overlapping, such as in a multi-threading, pipelined, or predictive processing environment. As an alternative example, a first module may be embodied by a first processor executing a first set of instructions, and a second module may be embodied by a second processor executing a second set of instructions. As another alternative example, a particular module may be embodied partially by a first processor executing at least a portion of a particular set of instructions and embodied partially by a second processor executing at least a portion of the particular set of instructions. Other combinations of instructions, a program, an application, software, or code, etc. in conjunction with at least one processor or other execution machinery may be utilized to realize one or more modules, logic, or circuitry, etc. to implement any of the processing algorithms described herein.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

This application may make reference to one or more trademarks, e.g., a word, letter, symbol, or device adopted by one manufacturer or merchant and used to identify and distinguish his or her product from those of others. Trademark names used herein are set forth in such language that makes clear their identity, that distinguishes them from common descriptive nouns, that have fixed and definite meanings, and, in many if not all cases, are accompanied by other specific identification using terms not covered by trademark. In addition, trademark names used herein have meanings that are well-known and defined in the literature, and do not refer to products or compounds protected by trade secrets in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or [trade], even when such trademark symbol does not explicitly appear next to the trademark. To the extent a trademark is used in a descriptive manner to refer to a product or process, that trademark should be interpreted to represent the corresponding product or process as of the date of the filing of this patent application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for hazard handling for an unoccupied flying vehicle (UFV), the method being at least partially implemented by at least one machine, the method comprising:
   autonomously controlling an unoccupied flying vehicle (UFV) including at least:
      detecting at least one engagement indication to engage at least one automated hazard handling routine associated with at least one mission including the UFV;
      autonomously analyzing the at least one engagement indication and selecting the at least one automated hazard handling routine associated with the at least one mission including the UFV from the analysis;
      autonomously negotiating at least one flight path adjustment associated with the UFV and at least one remote UFV including at least transmitting at least one negotiation request requesting at least a maneuverability indication corresponding to at least one maneuverability criterion associated with the at least one remote UFV and receiving from the at least one remote UFV at least the maneuverability indication;
      autonomously formulating at least one control command associated with the at least one automated hazard handling routine including at least analyzing at least the at least one engagement indication and the maneuverability indication in accordance with the at least one automated hazard handling routine, formulating the at least one flight path adjustment and at least one flight path adjustment offer based at least partly on the analysis of at least the at least one engagement indication and the maneuverability indication, and transmitting the at least one flight path adjustment offer to the at least one remote UFV; and autonomously engaging the at least one automated hazard handling routine in accordance with the autonomously formulated at least one control command responsive to receiving at least one flight path adjustment acceptance from the at least one remote UFV including at least controlling the UFV to cause the at least one flight path adjustment.

2. An unoccupied flying vehicle (UFV) comprising:

at least one electronic device configured for autonomously controlling the UFV, the at least one electronic device including at least:

circuitry configured for detecting at least one engagement indication to engage at least one automated hazard handling routine associated with at least one mission including the UFV;

circuitry configured for autonomously analyzing the at least one engagement indication and selecting the at least one automated hazard handling routine associated with the at least one mission including the UFV from the analysis;

circuitry configured for autonomously negotiating at least one flight path adjustment associated with the UFV and at least one remote UFV including at least transmitting at least one negotiation request requesting at least a maneuverability indication corresponding to at least one maneuverability criterion associated with the at least one remote UFV and receiving from the at least one remote UFV at least the maneuverability indication;

circuitry configured for autonomously formulating at least one control command associated with the at least one automated hazard handling routine including at least analyzing at least the at least one engagement indication and the maneuverability indication in accordance with the at least one automated hazard handling routine, formulating the at least one flight path adjustment and at least one flight path adjustment offer based at least partly on the analysis of at least the at least one engagement indication and the maneuverability indication, and transmitting the at least one flight path adjustment offer to the at least one remote UFV; and circuitry configured for autonomously engaging the at least one automated hazard handling routine in accordance with the autonomously formulated at least one control command responsive to receiving at least one flight path adjustment acceptance from the at least one remote UFV including at least controlling the UFV to cause the at least one flight path adjustment.

3. The UFV of claim 2 wherein the circuitry configured for detecting at least one engagement indication to engage at least one automated hazard handling routine associated with at least one mission including the UFV comprises:

at least one of:

circuitry configured for detecting at least an approach to a region with substantially unreliable wireless communication;

circuitry configured for ascertaining that the UFV is experiencing signal interference;

circuitry configured for ascertaining that the UFV has at least approached an area that is designated to be associated with substantially unreliable wireless communication;

circuitry configured for detecting that the UFV is unable to maintain wireless signal contact with a base station;

circuitry configured for detecting at least an approach to an area that is associated with at least a recommended engagement of the at least one automated hazard handling routine;

circuitry configured for detecting the at least an approach to a government-designated area in which UFVs are obligated to engage at least one automated hazard handling routine; or circuitry configured for identifying at least one hazard using the at least one automated hazard handling routine of the UFV.

4. The UFV of claim 2 wherein the circuitry configured for detecting at least one engagement indication to engage at least one automated hazard handling routine associated with at least one mission including the UFV comprises:

circuitry configured for receiving a command instructing the UFV to engage a local flight control that includes the at least one automated hazard handling routine.

5. The UFV of claim 2 wherein the circuitry configured for autonomously engaging the at least one automated hazard handling routine in accordance with the autonomously formulated at least one control command comprises:

circuitry configured for switching a control mode from remote control to at least partial local control.

6. The UFV of claim 2 wherein the circuitry configured for autonomously engaging the at least one automated hazard handling routine in accordance with the autonomously formulated at least one control command comprises:

circuitry configured for implementing a control command received from a remote source unless the received control command conflicts with a control command generated by a hazard handling module of the UFV.

7. The UFV of claim 2 wherein the circuitry configured for autonomously engaging the at least one automated hazard handling routine in accordance with the autonomously formulated at least one control command comprises:

circuitry configured for identifying at least one surface using the at least one automated hazard handling routine of the UFV; and circuitry configured for ascending responsive at least partly to identification of the at least one surface.

8. The UFV of claim 2 wherein the circuitry configured for autonomously engaging the at least one automated hazard handling routine in accordance with the autonomously formulated at least one control command comprises:

circuitry configured for identifying at least one other UFV using the at least one automated hazard handling routine of the UFV; and circuitry configured for turning in a predetermined direction responsive at least partly to identification of the at least one other UFV in accordance with the at least one automated hazard handling routine.

9. The UFV of claim 2 wherein the circuitry configured for autonomously engaging the at least one automated hazard handling routine in accordance with the autonomously formulated at least one control command comprises:

at least one of:

circuitry configured for externally reporting engagement of the automated hazard handling routine;

circuitry configured for repeatedly reporting the engagement of the automated hazard handling routine until an acknowledgment is received;

circuitry configured for broadcasting at least a portion of an expected flight path responsive at least partly to engagement of the at least one automated hazard handling routine of the UFV; or circuitry configured for broadcasting at least one position of the UFV.

10. The UFV of claim 2 further comprising:

circuitry configured for announcing identification associated with the UFV using at least one radio of the UFV responsive at least partly to engagement of the at least one automated hazard handling routine.

11. The UFV of claim 10 wherein the circuitry configured for announcing identification associated with the UFV using at least one radio of the UFV responsive at least partly to engagement of the at least one automated hazard handling routine comprises:

at least one of:
circuitry configured for announcing at least one of an operator or an owner of the UFV using the at least one radio of the UFV responsive at least partly to the engagement of the at least one automated hazard handling routine; or circuitry configured for announcing at least one out-of-band avenue-of-contact of at least one of an operator or an owner of the UFV using the at least one radio of the UFV responsive at least partly to the engagement of the at least one automated hazard handling routine.

12. The UFV of claim 2 further comprising:

circuitry configured for transmitting at least one purpose of flying the UFV responsive at least partly to engagement of the at least one automated hazard handling routine.

13. The UFV of claim 2 further comprising:

circuitry configured for broadcasting at least one indication of engagement of the at least one automated hazard handling routine in a manner interpretable by one or more unrelated UFVs.

14. The UFV of claim 2 wherein the circuitry configured for detecting at least one engagement indication to engage at least one automated hazard handling routine associated with at least one mission including the UFV comprises:

circuitry configured for ascertaining that another proximate UFV with which the UFV was previously communicating by wireless communication and to which the UFV was approaching is no longer participating in flight coordination communications.

15. The UFV of claim 2 wherein the circuitry configured for detecting at least one engagement indication to engage at least one automated hazard handling routine associated with at least one mission including the UFV comprises:

at least one of:
circuitry configured for determining that the UFV has entered at least one of a geographical area or an altitude that is known to have a substandard communication environment as indicated on a map in conjunction with the known current location of the UFV; or circuitry configured for determining that the UFV is experiencing signal interference resulting from another UFV communicating on the same channel.

16. The UFV of claim 2 wherein the circuitry configured for autonomously negotiating at least one flight path adjustment associated with the UFV and at least one remote UFV includes:

circuitry configured for autonomously negotiating a flight path adjustment with at least one remote UFV wherein the UFV descends and accelerates based at least partly on the UFV transmitting to the at least one remote UFV at least one remote UFV control command including at least one flight trajectory that is desired by the UFV and the UFV receiving from the at least one remote UFV an acknowledgment or a non-conflicting flight trajectory that is intended by the at least one remote UFV.

17. The UFV of claim 2 wherein the circuitry configured for detecting at least one engagement indication to engage at least one automated hazard handling routine associated with at least one mission including the UFV includes:

at least one of
circuitry configured for detecting at least one engagement indication to engage at least one automated hazard handling routine associated with at least one mission including the UFV;

one or more sensors configured for sensing at least one indication of at least one hazard associated with at least one mission including the UFV;

circuitry configured for receiving at least one indication of at least one hazard associated with at least one mission including the UFV from at least one of a base station or at least one remote UFV; or circuitry configured for obtaining at least one indication of at least one hazard associated with at least one mission including the UFV, the at least one hazard including at least one of other unoccupied flying vehicles, occupied flying vehicles, ground, buildings, structures on ground, moving objects, weather conditions, or stationary objects.

18. The UFV of claim 2 wherein the circuitry configured for autonomously negotiating at least one flight path adjustment associated with the UFV and at least one remote UFV includes:

circuitry configured for autonomously negotiating a flight path adjustment with at least one remote UFV wherein the UFV transmits to the at least one remote UFV at least one remote UFV control command including one or more flight path adjustment options.

19. The UFV of claim 2 wherein the circuitry configured for autonomously negotiating at least one flight path adjustment associated with the UFV and at least one remote UFV includes:

circuitry configured for autonomously negotiating a flight path adjustment with at least one remote UFV wherein the UFV sends at least one remote UFV control command including at least one prospective local flight path adjustment for the UFV to the at least one remote UFV, and the UFV receives from the at least one remote UFV a prospective remote flight path adjustment for the at least one remote UFV or a revised suggested prospective local fight path adjustment for the UFV that the at least one remote UFV would prefer.

20. The UFV of claim 2 wherein the circuitry configured for autonomously negotiating at least one flight path adjustment associated with the UFV and at least one remote UFV includes:

circuitry configured for autonomously negotiating a flight path adjustment with at least one remote UFV including preparing at least one of an offer and an acceptance, an offer and an acceptance, an acknowledgment, an offer and a rejection, an offer and a counter-offer, a suggestion for an alteration to a planned course, an exchange of signals, or a swapping of offers or intentions associated with adjusting the flight path based at least partially on the autonomously analyzing the one or more flight attributes received from the at least one remote UFV and the indication of at least one hazard associated with at least one mission including the UFV and the at least one remote UFV, transmitting at least one remote UFV control command including the at least one request to the at least one remote UFV, and receiving at least one response to the at least one request from the at least one remote UFV.

21. The UFV of claim 2 wherein the circuitry configured for autonomously analyzing the at least one engagement indication and selecting the at least one automated hazard handling routine associated with the at least one mission including the UFV from the analysis includes:
  circuitry configured for autonomously determining one or more flight control decisions.

22. The UFV of claim 2 wherein the circuitry configured for autonomously negotiating at least one flight path adjustment associated with the UFV and at least one remote UFV includes:
  circuitry configured for autonomously negotiating a flight path adjustment with at least one remote UFV wherein the UFV receives at least one current GPS coordinate of the at least one remote UFV from the at least one remote UFV after having sent at least one remote UFV control command including at least one request to the at least one remote UFV requesting the at least one current GPS coordinate.

23. The UFV of claim 2 wherein the circuitry configured for autonomously analyzing the at least one engagement indication and selecting the at least one automated hazard handling routine associated with the at least one mission including the UFV from the analysis includes:
  circuitry configured for autonomously analyzing at least one indication of at least one hazard including at least one determination of at least one of an avoidance, a management, a mitigation, a coordination, a cooperation, an elimination, or a prediction associated with at least one hazard.

24. The UFV of claim 2 wherein the circuitry configured for autonomously formulating at least one control command associated with the at least one automated hazard handling routine includes:
  circuitry configured for autonomously formulating at least one automated hazard handling routine associated with at least one mission including the UFV and at least one remote UFV based at least partly on analysis of one or more flight attributes of at least one of the UFV or the at least one remote UVF indicative of at least one of identification of craft or operator, indication of flight path, description of flight purpose, flight trajectory, description of flying state, a specified flight performance ability, an aircraft type, altitude restrictions, a safe acceleration level, acceleration, stability, payload, or destination of the at least one remote UFV.

25. The UFV of claim 2 wherein the circuitry configured for autonomously formulating at least one control command associated with the at least one automated hazard handling routine includes:
  circuitry configured for autonomously formulating at least one automated hazard handling routine associated with at least one mission including the UFV and at least one remote UFV based at least partly on analysis of a rate at which the at least one remote UFV is able to reduce speed.

26. The UFV of claim 2 wherein the circuitry configured for autonomously engaging the at least one automated hazard handling routine in accordance with the autonomously formulated at least one control command includes:
  circuitry configured for controlling at least one motility mechanism of the UFV for adjusting at least one flight path of at least the UFV based at least partially on the determined at least one flight path adjustment.

27. An unoccupied vehicle comprising:
  at least one electronic device configured for autonomously controlling the unoccupied vehicle, the at least one electronic device including at least:
    circuitry configured for detecting at least one engagement indication to engage at least one automated hazard handling routine associated with at least one mission including the unoccupied vehicle;
    circuitry configured for autonomously analyzing the at least one engagement indication and selecting the at least one automated hazard handling routine associated with the at least one mission including the unoccupied vehicle from the analysis;
    circuitry configured for autonomously negotiating at least one flight path adjustment associated with the unoccupied vehicle and at least one remote unoccupied vehicle including at least transmitting at least one negotiation request requesting at least a maneuverability indication corresponding to at least one maneuverability criterion associated with the at least one remote unoccupied vehicle and receiving from the at least one remote unoccupied vehicle at least the maneuverability indication;
    circuitry configured for autonomously formulating at least one control command associated with the at least one automated hazard handling routine including at least analyzing at least the at least one engagement indication and the maneuverability indication in accordance with the at least one automated hazard handling routine, formulating at least one path adjustment and at least one path adjustment offer at least partly via the analysis of the at least one indication, and transmitting the at least one path adjustment offer to the at least one remote unoccupied vehicle; and
    circuitry configured for autonomously engaging the at least one automated hazard handling routine in accordance with the autonomously formulated at least one control command responsive to receiving at least one path adjustment acceptance from the at least one remote unoccupied vehicle including at least controlling the unoccupied vehicle to cause the at least one path adjustment.

* * * * *